US005581696A

United States Patent [19]

Kolawa et al.

[11] Patent Number: 5,581,696

[45] Date of Patent: Dec. 3, 1996

[54] METHOD USING A COMPUTER FOR AUTOMATICALLY INSTRUMENTING A COMPUTER PROGRAM FOR DYNAMIC DEBUGGING

[75] Inventors: Adam K. Kolawa, Sierra Madre, Calif.; Roman Salvador, Barcelona, Spain; Wendell T. Hicken, Whittier; Bryan R. Strickland, Los Angeles, both of Calif.

[73] Assignee: Parasoft Corporation, Monrovia, Calif.

[21] Appl. No.: 435,759

[22] Filed: May 9, 1995

[51] Int. Cl.[6] .......................... G01R 31/28; G06F 11/00

[52] U.S. Cl. .......................... 395/183.14

[58] Field of Search .......................... 395/183.14

[56] References Cited

U.S. PATENT DOCUMENTS

| | | | |
|---|---|---|---|
| 5,175,856 | 12/1992 | Van Dyke | 395/700 |
| 5,270,712 | 12/1993 | Iyer | 341/50 |
| 5,493,678 | 2/1996 | Arcuri | 395/600 |

OTHER PUBLICATIONS

Brian W. Kernighan and Dennis M. Ritchie, *The C Programming Language,* Second Edition, 1988, pp. 191–239.

Harry R. Lewis and Christos H. Papadimitriou, *Elements of the Theory of Computation,* 1981, pp. 95–153.

Alfred V. Aho, Ravi Sethi and Jeffrey D. Ullman, *Compilers Principles, Techniques, and Tools,* 1985, pp. 1–24.

Softran Corporation, *C–Debug, The Pointer Checker for All Systems,* Version 2.0, 1991, pp. 1–90.

*Primary Examiner*—Robert W. Beausoliel, Jr.
*Assistant Examiner*—Glenn Snyder
*Attorney, Agent, or Firm*—Christie, Parker & Hale, LLP

[57] ABSTRACT

A method for automatically instrumenting a computer program for dynamic debugging. Such a computer program comprising source code written in a programming language for executing instructions on the computer. The source code is provided as a sequence of statements in a storage device to the computer. Each of the statements are separated into tokens representing either an operator or at least one operand. A parse tree is built according to a set of rules using the set of tokens. The parse tree is instrumented to create an instrumented parse tree for indicating that an error condition occurred in the computer program during execution. Object code is generated from the instrumented parse tree and stored in a secondary storage device for later execution using an error-checking engine that indicates error conditions present in the computer program.

13 Claims, 32 Drawing Sheets

Microfiche Appendix Included
(1585 Microfiche, 17 Pages)

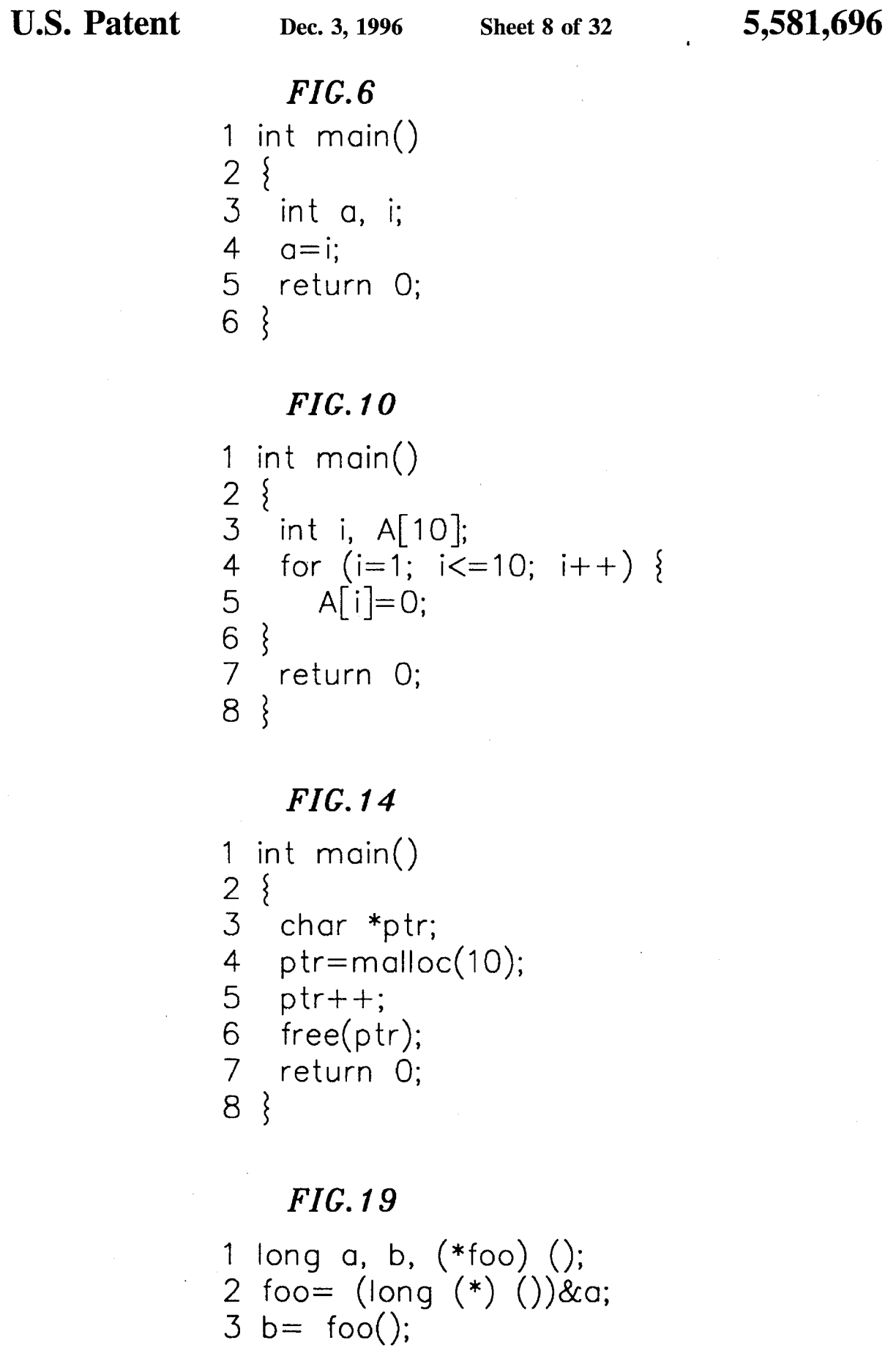

```
int main()
{
  int a, i;
  a=i;
  return 0;
}
```

*FIG. 10*

```
int main()
{
  int i, A[10];
  for (i=1; i<=10; i++) {
     A[i]=0;
}
  return 0;
}
```

*FIG. 14*

```
int main()
{
  char *ptr;
  ptr=malloc(10);
  ptr++;
  free(ptr);
  return 0;
}
```

*FIG. 19*

```
long a, b, (*foo) ();
foo= (long (*) ())&a;
b= foo();
```

```
void foo()
{
   char *ptr=malloc(10);
   return;
}
```

*FIG.27A*

```
ptr=malloc(10);
```

*FIG.27B*

```
char * malloc(size_t size)
{
  char *a;
  if (size <=0)
    iic_error("Bad malloc size");
  a=malloc(size);
  if (a)
    iic_alloc(a, size);
  else
    iic_error("malloc failed");
  return a;
}
```

*FIG.31*

```
void foo()
{
  char b, c, *ptr;
  c=getchar();
  if (c < '0' | | c > '9') {
    *ptr=0;
  }
  b=c - '0';
}
```

METHOD USING A COMPUTER FOR AUTOMATICALLY INSTRUMENTING A COMPUTER PROGRAM FOR DYNAMIC DEBUGGING

REFERENCE TO MICROFICHE APPENDIX AND PRINTED APPENDICES

A microfiche appendix is part of the specification which includes 17 microfiche and 1585 frames.

In addition, two printed documents are part of the specification and are included as 28-page Appendix A and 17-page Appendix B. Two computer source code listings are also part of this specification and are included as 14-page Appendix C and 3-page Appendix D.

A portion of the disclosure of this patent document contains material to which a claim of copyright is made. The copyright owner has no objection to the facsimile reproduction by anyone of the patent document or patent disclosure, as it appears in the Patent and Trademark Office patent file or records, but reserves all other copyright rights whatsoever.

FIELD OF THE INVENTION

The present invention relates in general to automatic instrumentation methods for computer programs and in particular to automatic instrumentation methods for debugging of a computer program using a compiler parse tree.

BACKGROUND OF THE INVENTION

Typically, computer programs are developed in a cycle of writing, compiling, executing, debugging and rewriting computer code until a satisfactory program is attained. Two types of debugging can be performed: static debugging whereby the source code comprising the computer program is analyzed and corrected for errors prior to program execution, and dynamic debugging whereby runtime errors are detected by observing the behavior of the program during execution.

A computer program can be dynamically debugged by employing a separate program or device to observe the behavior of the target computer program by monitoring memory locations. A computer program can also be dynamically debugged internally by introducing debug statements or routines into the program and observing the results during program execution. These statements can be manually introduced into the source code during the writing stage of program development. They can also be automatically introduced by a separate program at some stage in the development cycle prior to execution. The automatic introduction of debug statements or routines is known as instrumentation.

Instrumentation can be used to perform tasks useful to debugging and analyzing a computer program. These include: analyzing code coverage to determine how often each program statement is executed and how long it takes to run; analyzing variables to determine what values are taken on and how often different parts of memory are accessed; analyzing program characteristics, such as memory usage and which functions are called using which parameters; and analyzing the correct use of program code by checking various assertions that ensure that what the program is doing actually makes sense. In addition to the tasks listed above, instrumentation can be used to automatically generate test cases for dynamically testing the program. Test case data for program inputs can be generated automatically by the instrumentation which then links to a test harness program to repeatedly execute the program with different inputs.

Instrumentation can be automatically built into a computer program in a number of ways. First, instrumentation can be introduced before compilation by manipulating the source code and introducing instrumentation routines at appropriate locations. A problem with this approach is that it is slow and inefficient for large or highly complex programs.

Instrumentation can also be automatically introduced after compilation but before link editing by analyzing the relocatable object code output by the compiler. A problem with this approach is that the broader context of the target program is lost to the earlier stages of compilation. Consequently, the introduction of instrumentation must be limited to an analysis of memory locations and address pointers.

Finally, instrumentation can be automatically introduced after link editing by manipulating the executable program. This approach suffers from the same problems as with relocatable object code.

A further problem with these approaches is that the automatic introduction of instrumentation constitutes an extra stage in the program development cycle. Consequently, there is a need for a method of automatically instrumenting a computer program for dynamic debugging as an integral part of the program development cycle and without introducing an extra stage.

SUMMARY OF THE INVENTION

The present invention overcomes the above problems and pertains to a method for automatically instrumenting a computer program for dynamic debugging. More specifically, such a computer program constitutes source code written in a programming language for executing instructions on a computer. The programming language has a grammar comprising operations having an operator and at least one operand and a set of rules for relating each such operator to its respective operand(s). The method consists of the steps of providing the source code as a sequence of statements in a storage device to the computer. Each of the statements are separated into tokens representing either an operator or at least one operand.

A parse tree is built according to the set of rules using the set of tokens whereby the parse tree is a directed acyclic graph and constitutes a plurality of nodes connected by paths organized into a hierarchy of parent nodes representing operators connected to children nodes representing operands of the operators. The parse tree contains embedded error detection statements for communicating information to a runtime error-checking facility which can test for and indicate error conditions as they occur. The parse tree is instrumented to create an instrumented parse tree for indicating that an error condition occurred in the computer program during execution. Object code is generated from the instrumented parse tree and stored in a secondary storage device for later execution using an error-checking engine that indicates error conditions present in the computer program.

BRIEF DESCRIPTION OF THE DRAWINGS

The above and further advantages of this invention may be better understood by reference to the following detailed description taken in conjunction with the accompanying drawings in which:

FIG. 6 is a source code listing of a computer program containing an uninitialized read of a memory variable;

FIG. 10 is a source code listing of a computer program containing a write operation to an invalid memory address;

FIG. 14 is a source code listing of a computer program containing a dynamic memory manipulation error using a pointer memory variable;

FIG. 19 is a source code listing of a program segment containing an inappropriate use of a pointer memory variable;

FIG. 23 is a source code listing of a computer function containing a memory leak error;

FIG. 27 is a source code listing, including FIG. 27A, which is a computer function to be instrumented with an interface and FIG. 27B which is the interface routine;

FIG. 31 is a source code listing of a computer function to be instrumented for automatic test case generation;

DETAILED DESCRIPTION OF THE PREFERRED EMBODIMENT

Figure 1:
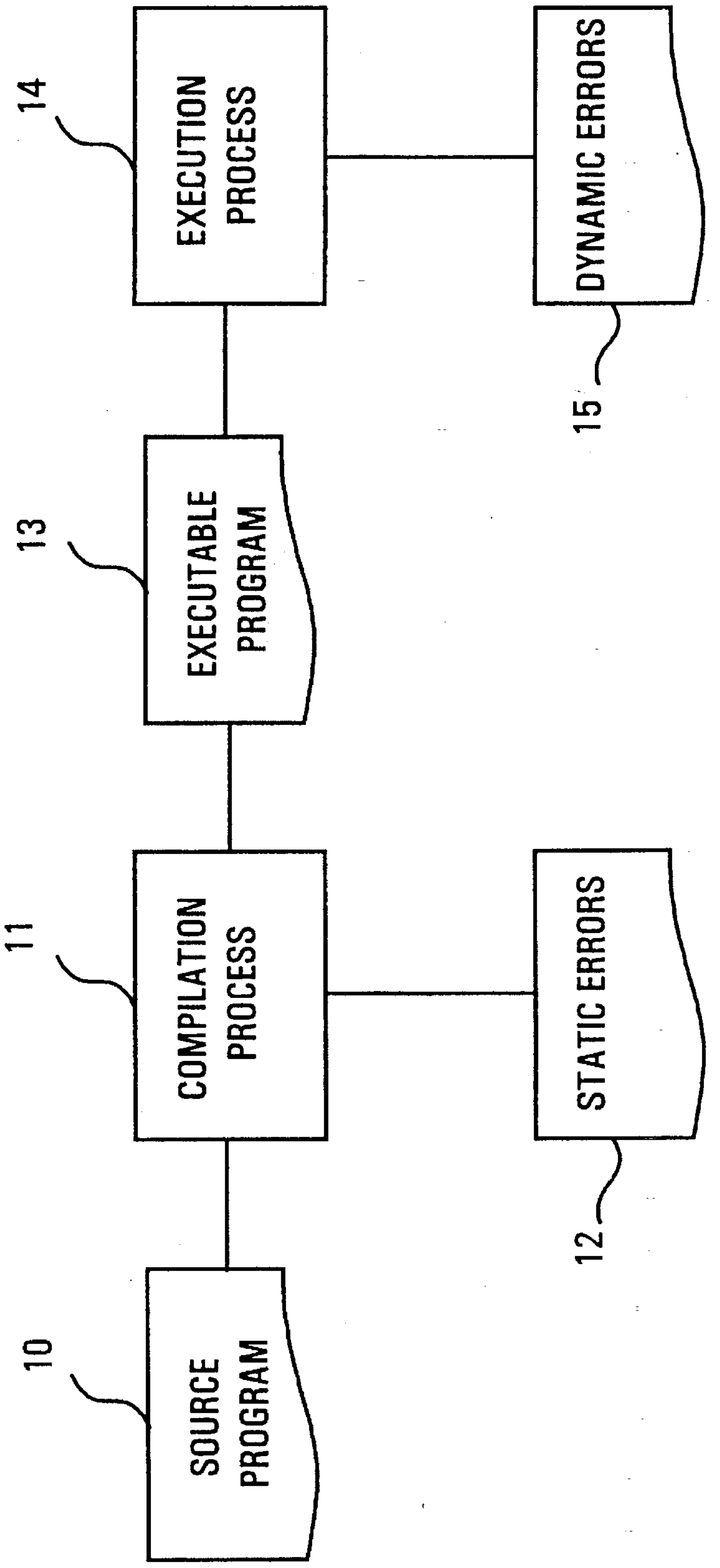
FIG. 1 is a block diagram of a process for creating and debugging a computer program.

A block diagram of a process for creating and debugging a computer program is shown in FIG. 1. A source program 10 comprising source code written in a programming language for executing instructions on a computer system is translated into an executable program 13 through a compilation process 11. The source program is translated into an equivalent program that can be run on a target computer system. The compilation process can involve compiling, interpreting or a similar translation of the source program.

The compilation process also reports to the user the presence of static errors 10 in the source program due to errors in lexicography, syntax and semantics. For instance, a string of characters can fail to form a token recognized by the programming language (lexicographic error). Or, a set of tokens may violate a structure rule that the parser is unable to construct into a branch of a parse tree (syntactic error). Or, a proper syntactic structure can be semantically incorrect because it fails to have any meaning with respect to the operation involved (semantic error).

After the static errors are resolved, the program is further evaluated during the execution process 14 which detects dynamic errors 15 based on the runtime attributes of program operation. Dynamic errors are difficult to detect since they stem from logical or conceptual errors in the drafting of the source program rather than the concrete static errors resulting from an improper expression of the program. To detect dynamic errors, the program must be instrumented with debug routines during some phase of the compilation process whereby messages indicating the presence of a dynamic error are generated for evaluation by the user.

Figure 2:
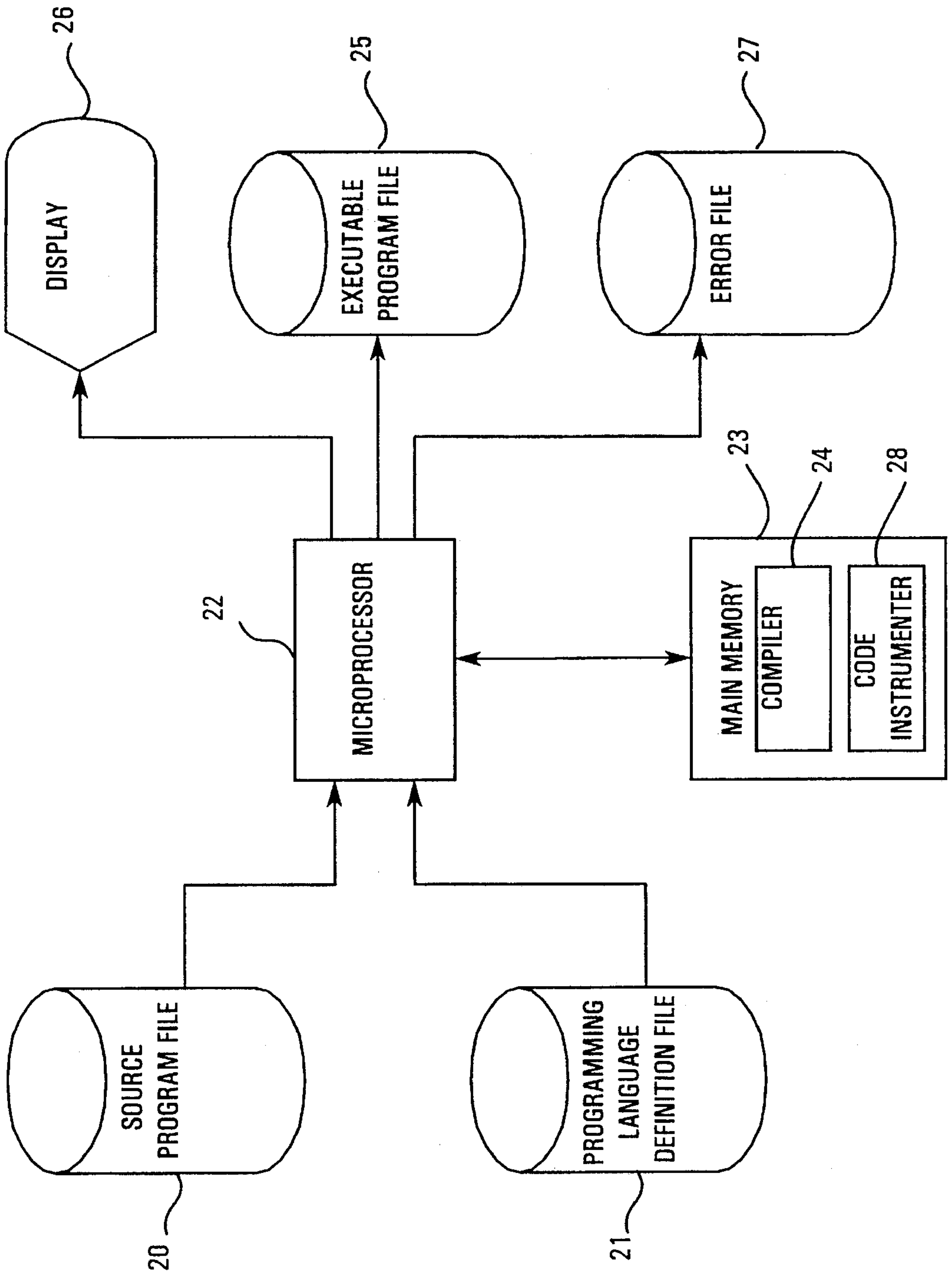
FIG. 2 is a schematic diagram of a computer system for performing a method for automatically instrumenting a computer program for dynamic debugging according to the present invention.

A schematic diagram of a computer system for performing a method for automatically instrumenting a computer program for dynamic debugging according to the present invention is shown in FIG. 2. A main memory 23 contains a compiler 24 in the form of a computer program for carrying out the steps of compiling and a code instrumenter 28 for automatically instrumenting a computer program. A microprocessor 22 runs the compiler using the source program file 20, which contains the source program 10, and the programming language definition file 21, which contains a grammar comprising operations and a set of rules. The microprocessor runs the compiler and creates an executable program file 25, which contains the instrumented executable program 13 in the form of object code.

During the execution of the compiler 24, an error may arise due to some problem with the source program. Error messages are presented to the user on a display 26 and collected and stored in an error file 27.

Source code listings for a computer program for use in one embodiment of the present invention are included in the microfiche appendix. The source code is written in C language. A description of the C language is detailed in B. W. Kernighan & D. M. Ritchie, The C Programming Language, Prentice Hall (2d Ed. 1988), the disclosure of which is hereby incorporated by reference.

The computer program of the microfiche appendix is preferably run on a Sun Microsystems SPARCstation 20 workstation running the Unix operating system. The source code listings are compiled using the instructions contained in Appendix D, the disclosure of which is hereby incorporated by reference. The resulting program is executed. Preferably, the workstation is equipped with 64 megabytes of random access memory and 4 gigabytes of secondary storage space.

Figure 3:
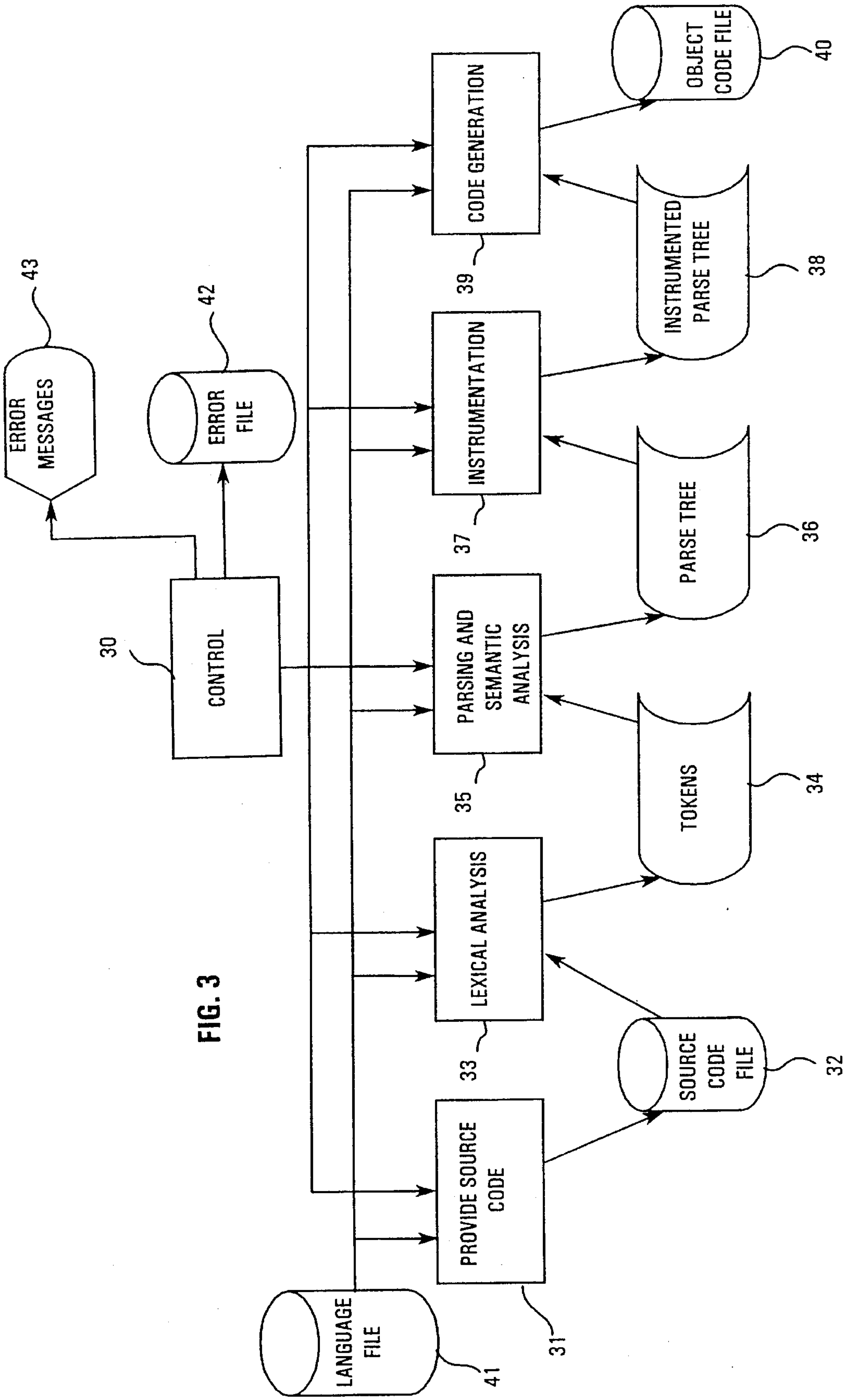
FIG. 3 is a software block and schematic diagram for a method for automatically instrumenting a computer program for dynamic debugging.

A software block and schematic diagram for a method for automatically instrumenting a computer program for dynamic debugging according to the present invention is shown in FIG. 3. One embodiment of the present invention is described in "Compiler Intermediate Code Insertion for Automatic Debugging and Test Case Generation," which is attached as Appendix A, the subject matter of which is hereby incorporated by reference as if set forth in full. The method uses a computer program consisting of five main components coordinated by a main control component 30. The source code component 31 reads a source code file 32 stored in a secondary storage device and provides it to the computer program.

A lexical analysis component 33 separates the sequence of statements making up the source code in to tokens 34 by scanning the characters comprising each statement and grouping the characters into tokens. Each token has a collective meaning in the context of the grammar defining the programming language that the source program is written in. In most programming languages, key words, operators, identifiers, constants, literal strings, and punctuation symbols (such as parentheses, commas and semicolons) are treated as tokens. The tokens 34 are stored in the main memory.

A parsing and semantic analysis component 35 groups the tokens into grammatical phrases that are used to represent the instructions to be performed by the source program. These grammatical phrases are represented by a parse tree 36, which is stored in main memory.

The parse tree describes the syntactic structure of the source program. A description of the data structures used for representing a parse tree in one embodiment of the present invention is attached as Appendix C and the subject matter of which is hereby incorporated by reference. It is a hierarchical representation of the instructions making up the program structured as a directed acyclic graph comprising a hierarchy of parent and children nodes interconnected by paths with a root node representing the program's entry point. The blueprint for creating a parse tree is provided by the rules of the programming language grammar. Each path connecting a parent node to a child node represents a relationship between an operator and its operands. A single instruction can comprise several operations and each such operation becomes a node in the parse tree. Operations can be defined recursively whereby an operation constitutes an operand for another operation.

An instrumentation component 37 reads the stored parse tree and augments the parse tree with instrumentation for use in dynamic debugging. The details of the instrumentation component are described in more detail below. It generates an instrumented parse tree 38. In a preferred embodiment of the present invention, eight categories of instrumentation are used. These include detecting a read operation to an uninitialized memory variable, detecting a read or write operation to an invalid memory address for a complex memory variable, detecting a dynamic memory manipulation error using a pointer memory variable, detecting an inappropriate use of a pointer memory variable, detecting a memory leak error, and detecting a function call argument error. These also include a user definable instrumentation routine known as an interface and an automatic test case generation routine.

For each category, an analysis is performed to determine which check or operation is appropriate and instrumentation is embedded into the parse tree. Some categories require instrumentation to be introduced in several locations in the parse tree. The result is an instrumented parse tree, which is stored in main memory.

A code generation component 39 reads the instrumented parse tree and generates an object code file 40 with the instrumentation incorporated. This component is sometimes divided into an intermediate code generator, a code optimizer, and a code generator. The intermediate code generator transforms the instrumented parse tree into an intermediate representation representing a program for an abstract machine. This representation is useful for computing expressions, handling flow of control constructs and procedure calls. The code optimizer attempts to improve the performance of the intermediate code by decreasing the running time of the executable program. Finally, the code generator creates relocatable machine code or assembly code to be output as the object code file 40. Memory locations are selected for each variable used and the intermediate instructions are translated into a sequence of machine instructions that perform the same task. These are combined and output as object code.

Throughout the operation of each component shown in FIG. 3, reference is made to a language file 41 containing the definition of grammar rules for the programming language. Similarly, errors in the source program that are detected are output to the user through error messages 43 and error file 42.

Figure 4:
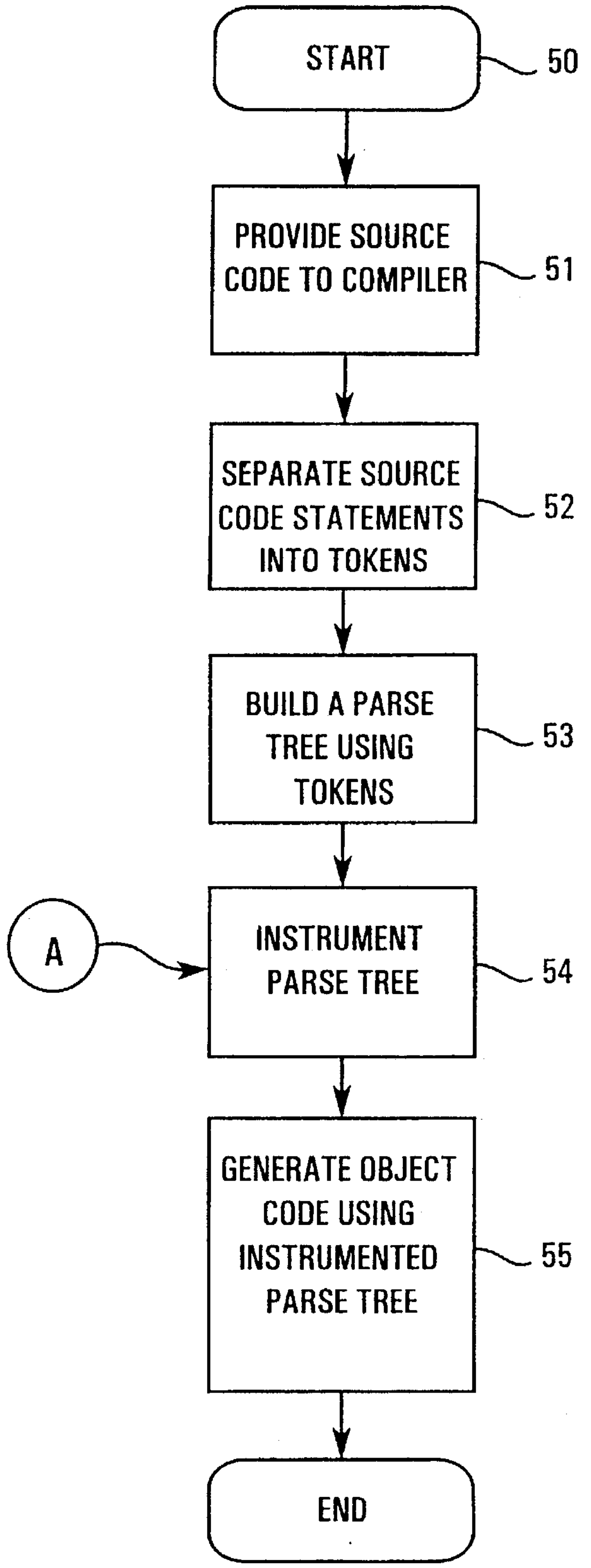
FIG. 4 is a flow chart of a preferred embodiment of the method according to the present invention.

A preferred embodiment of the compiler 24 is shown in FIG. 4. A file containing source code comprising the computer program to be instrumented is provided to the compiler (block 51). The source code is written in a programming language for executing instructions on a computer.

The programming language is defined by a grammar comprising operations having an operator (to identify the operation) and at least one operand (upon which the operation is performed). In addition, the grammar includes a set of rules for relating each of the operations to their respective operands. Preferably, the grammar is a context-free grammar having four components: a set of tokens, known as terminal symbols; a set of nonterminals; a set of productions, where each production consists of a nonterminal, an arrow, and a sequence of tokens and/or nonterminals; and a designation of one of the nonterminals as a start symbol. The productions define the set of operations comprising that grammar. Each production is structured with the nonterminal on its left side, followed by an arrow, followed by a sequence of tokens and/or nonterminals on its right side. A description of a context-free grammar is detailed in H. R. Lewis & C. H.

Papadimitriou, Elements of the Theory of Computation, Prentice-Hall (1981), the disclosure of which is hereby incorporated by reference.

Each separate source code statement is separated into tokens (block 52), each token representing a terminal symbol in the grammar. A token can be either an operator or an operand. In addition, source code comments and white space (comprising blanks, tabs and new line characters) are removed during this step.

The set of tokens is used to build a parse tree (block 53) that represents the structure of the program operations. The parse tree is structured with certain properties. This includes having a root node labeled by a start symbol, each node being labeled by a token or a null value, and each interior node being labeled with a nonterminal. For each nonterminal node, the children of that node correspond to the right-hand side of the production rule for the operation represented by the parent node. In addition to parse tree representations, other intermediate representations for organizing tokens are possible. The same approach presented herein applies to other intermediate representations as well.

Once completed, the parse tree is instrumented (block 54) to communicate runtime information to the error-checking engine to facilitate automatic detection of dynamic errors in the source program. This step requires a two-phase approach. During the first phase, the source code is analyzed using a flow analysis procedure to determine the type of instrumentation that is appropriate. During the second phase, the parse tree is augmented with additional nodes comprising the operations required to communicate runtime conditions to the error-checking engine which include appropriate checks for runtime or dynamic errors or programmatic anomalies to the error-checking engine in the form of debug output.

The instrumented parse tree is used to generate code for the target program which not only functions as was originally intended, but also contains calls to instrumentation procedures which provide automatic error detection of dynamic program errors as well as an ability to automatically generate test cases. This is accomplished by passing runtime information to the error-checking engine which is linked with the target program when the program executes.

The instrumented parse tree is used to generate object code (block 55), which is stored in a secondary storage device. The steps of separating source code into tokens (block 52), building a parse tree (block 53), and generating object code (block 55) are described in A. V. Aho et al., Compilers, Principles, Techniques and Tools, Addison-Wesley (1986), the disclosure of which is hereby incorporated by reference.

Figure 5A:
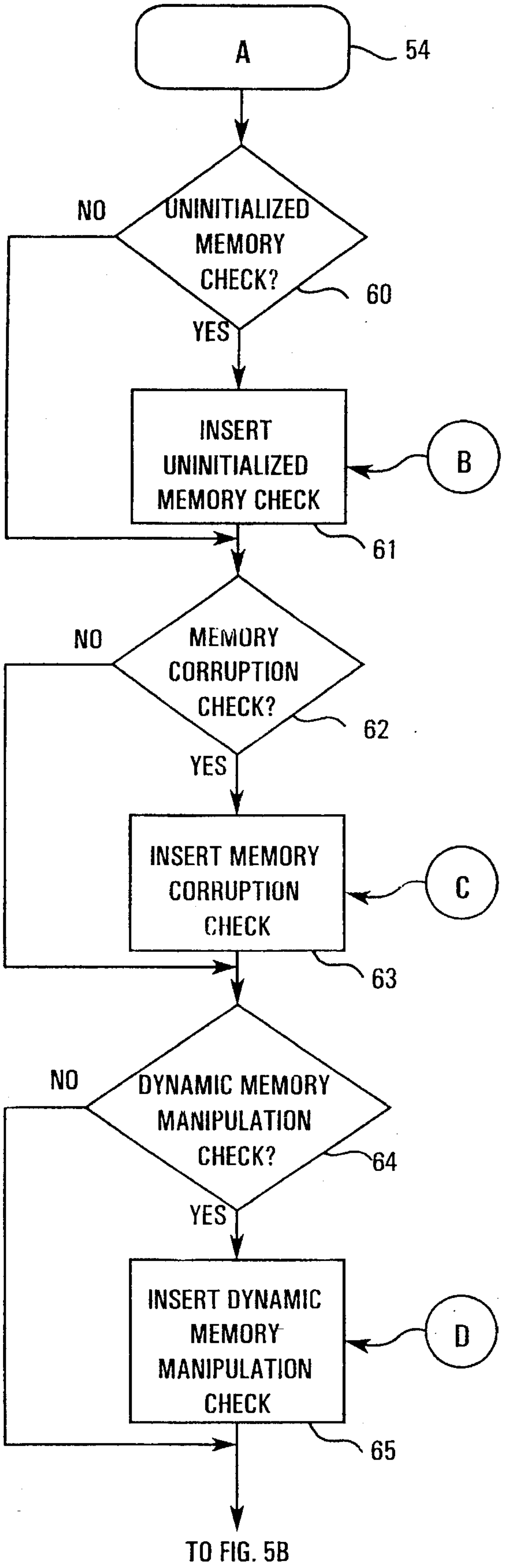
FIGS. 5A, 5B and 5C are a flow chart of a routine for determining the instrumentation to augment a parse tree.
Figure 5B:
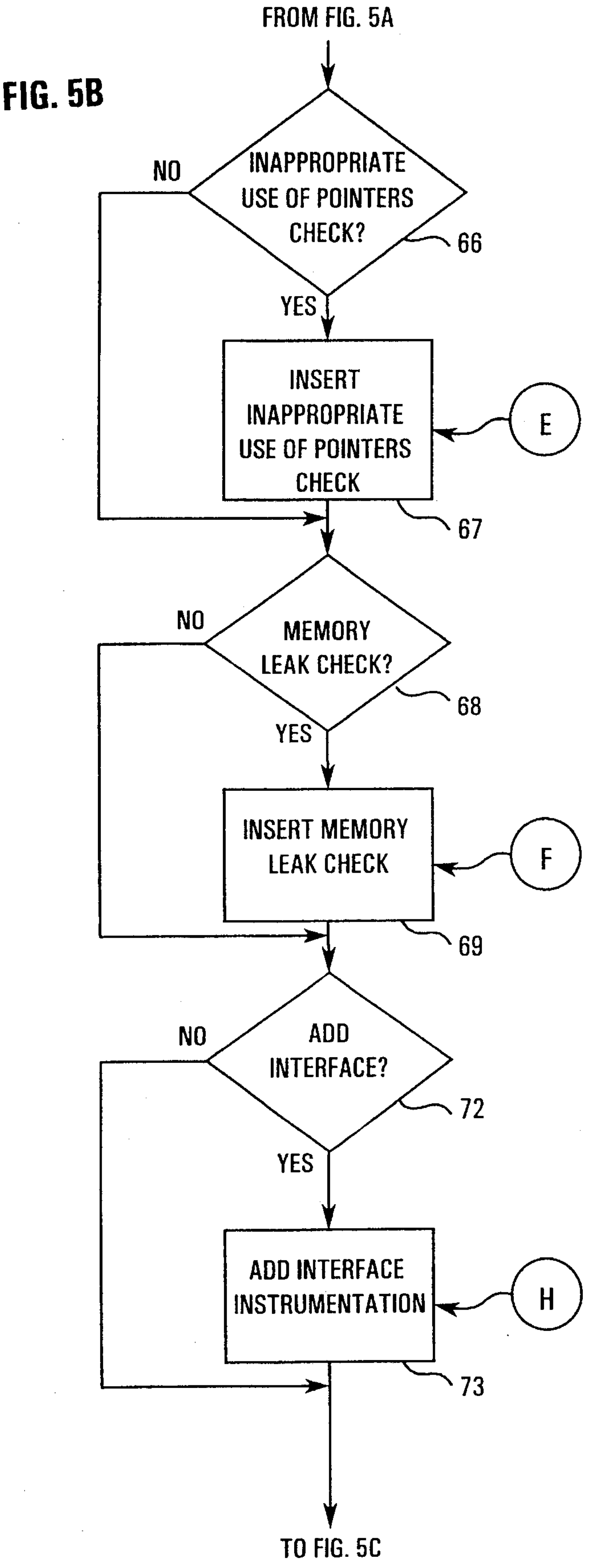
Figure 5C:
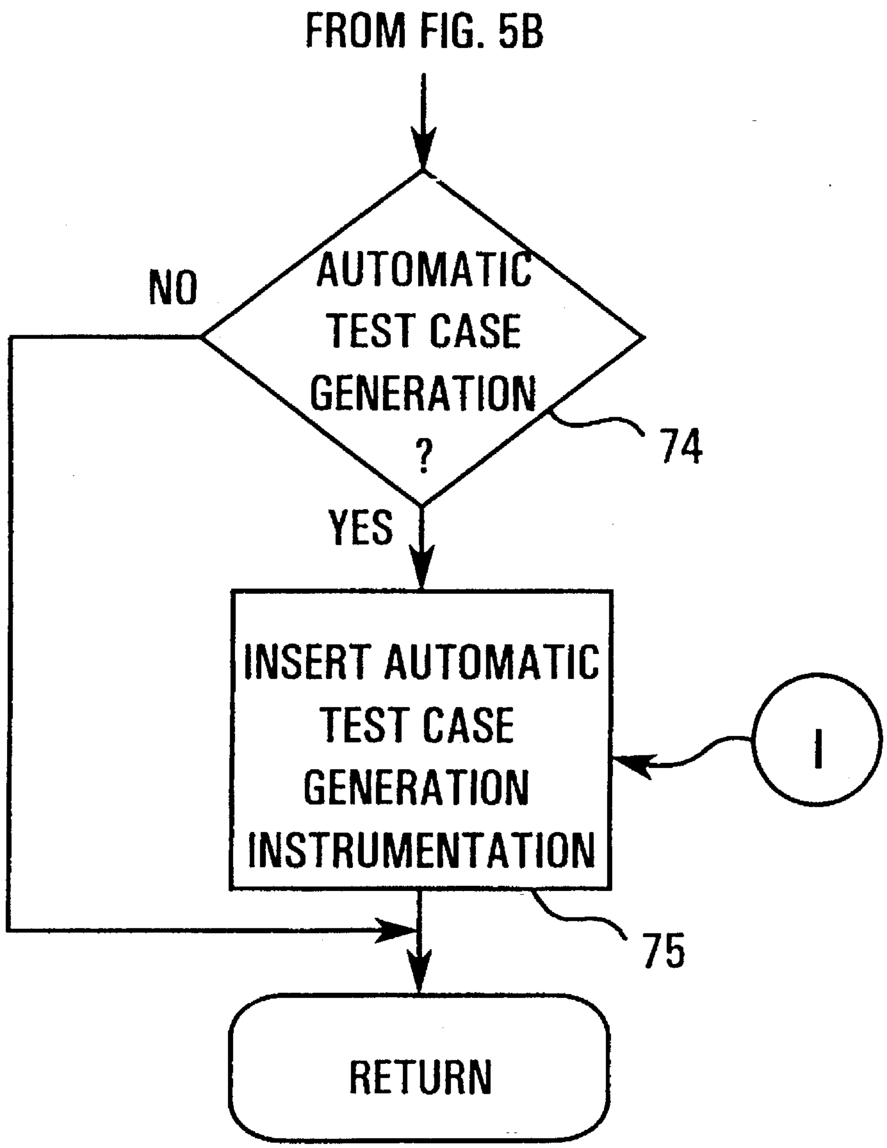

Referring to FIGS. 5A, 5B and 5C, a routine for instrumenting a parse tree according to the present invention is shown. A step-wise procedure is followed to insert each of the seven categories of instrumentation into the parse tree. Thus, nodes are inserted for detecting a read operation to an uninitialized memory variable (block 61), detecting a write operation to an invalid memory address for a complex memory variable (block 62), detecting a dynamic memory manipulation error using a pointer memory variable (block 65), detecting an inappropriate use of a pointer memory variable (block 67), detecting a memory leak error (block 69), inserting a user-defined instrumentation routine (interface) (block 73), and inserting an automatic test case generation routine (block 75).

The seven categories of instrumentation perform checks or augment the functionality of the original source code. In addition, other information is communicated to the error-checking engine through the instrumented code. This consists of declarations of variables and pointer addresses and their sizes, assignments of pointers, function entry and exit point indicators, and memory allocation indicators.

The first category of dynamic memory error is the use of uninitialized memory variables. This means that a memory variable is declared, but is not yet assigned a value before it is used by some other statement in the program. Referring to FIG. 6, a source code listing of a computer program containing an uninitialized read of a memory variable is shown. On line 3, an integer variable "i" s defined. On line 4, the variable "i" is read. Since variable "i" is uninitialized, a dynamic error occurs at runtime.

Figure 7:
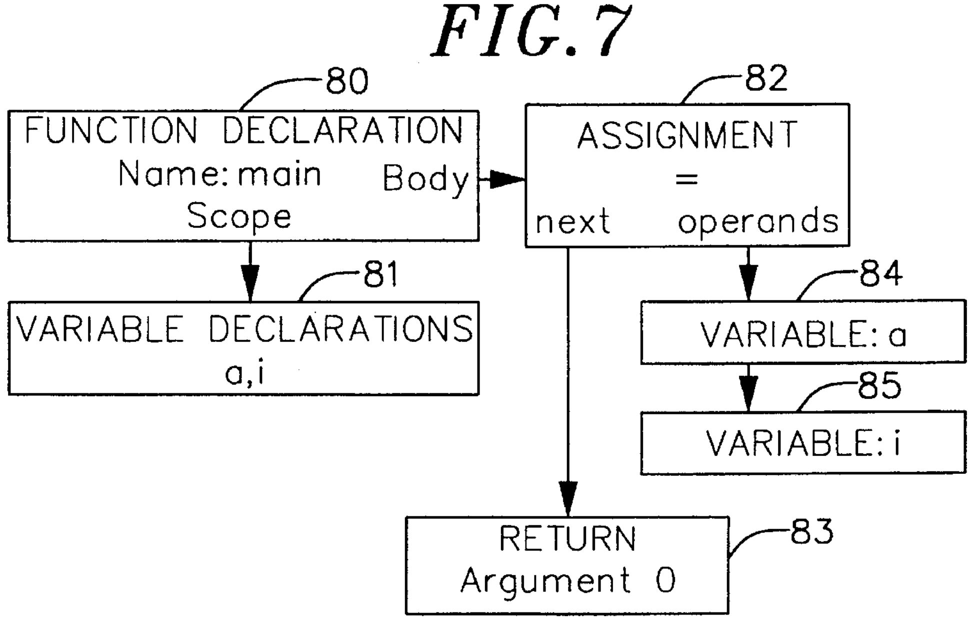
FIG. 7 is a diagram illustrating a parse tree representation of the source code listing in FIG. 6.

Referring to FIG. 7, a diagram illustrating a parse tree representation of the source code listing in FIG. 6 is shown. The function declaration (lines 1, 2 and 6) is represented by function declaration node 80. The declaration of variables "a" and "i" (line 3) is represented by variable declarations node 81. The assignment operation (line 4) is represented by assignment node 82 which is followed by return node 83 (corresponding to line 5). The assignment operation (line 4) has two operands, variables "a" and "i", represented respectively by variable nodes 84 and 85. To detect the use of the uninitialized memory variable "i" (line 4), the parse tree shown in FIG. 7 must be instrumented with debugging functionality so that the attempted assignment statement using variable "i" can be automatically detected by the error checking engine when the program is executed.

The overall criteria for inserting such an error check is as follows. If there is a memory variable used in a program expression that is not known to have been assigned a value previously, an error check is inserted into the parse tree to check that variable during execution. In addition, an error check is inserted to let the error-checking engine know that the variable at that particular address in memory is initially uninitialized at the start of execution.

Figure 8A:
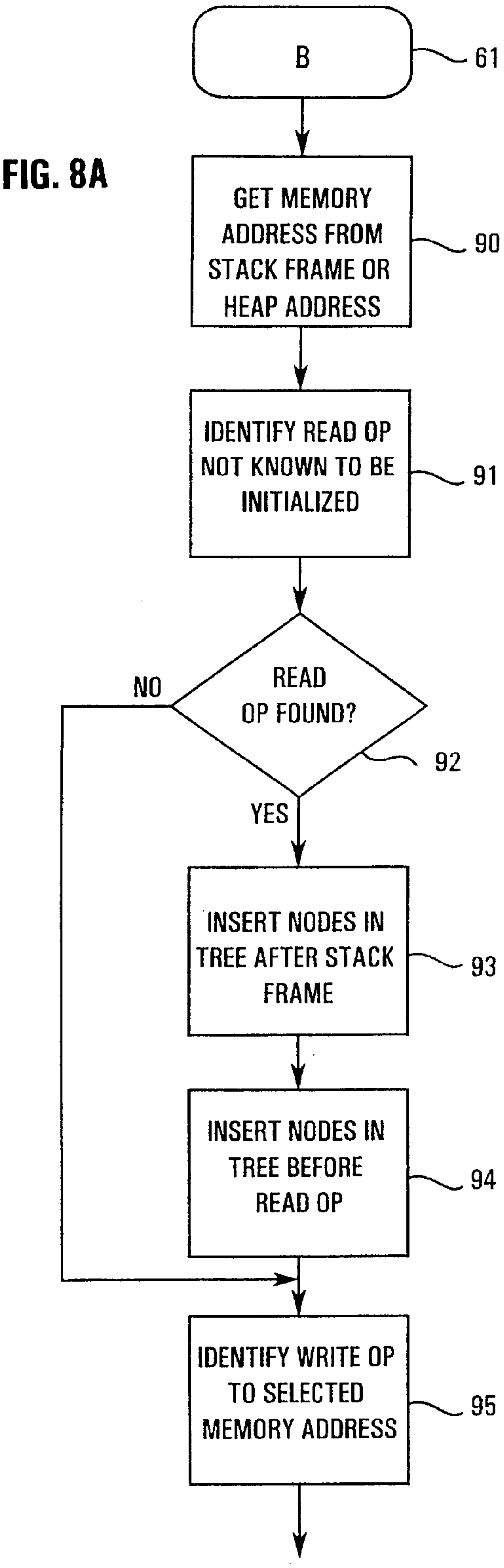
FIGS. 8A and 8B are a flow chart for a routine for detecting an uninitialized read of a program variable error condition.
Figure 8B:
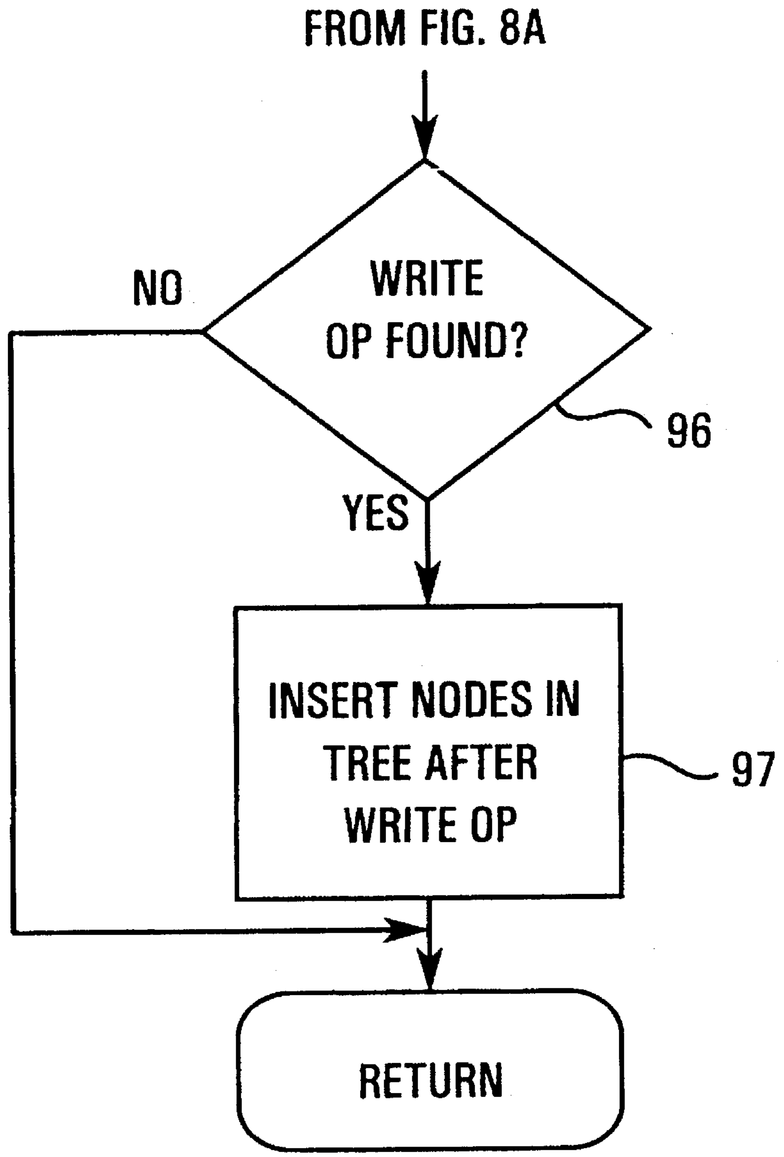

Referring to FIGS. 8A and 8B, a flow chart for a routine for detecting an uninitialized read of a memory variable error condition is shown. First, a memory address is retrieved from a program stack frame (block 90) which represents memory locations of local memory variables. A flow analysis is performed on the source code to identify any read operation to the memory address for which it cannot be statically determined that the variable has been previously initialized (block 91). If a read operation is found (block 92), instrumentation nodes are inserted into the parse tree in two locations. First, nodes are inserted after the parse tree node corresponding to the stack frame containing the memory address for the program variable to be checked (block 93). These nodes are for setting an internal indication to the error-checking engine that the memory variable is uninitialized. Second, instrumentation nodes are inserted into the parse tree before the read operation (block 94) to indicate to the error-checking engine that the memory variable being read by the read operation is either initialized or uninitialized at that point in program execution. These nodes determine the status of the memory variable by referring to the indication set by the instrumentation nodes for the stack frame.

Next, a flow analysis is performed on the source code to identify a write operation to the memory .address for the program variable being checked, since any write operation will cause the memory variable in question to be initialized (block 95). If a write operation is found (block 96), instrumentation nodes are inserted into the parse tree after the nodes corresponding to the write operation for setting an indication used by the error-checking engine to indicate that the memory variable in question is initialized (block 97).

Figure 9:
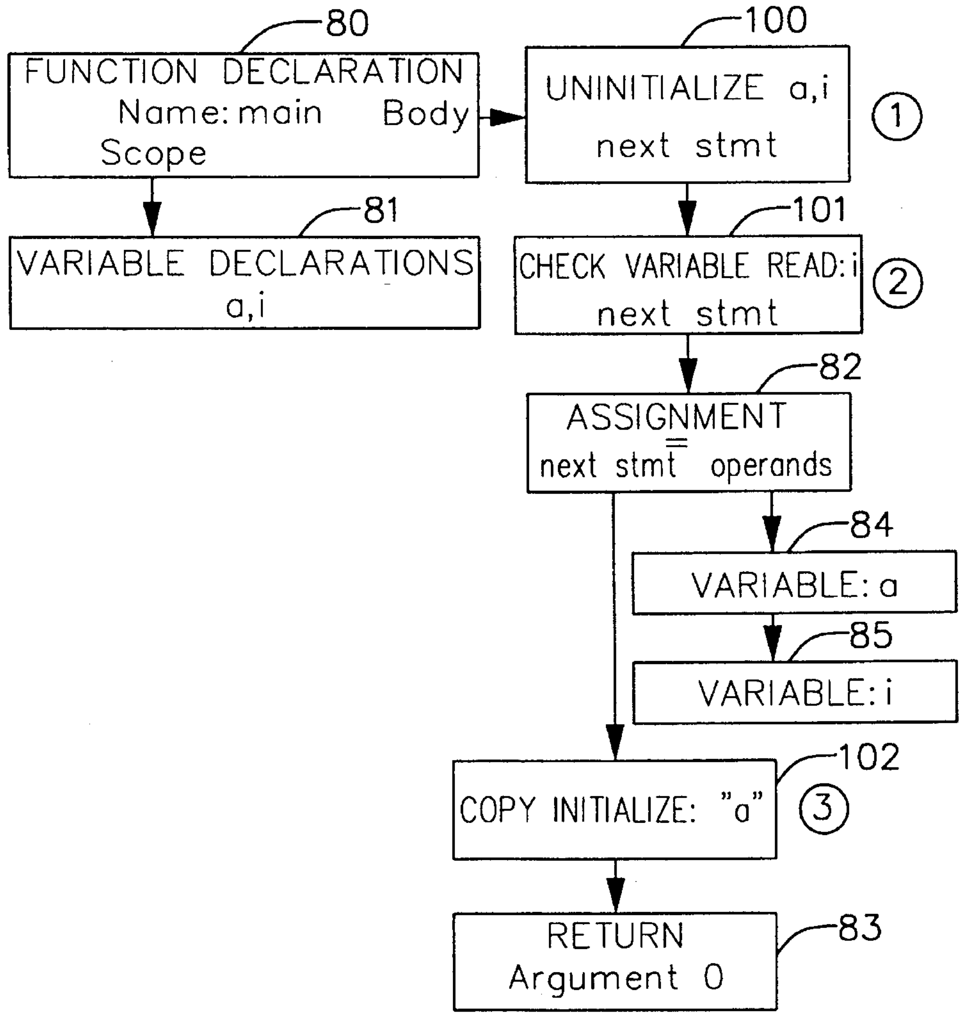
FIG. 9 is a diagram illustrating an instrumented parse tree representation of the source code listing shown in FIG. 6.

Referring to FIG. 9, a diagram illustrating an instrumented parse tree representation of the source code listing shown in FIG. 6 is shown. The instrumentation nodes for the stack frame are inserted as uninitialized node 100. The instrumentation nodes for the read operation are inserted as check variable read node 101. The instrumentation nodes for the write operation are inserted as copy initialize node 102. Uninitialized node 100 indicates to the error-checking engine that the variables "a" and "i" are uninitialized. Check variable read node 101 indicates to the error-checking engine that an actual check for the uninitialized variable "i" should be performed. Finally, copy initialize node 102 indicates to the error-checking engine that the variable "a" is being assigned a value which initializes it by copying a value from some other memory location.

The second category of dynamic error is a write operation to an invalid memory address for a complex memory variable. This is also known as memory corruption which occurs when a program writes to a location in memory that is not valid. For instance, this can happen as a result of writing off of the end of an array. Similarly, it can happen as result of writing to a location in memory that falls outside of the range of memory locations allocated to a complex memory variable, such as a structure.

A complex memory variable comprises a plurality of elements, each of which can be a constant value, a simple memory variable or a complex memory variable. An array comprises a plurality of identical elements, each of which can be constant value, a simple memory variable, or a complex memory variable.

Referring to FIG. 10, a source code listing of a computer program containing a write operation to an invalid memory address is shown. An array "A" is defined comprising ten integer elements (line 3). Each of these ten elements are initialized to 0 (line 5) using a loop beginning at an index value of 1 (lines 4 and 6). The valid indices for the array "A" are 0 through 9. However, the loop begins with an index "i" equaling 1 that is incremented during each successive iteration until the index "i" equals 10 (line 4). Thus, in the tenth iteration, the program attempts to set array element A[10] to 0. This is invalid since array "A" does not have an index value of 10 and therefore an overwrite dynamic error occurs.

Figure 11:
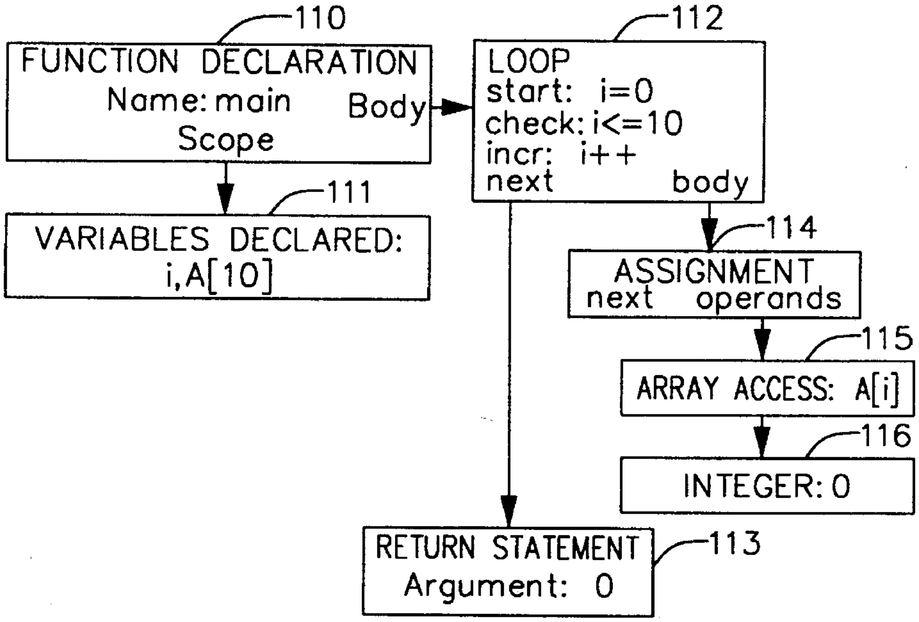
FIG. 11 is a diagram illustrating a parse tree representation of the source code listing in FIG. 10.

Referring to FIG. 11, a diagram illustrating a parse tree representation of the source code listing in FIG. 10 is shown. The function declaration (lines 1, 2 and 8) is represented by function declaration node 110. The declaration of index variable "i" and array "A" which has 10 elements (line 3) is represented by variable declarations node 111. The loop operation (lines 4 and 6) is represented by loop node 112 which is followed by return node 113 (corresponding to line 7). The assignment operation (line 5) has two operands, an array element "A[i]" and an integer constant 0, represented respectively by nodes 115 and 116.

To detect an array operation that is attempting to access an invalid memory location, the parse tree shown in FIG. 11 must be instrumented with debugging functionality so that the error can be automatically detected by the error-checking engine when the program is executed. Here, the array operation is an assignment to element A[10] on line 5 of the program. Element A[10] is out of bounds.

The overall criteria for inserting this type of error check is as follows. For arrays, the array variable and its size must be declared to the error-checking engine. For each write operation to that array, the error-checking engine must check if the index into the array is valid. For complex memory variables, a similar declaration must be made to the error-checking engine; however, the engine must perform a test for whether the memory address being written to falls outside of a valid memory address range defined by the dimension operand used to declare the memory block size for the complex memory variable.

Figure 12:
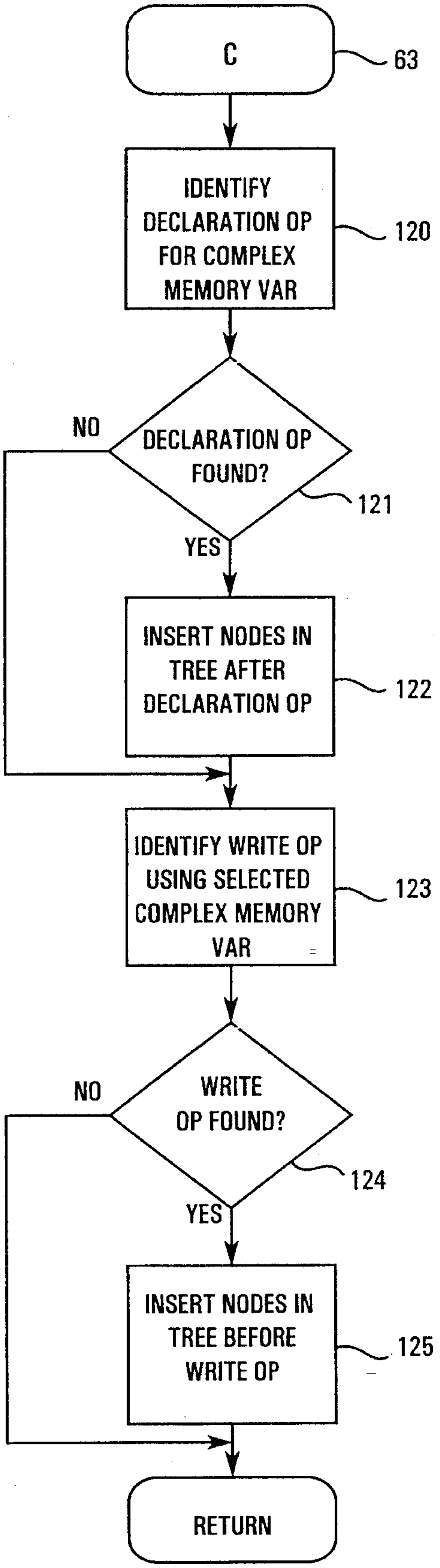
FIG. 12 is a flow chart for a routine for detecting a write operation to an invalid memory address for a complex memory variable error condition.

Referring to FIG. 12, a flow chart for a routine for detecting a write operation to an invalid memory address for a complex memory variable error condition is shown. This involves a more general error check than for an array and is therefore presented initially.

First, a flow analysis is performed on the source code to identify a declaration operation for a complex memory variable (block 120). Such a variable comprises a plurality of elements, each of which can be a constant value, a simple memory variable or a complex memory variable. A declaration operation for a complex memory variable comprises two components: an identifier operand for identifying the variable and a dimension operand for identifying a memory block size. If a declaration operation is found (block 121), instrumentation nodes are inserted after the parse tree node corresponding to the declaration operation (block 122). These nodes are for storing the dimension operand for use by the error-checking engine during execution.

Next, a flow analysis is performed on the source code to identify a write operation using the complex memory variable being checked (block 123). If a write operation is found (block 124), instrumentation nodes are inserted into the parse tree before the nodes corresponding to the write operation (block 125). During execution, the error-checking engine can indicate that the write operation is writing to an invalid memory address falling outside of the memory address range defined by the stored dimension operand.

To check for a write to an invalid array memory location, an additional step is required to those shown in FIG. 12. It comprises augmenting the last step with inserting instrumentation nodes into the parse tree to further indicate to the error-checking engine that a write operation is being performed on an array element falling outside of the range of valid array indices.

Figure 13:
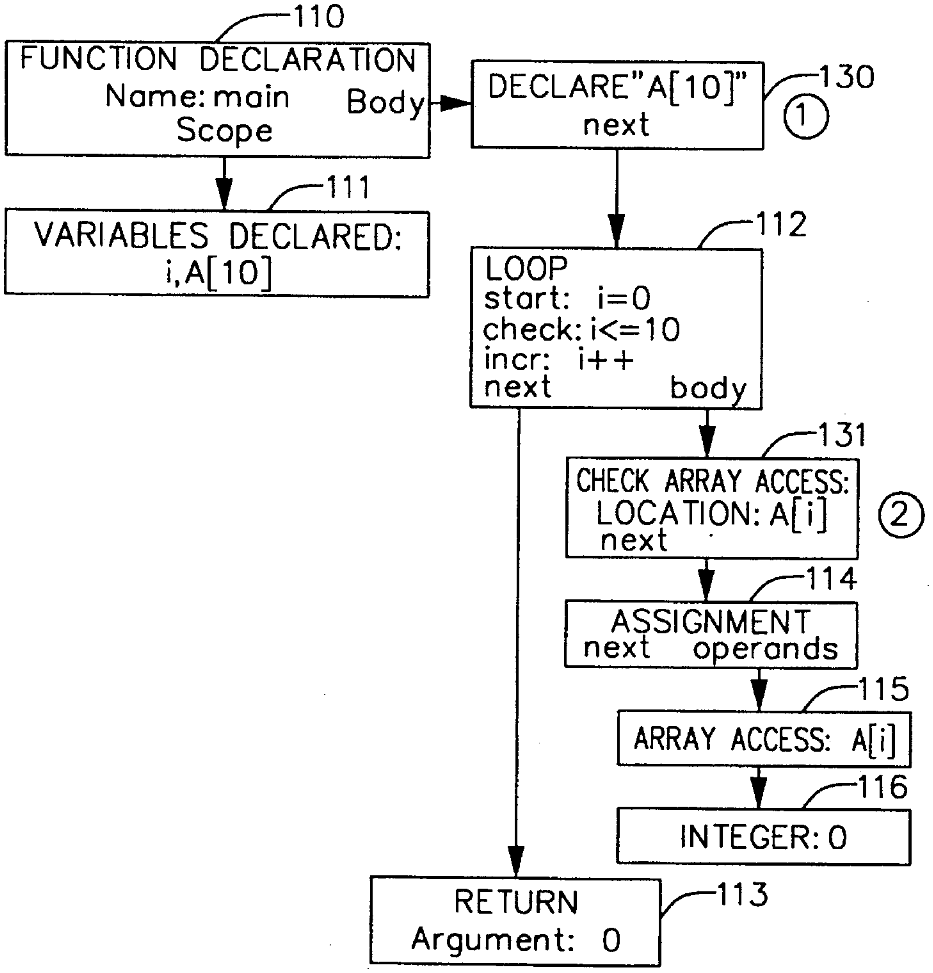
FIG. 13 is a diagram illustrating an instrumented parse tree representation of the source code listing shown in FIG. 10.

Referring to FIG. 13, a diagram illustrating an instrumented parse tree representation of the source code listing shown in FIG. 10 is shown. The instrumentation nodes for the declaration operation are inserted as declare node 130. The instrumentation nodes for the write operation are inserted as check array access node 131. Declare node 130 indicates to the error-checking engine that the array "A" is declared and contains ten elements. Since the present program is written in C language and array indices begin with 0, the range of valid indices for array "A" are from 0 through 9. The check array access node 131 indicates to the error-checking engine that a write operation is being performed on an element of array "A" and that the value of the index, here index "i", should be checked to determine whether it falls within the range of valid array indices.

The third category of dynamic error is a dynamic memory manipulation error using a pointer memory variable. This occurs when memory pointers no longer reflect the actual layout of memory due to problems with dynamic memory manipulation. This often involves a "dangling pointer" which is a memory pointer which points to a block of memory that has since been "freed," that is, deallocated. While the memory pointer still points to the address of the same freed memory block, the address is no longer a representative of the dynamic state associated with the original pointer assignment. Six types of errors can occur, such as reading from or writing to a dangling pointer, passing a dangling pointer as an argument of a function, returning a dangling pointer from a function, freeing the same memory block multiple times, freeing stack memory (local variables), and attempting to free a memory block using a pointer that does not point to the beginning of a valid memory block.

Referring to FIG. 14, a source code listing of a computer program containing a dynamic memory manipulation error using a pointer memory variable is shown. A pointer memory variable "ptr" is defined (line 3). Next, a 10-character memory block is allocated and its pointer assigned to pointer memory variable "ptr" (line 4). The pointer memory variable "ptr" is incremented (line 5) and an attempt is made to free the memory block that it points to (line 6). However, the attempt can ultimately lead to memory corruption since pointer memory variable "ptr" no longer points to the start of the memory block that was originally assigned to it. Therefore, a dynamic memory manipulation error occurs.

Figure 15:
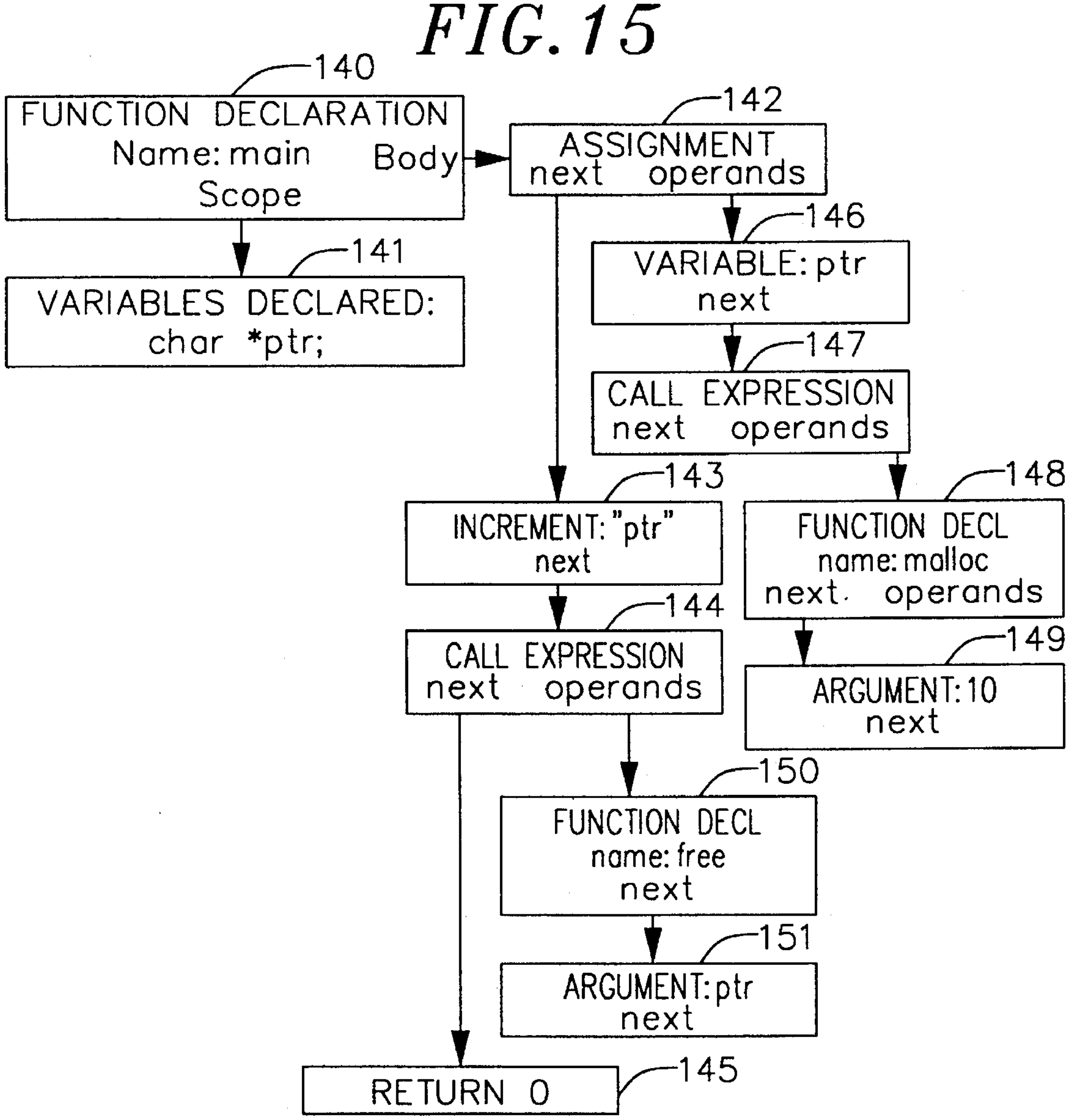
FIG. 15 is a diagram illustrating a parse tree representation of the source code listing in FIG. 14.

Referring to FIG. 15, a diagram illustrating a parse tree representation of the source code listing in FIG. 14 is shown. The function declaration (lines 1, 2 and 8) is represented by function declaration node 140. The declaration of pointer memory variable "ptr" (line 3) is represented by variable declaration node 141. The allocation of the 10-character memory block is represented by call expression node 147, which has two operands, a function declaration and an argument, represented respectively by nodes 148 and 149. The result from this function call is assigned to the pointer memory variable (line 4), which is represented by assignment node 142. This node has two operands, a pointer memory variable and the function call, represented respectively by nodes 146 and 147. The pointer increment operation (line 5) is represented by node 143. The free memory block operation (line 6) is represented by node 144, which has two operands: a function call declaration and an argument, represented respectively by nodes 150 and 151. The return operation (line 7) is represented by node 145.

Figure 16A:
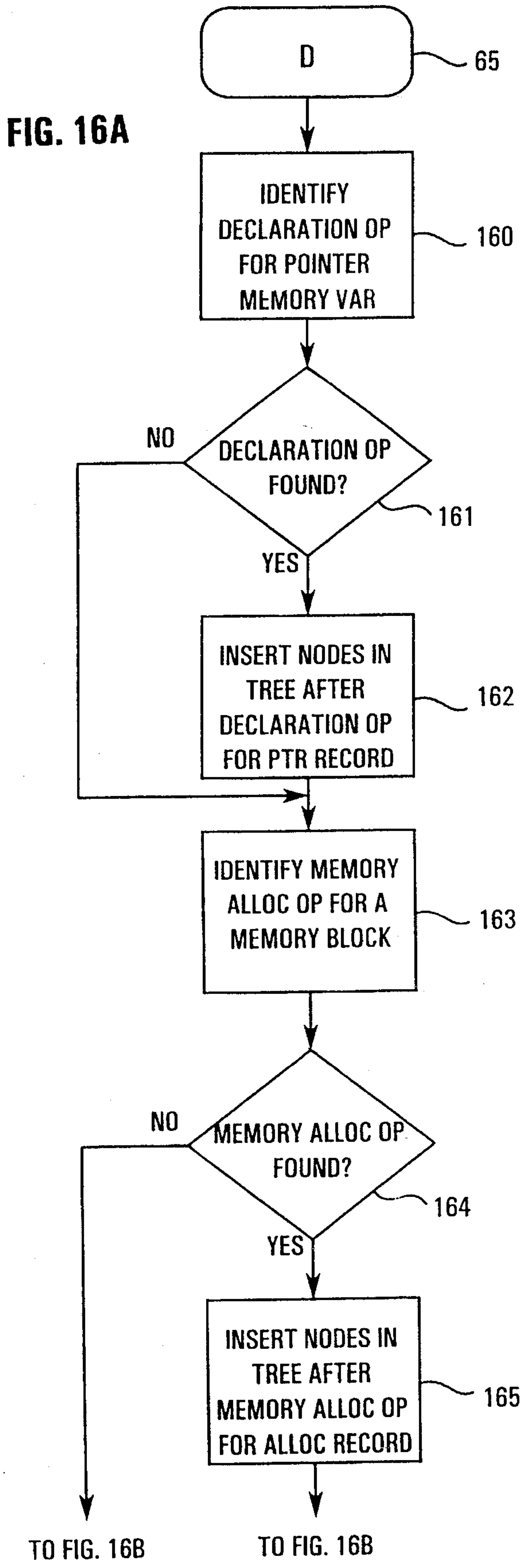
FIGS. 16A and 16B are a flow chart of a routine for detecting a dynamic memory manipulation error using a pointer memory variable error condition.
Figure 16B:
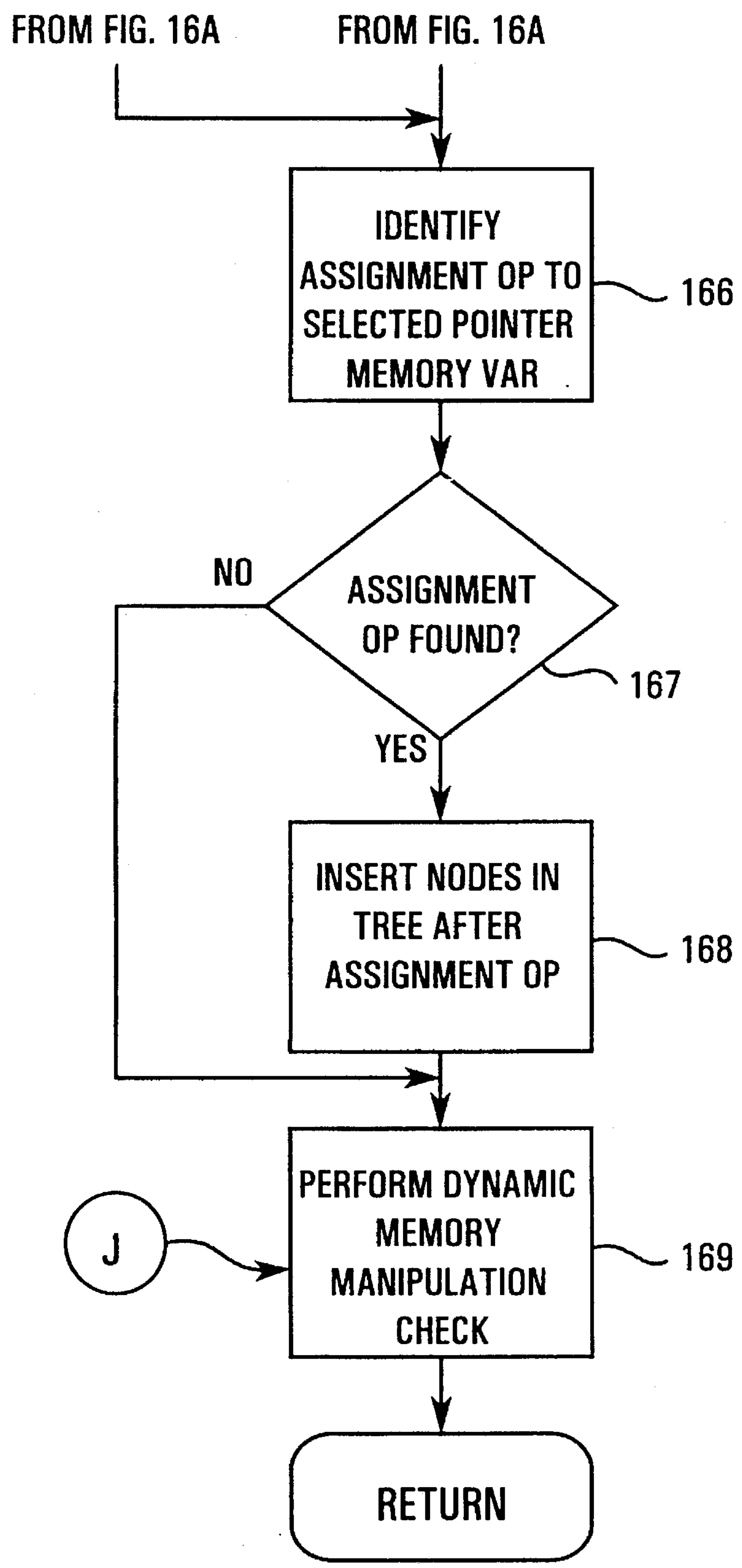

Referring to FIGS. 16A and 16B, a flow chart for a routine for detecting a dynamic memory manipulation error using a pointer memory variable error condition is shown. This involves a more general error check than for the six specific types of memory manipulation errors listed above and is therefore presented initially.

First, a flow analysis is performed on the source code to identify a declaration operation for a pointer memory variable (block 160), comprising an identifier operand for identifying the variable. If a declaration operation is found (block 161), instrumentation nodes are inserted after the parse tree node corresponding to the declaration operation (block 162). These nodes are for storing in a pointer record a value field for a memory address contained in the pointer memory variable during execution. Initially, the pointer memory variable points to nothing and the pointer record is therefore empty.

A flow analysis is then performed on the source code to identify a memory allocation operation for allocating a memory block to the pointer memory variable being checked (block 163). If a memory allocation operation is found (block 164), instrumentation nodes are inserted into the parse tree after the nodes corresponding to the memory allocation operation (block 165). These nodes are for storing an allocation record for use by the error-checking engine during execution. Each allocation record contains the following information: block size, starting memory address for the block, addresses of memory pointers that point to the memory block, a list of memory pointers that are contained within the memory block, and state information regarding the memory block.

Next, a flow analysis is performed on the source code to identify an assignment operation to the selected pointer memory variable (block 166). If an assignment operation is found (block 167), instrumentation nodes are inserted into the parse tree after the nodes corresponding to the assignment operation (block 168). These nodes are for indicating to the error-checking engine that the pointer memory variable may contain a different and possibly invalid memory address.

Figure 17A:
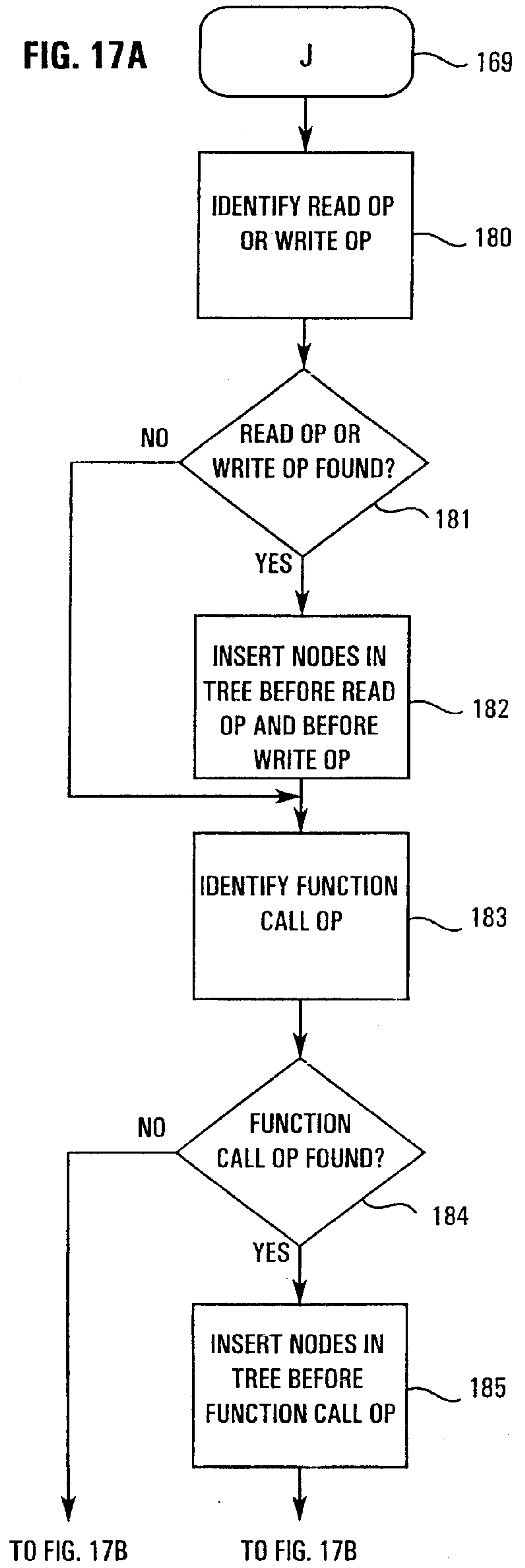
FIGS. 17A and 17B are a flow chart of a routine for performing a dynamic memory manipulation check.
Figure 17B:
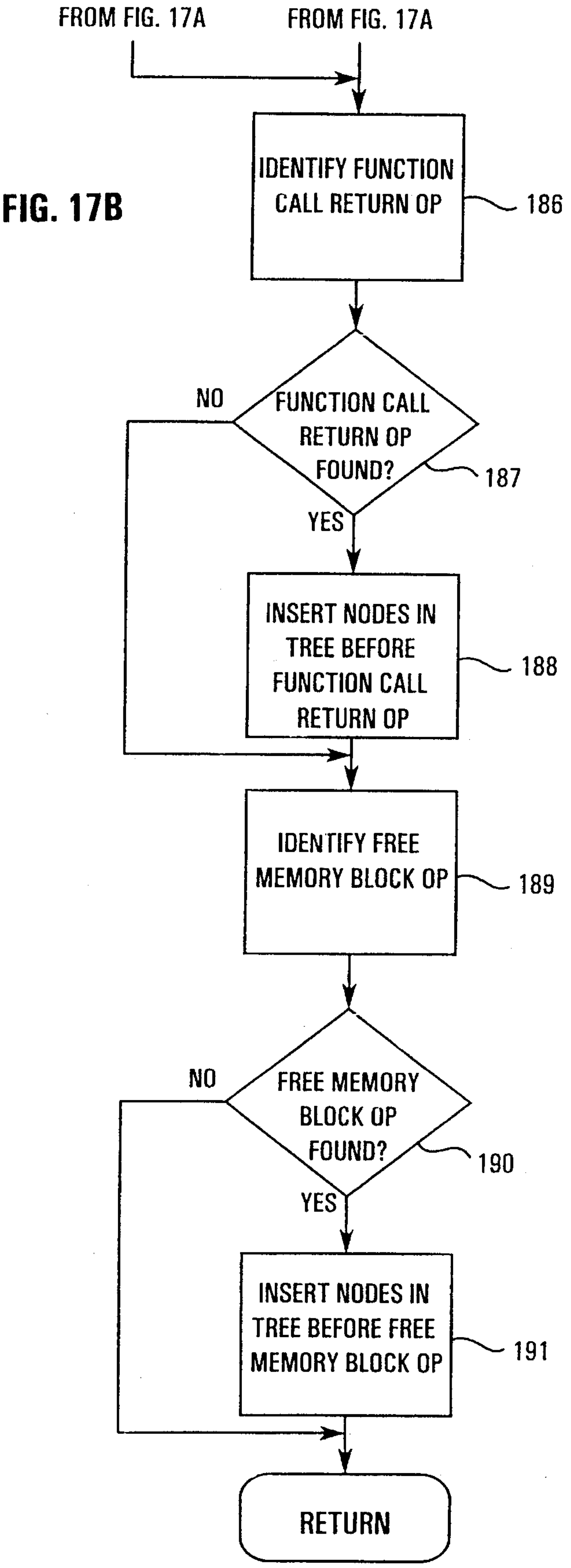

The previous steps having been accomplished, the routine can therefore perform a dynamic memory manipulation check (block 169). Referring to FIGS. 17A and 17B, a flow chart for a routine for performing a dynamic memory manipulation check is shown. This performs the six types of dynamic memory manipulation checks listed previously.

A flow analysis is performed on the source code to identify a read operation or a write operation using the pointer memory variable being checked (block 180). If a read operation or a write operation is found (block 181), instrumentation nodes are inserted into the parse tree before the nodes corresponding to the read operation or the write operation (block 182). During execution, the error-checking engine can indicate that the read operation or the write operation is attempting to operate on a pointer memory variable when it contains a dangling pointer, this is, a memory address for a freed memory block.

Next, a flow analysis is performed on the source code to identify a function call operation using the pointer memory variable being checked (block 183). If a function call operation is found (block 184), instrumentation nodes are inserted into the parse tree before the nodes corresponding to the function call operation (block 185). During execution, the error-checking engine can indicate that the function call operation is calling a function using a pointer memory variable containing a memory address for a freed memory block.

Next, a flow analysis is performed on the source code to identify a function call return operation using the pointer memory variable being checked (block 186). If a function call return operation is found (block 187), instrumentation nodes are inserted into the parse tree before the nodes corresponding to the function call return operation (block 188). During execution, the error-checking engine can indicate that the function call return operation is returning a memory address for a freed memory block to the calling function in the computer program.

Finally, a flow analysis is performed on the source code to identify a free memory block operation using the pointer memory variable being checked (block 189). If a free memory block operation is found (block 190), instrumentation nodes are inserted into the parse tree before the nodes corresponding to the free memory block operation (block 191). During execution, the error-checking engine can indicate that the free memory block operation is attempting to free a memory block multiple times by using a pointer memory variable pointing to an already freed memory block or is attempting to free a stack frame (local variables) or is attempting to free a memory block when the memory address does not equal the starting memory address of the memory block.

Figure 18:
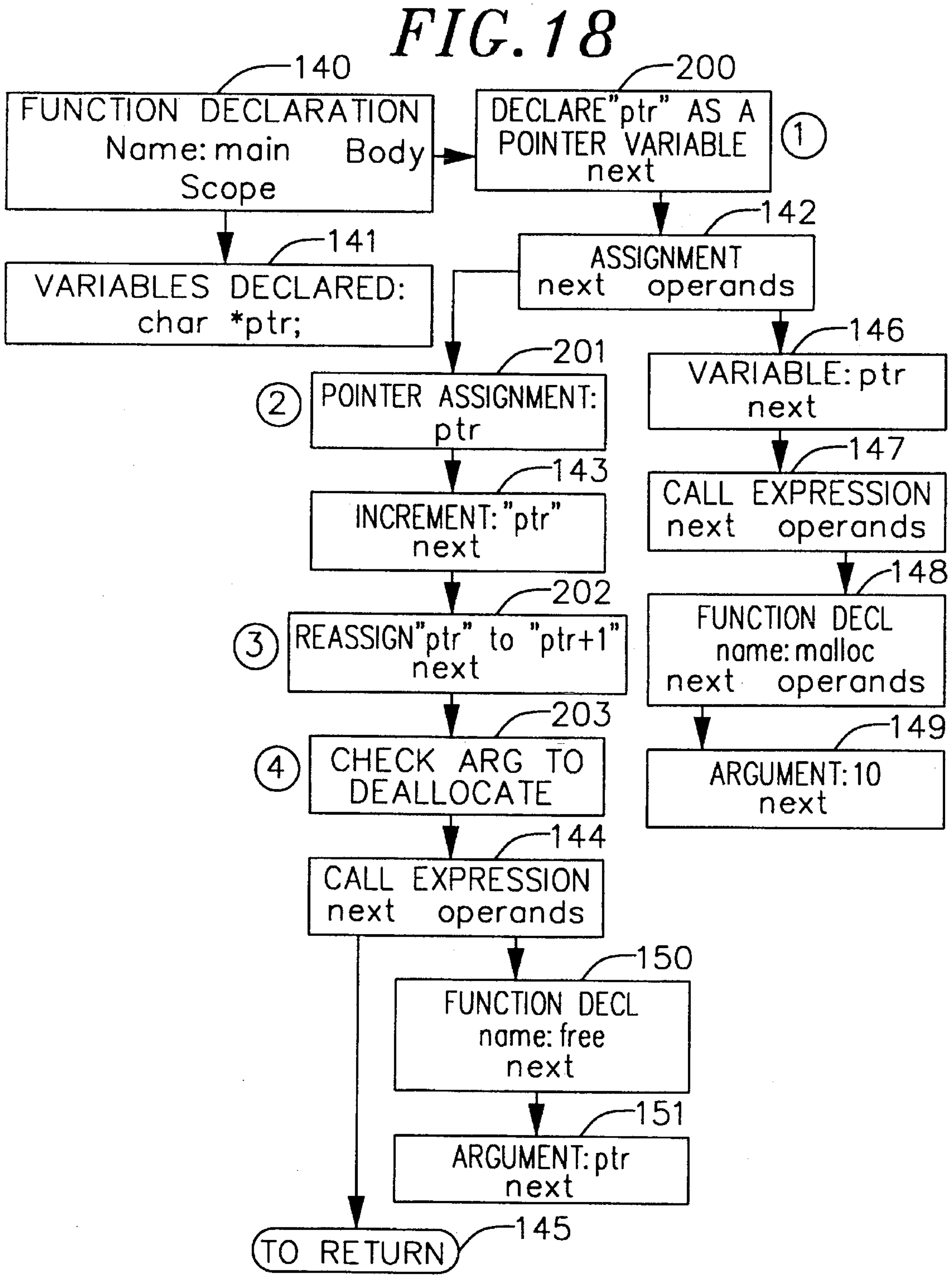
FIG. 18 is a diagram illustrating an instrumented parse tree representation of the source code listing shown in FIG. 14.

Referring to FIG. 18, a diagram illustrating an instrumented parse tree representation of the source code listing in FIG. 14 is shown. The instrumentation nodes for the declaration operation are inserted as declare node 200. The instrumentation nodes for the assignment operation are inserted as pointer assignment node 201. Similarly, the instrumentation nodes for a further assignment operation are inserted as reassign node 202. Finally, the instrumentation nodes for the pre-memory block operation inserted as check arg to deallocate node 203. Declaration node 200 indicates to the error-checking engine that the pointer memory variable "ptr" is declared and uninitialized. The pointer assignment node 200 and reassign node 202 indicate to the error-checking engine that the pointer memory variable "ptr" has been initialized and incremented, respectively. The check arg to deallocate node 203 indicates to the error-checking engine that the program is attempting to free the memory pointed to by the pointer memory variable "ptr."

The fourth category of dynamic error is an inappropriate use of a pointer memory variable. Five types of errors can occur, comprising a pointer operation on a null pointer, a pointer operation on an uninitialized pointer, a pointer operation on a pointer that does not point to valid data, a pointer operation attempting to compare or otherwise relate memory pointers that fail to point to the same type of data object, and an attempt to make a function call using a function pointer that does not point to a function.

Referring to FIG. 19, a source code listing of a program segment containing an inappropriate use of a pointer memory variable is shown. Two long integer pointers "a" and "b" and a pointer to a function returning a long integer "foo" are defined (line 1). Next, the memory address of variable "a" is assigned using a cast to a pointer to a function returning a long integer "foo" (line 2). Finally, the return value of a function call to "foo" is assigned to variable "b" (line 3). This code segment is problematic because the function pointer "foo" actually points to a location in the program stack representing the memory block assigned to variable "a" instead of an appropriate entry point in the code segment. Therefore, the function pointer "foo" has been inappropriately used and a pointer memory variable error condition occurs.

Figure 20:
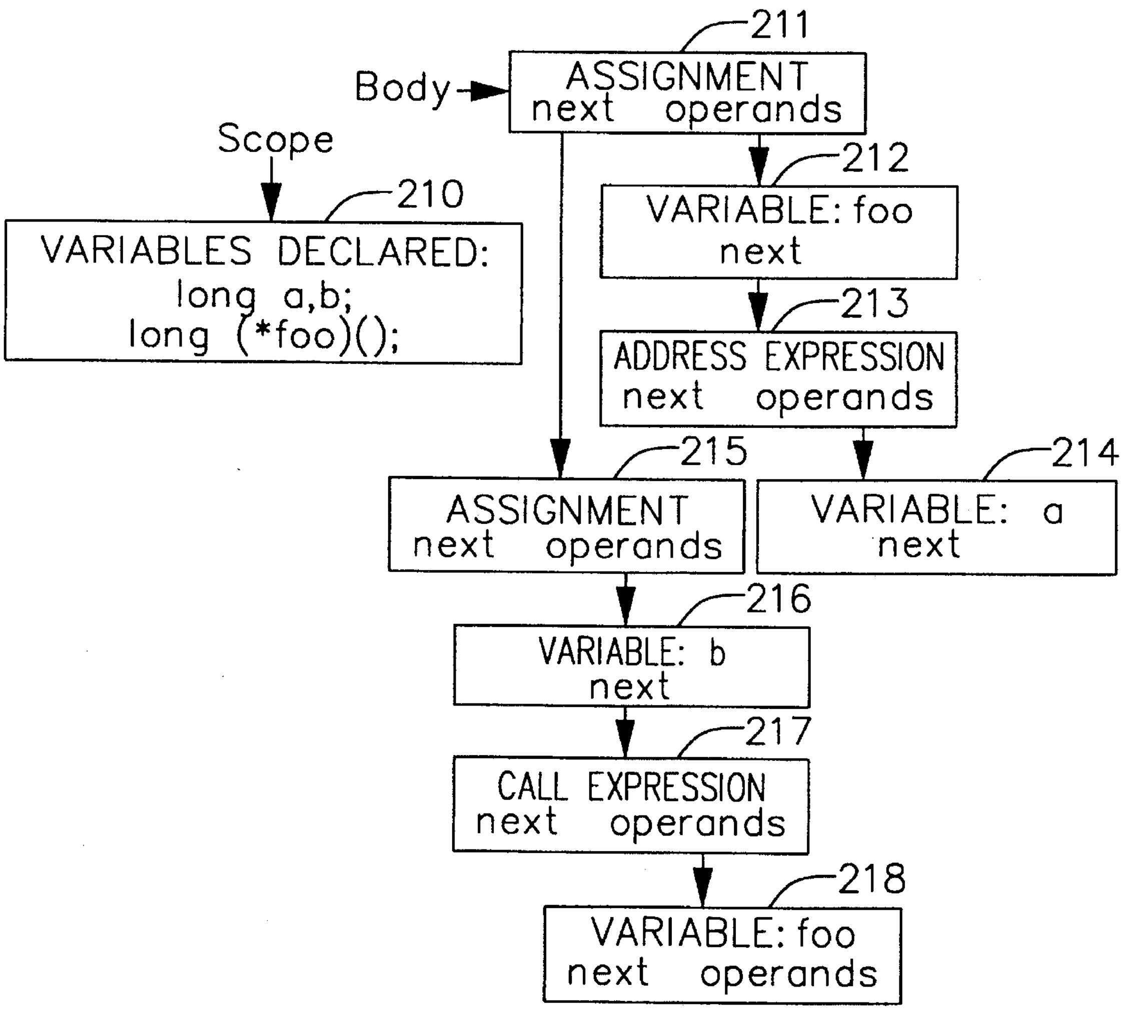
FIG. 20 is a diagram illustrating a parse tree representation of the source code listing shown in FIG. 19.

Referring to FIG. 20, a diagram illustrating a parse tree representation of the source code listing in FIG. 19 is shown. The long integer variable declarations (line 1) are represented by variables declared node 210. The assignment operation (line 2) is represented by node 211, which has two operands, a variable (representing the left-hand side of the assignment) and an address expressions (representing the right-hand side of the assignment), represented respectively by nodes 212 and 213. The address expression node 213 operates on variable "a", which is represented by variable node 214. The assignment node 211 is followed by assignment node 215, which represents the assignment to variable "b" (line 3). This node has two operands, a variable and a function call to "foo" represented respectively by nodes 216 and 217. The call expression node 217 has one operand, a variable, represented by node 218.

Figure 21A:
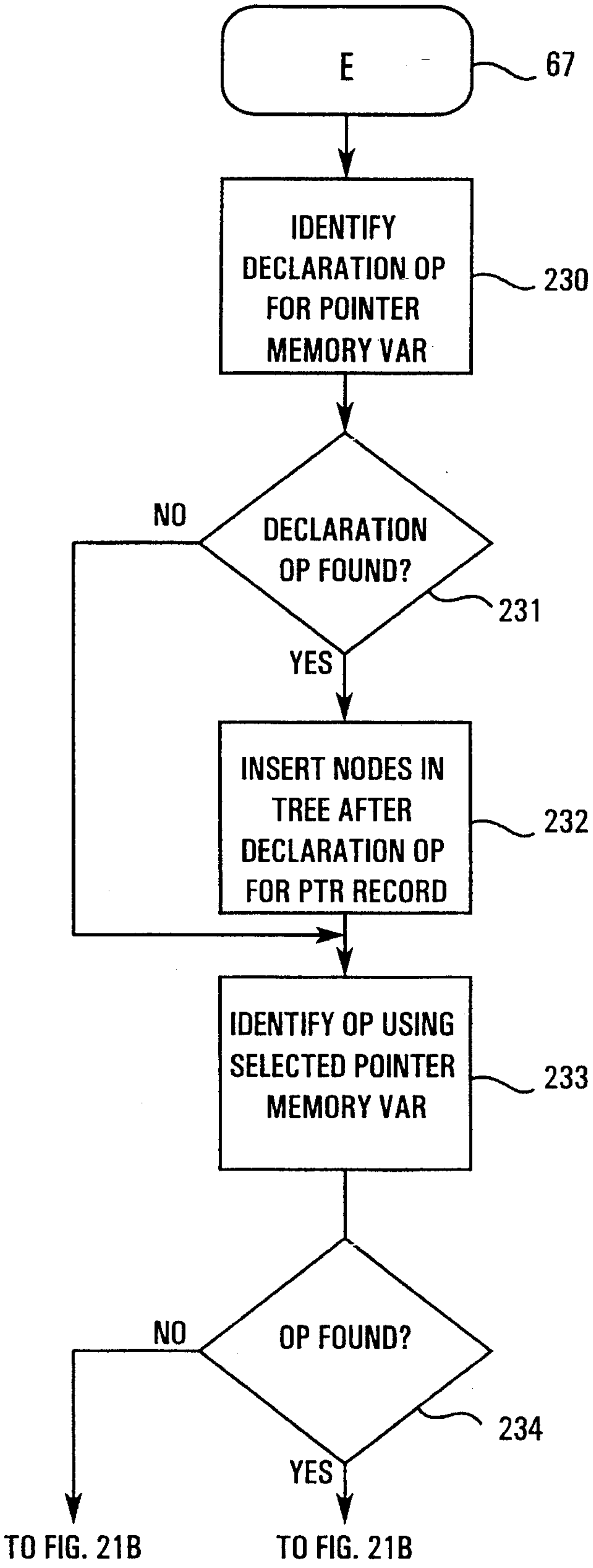
FIGS. 21A and 21B are a flow chart of a routine for detecting an inappropriate use of a pointer memory variable error condition.
Figure 21B:
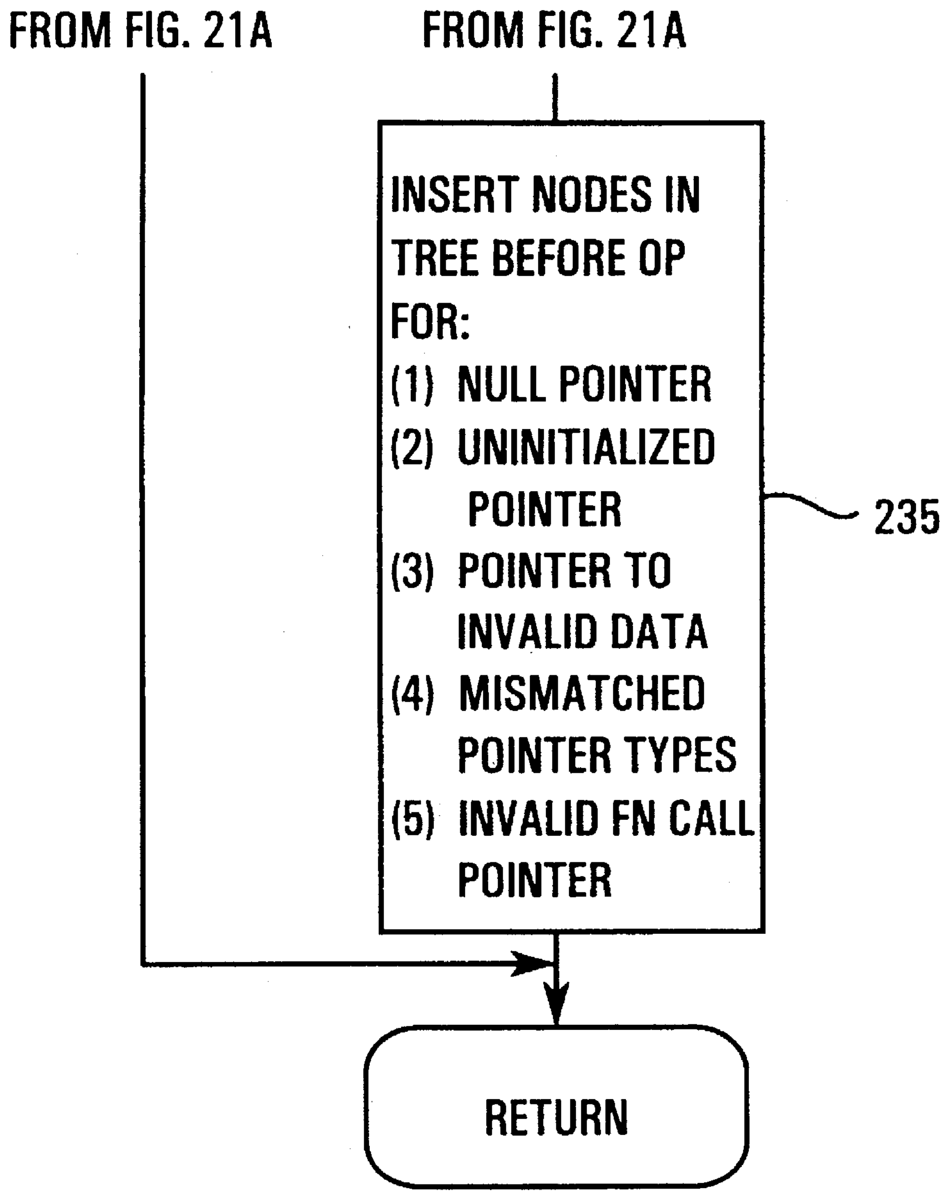

Referring to FIGS. 21A and 21B, a flow chart for a routine for an inappropriate use of a pointer memory variable error condition is shown. First, a flow analysis is performed on the source code to identify a declaration operation for a pointer memory variable (block 230), comprising an identifier operand for identifying the variable. If a declaration operation is found (block 231), instrumentation nodes are inserted after the parse tree node corresponding to the declaration operation (block 232). These nodes are for storing in a pointer record a value field for a memory address contained in the pointer memory variable during execution. Initially, the pointer memory variable points to nothing and the pointer record is therefore empty.

Next, a flow analysis is performed on the source code to identify an operation using the pointer memory variable being checked (block 233). If an operation is found (block 234), instrumentation nodes are inserted into the parse tree before the nodes corresponding to the operation (block 235). These nodes are for performing the five types of error checks listed above, including checking for operations on a null pointer, an uninitialized pointer, a pointer to invalid data, mismatched pointer types, and an invalid function call pointer.

Figure 22:
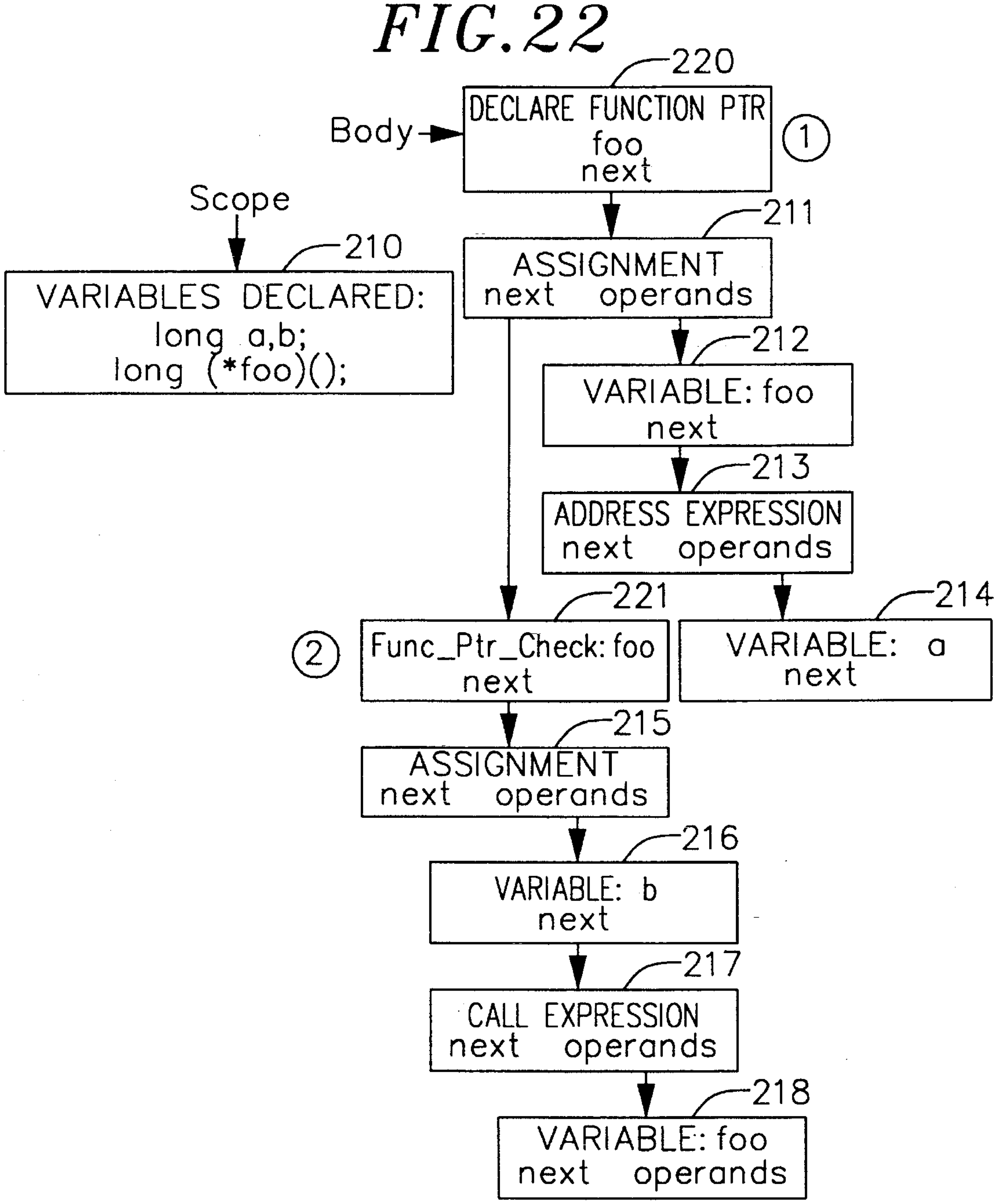
FIG. 22 is a diagram illustrating an instrumented parse tree representation of the source code listing shown in FIG. 19.

Referring to FIG. 22, a diagram illustrating an instrumented parse tree representation of the source code listing in FIG. 19 is shown. The instrumentation node for the function pointer declaration operation is inserted as declare function "ptr" node 220. The instrumentation node for the function pointer check is inserted as func_ptr—check node 221. The declare function "ptr" node 220 is used by the error-checking engine for runtime pointer tracking. The func_ptr_check node 221 is the actual check for a bad function pointer. During runtime, the error-checking engine determines that the value assigned to the function pointer "foo" is an address on the stack and is not an appropriate function address.

The fifth category of dynamic error is a memory leak error, which occurs when a dynamically allocated memory block is no longer referenced by a memory pointer and consequently can never be freed (deallocated). There are three types of errors. The first, a leak while freeing memory, can occur when a block of memory is freed which contains memory pointers that point to other allocated memory blocks. Any references to those allocated memory blocks are lost. The second, a leak return value, occurs when a function call returns an allocated memory block but the calling function does not assign that memory block to a pointer memory variable. The third, leak scope, occurs when a local pointer memory variable points to a memory block that is also local in scope and the function does not free the memory which it uniquely references before it goes out of scope.

Referring to FIG. 23, a source code listing of a computer function containing a memory leak error is shown. A 10-character memory block is allocated and its pointer assigned to pointer memory variable "ptr," which is a local variable defined in the same statement (line 3). The function "foo" uniquely references the memory block allocated whose memory address is assigned to the local pointer memory variable "ptr." The function returns (line 4) with "ptr" going out of scope. Consequently, the memory block formerly pointed to by "ptr" is leaked since "ptr" is no longer accessible. Therefore, a memory leak error occurs.

Figure 24:
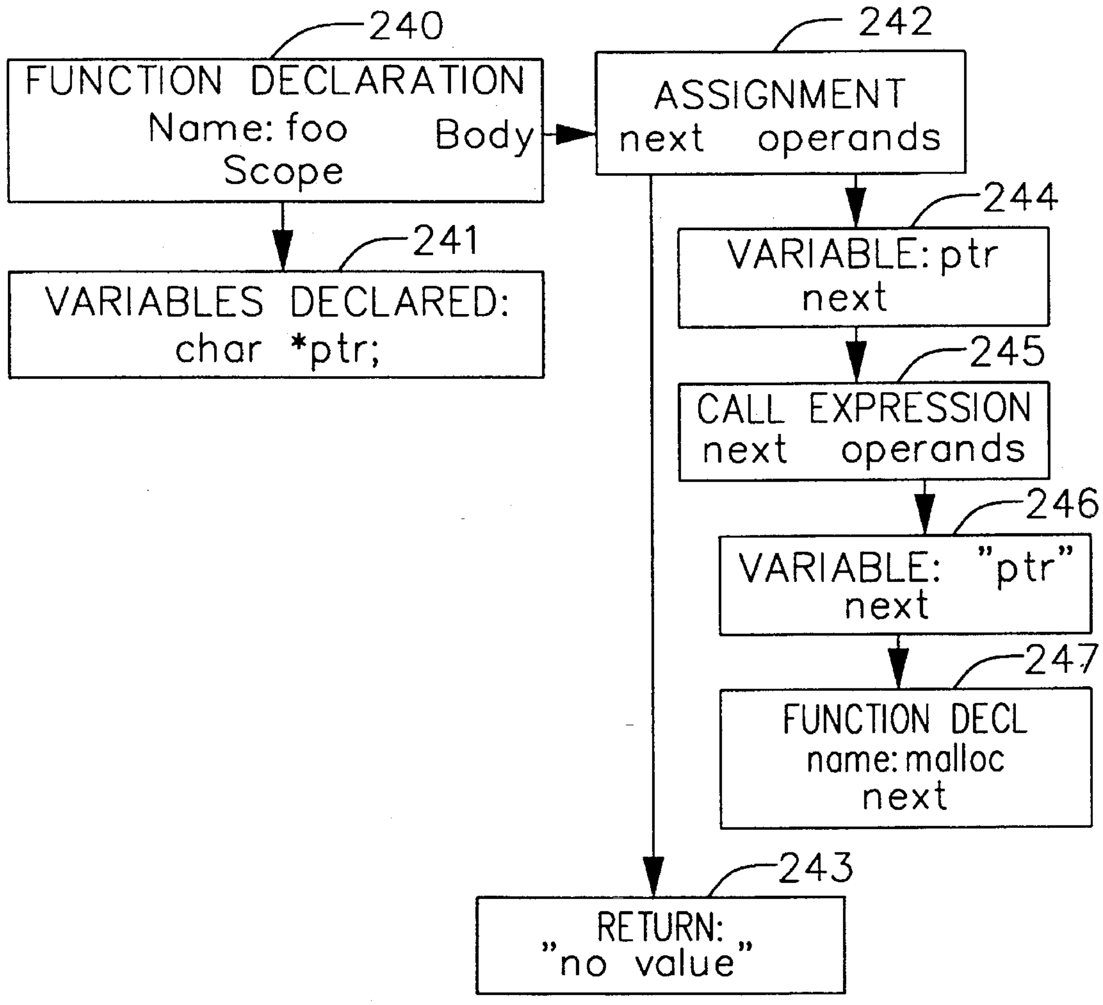
FIG. 24 is a diagram illustrating a parse tree representation of the source code listing shown in FIG. 23.

Referring to FIG. 24, a diagram illustrating a parse tree representation of the source code listing in FIG. 23 is shown. The function declaration (lines 1, 2 and 5) is represented by function declaration node 240. The declaration of local pointer memory variable "ptr" (line 3) is represented by a variable declaration node 241. Similarly, the allocation of the 10-character memory block is represented by call expression node 245, which has two operands, an argument and a function declaration, represented respectively by nodes 246 and 247.

The function declaration calls a memory allocation routine for dynamically allocating a block of memory. Such a routine could be the "malloc()" function call or the like in C language. The result from this routine is assigned to the local pointer memory variable (line 3), which is represented by assignment node 242. This node has two operands, a pointer memory variable and the function call, represented respectively by nodes 244 and 245. The return operation (line 4) is represented by node 243.

Figure 25:
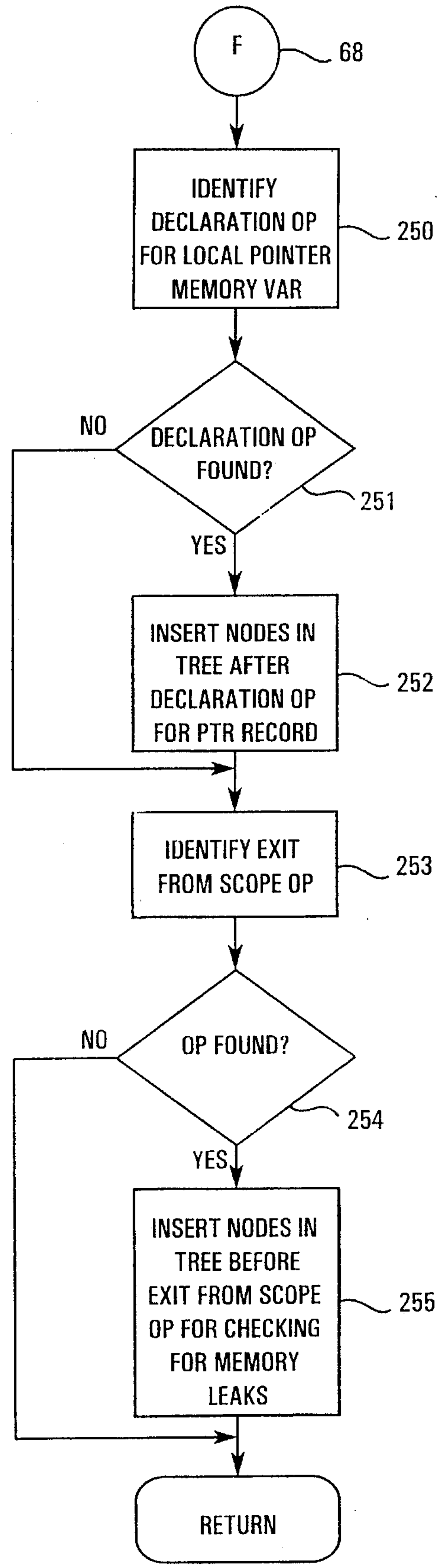
FIG. 25 is a flow chart of a routine for detecting a memory leak error condition.

Referring to FIG. 25, a flow chart for a routine for detecting a memory leak error condition is shown. First, a flow analysis is performed on the source code to identify a declaration operation for a pointer memory variable (block 250), including an identifier operand for identifying the variable. If a declaration operation is found (block 251), instrumentation nodes are inserted after the parse tree node corresponding to the declaration operation (block 252). These nodes store a pointer record indicating information about the block of memory that it points to.

Next, a flow analysis is performed on the source code to identify an exit from scope operation, such as a return from a function call (block 253). If such an operation is found (block 254), instrumentation nodes are inserted before the parse tree node corresponding to the exit from scope operation (block 255). These nodes are for detecting memory leaks. Thus, when the function exits or the pointer goes out of scope, the error-checking engine is informed by a "pop scope" directive. Upon that occurrence, the engine can examine the list of pointers declared in that scope. For each pointer, if the block of memory that it is pointing to is only pointed to by a local pointer variable, the memory is leaked when the pointer goes out of scope.

Memory leaks can be detected in one of two ways. The first is during an assignment of a new address to a pointer variable. If the memory block that used to be pointed to by the pointer is being reassigned and the memory block is only pointed to by that pointer, the block is leaked by the assignment operation. Second, a memory leak can occur upon the exiting of a scope. If there is a memory block which is pointed to only by a pointer declared locally in scope within the function being exited, the memory block is leaked.

During operation, the error-checking engine initializes a pointer record for each pointer in a function upon activation. For any assignment of an address to a pointer, the pointer record is updated to indicate that the pointer contains the address of an allocated memory block. Similarly, the memory block record pointer list is updated to indicate that the pointer is pointing to that block. Finally, upon the exit from the routine, all pointer records are cleared.

Figure 26:
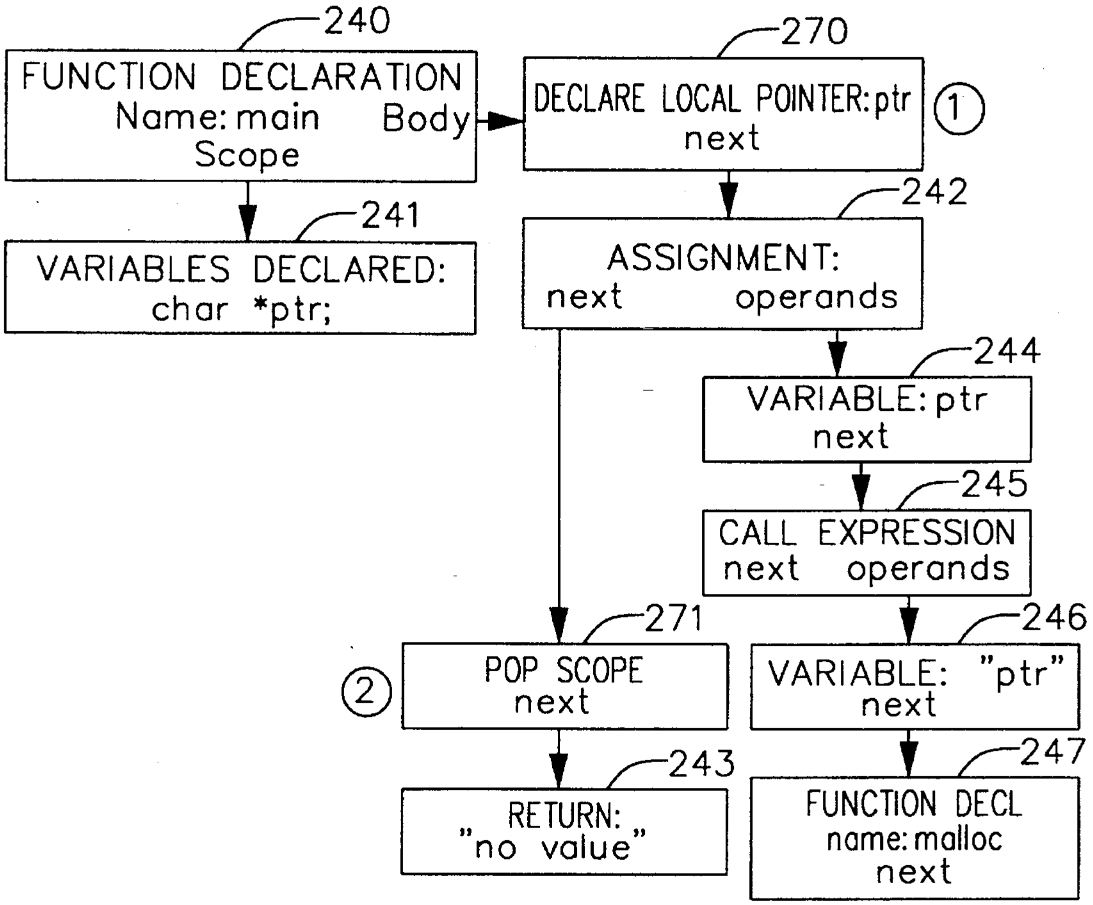
FIG. 26 is a diagram illustrating an instrumented parse tree representation of the source code listing shown in FIG. 23.

Referring to FIG. 26, a diagram illustrating an instrumented parse tree representation of the source code listing in FIG. 23 is shown. The assignment of the local allocated memory block to the local pointer memory variable in assignment node 242 indicates to the error-checking engine that variable "ptr" is pointing to a particular memory block. Subsequently, when the pointer goes out of scope, the pointer record maintained by the error-checking engine is removed from the memory block record. Since that record now has an empty list of pointers pointing to it, the error-checking engine can detect that memory has been leaked. The instrumentation nodes for the declaration operation are inserted as declare local pointer node 270. The instrumentation nodes for the pop scope operation are inserted as pop scope node 271. Declare local pointer node 270 indicates to the error-checking engine that the local pointer memory variable "ptr" is declared and uninitialized. The pop scope node 271 indicates to the error-checking engine that "ptr" has gone out of scope due to a return operation from the function.

Instrumentation routines can also be used to introduce a user-definable instrumentation routine known as an interface. This type of routine enables a user to add their own rules for transforming the source code. An interface routine can have the same behavior as the source code it is replacing or it can do something completely different, such as checking values of variables, simulating errors or performing any other type of dynamic tasks.

Typically, user-defined interfaces allow the user to add custom error checking to function calls as a means of enforcing rules on the way that the function is called and the side effects that it has on memory. These types of interfaces check that all parameters are of the correct data type, that memory pointers point to memory blocks of the appropriate size, and that each parameter value is within its correct range.

Referring to FIG. 27A, a program segment of a computer function to be instrumented with an interface is shown. Here, the interface is for a memory allocation call using the "malloc()" function (line 1). Referring to FIG. 27B, the interface routine is shown. In this example, the interface is similar to a complicated macro definition because the given function call is replaced by a user defined interface.

The "iic_" prefixed functions are expanded into function calls to the runtime back-end processor. Two such function calls are employed in this example. The "iic_error()" function call communicates error messages to the back-end processor (lines 5 and 10). The "iic_alloc()" function call communicates to the back-end processor that a block of memory of size "size" has been allocated and is pointed to by pointer "a" (line 8).

In addition, two further error checks are performed by the interface. First, it checks to see whether the size of the memory block being allocated is a positive number (lines 4–5). If it is, the memory allocation "malloc()" function call is allowed to go forward (line 6). Next, the pointer memory variable "a" is checked to determine if the memory allocation function call failed, and if so, the back-end processor is so informed (lines 7–10).

Figure 28:
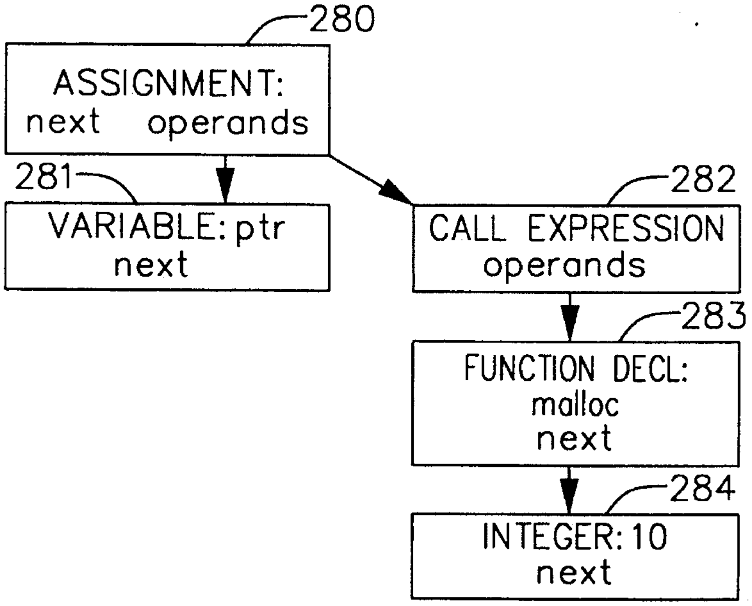
FIG. 28 is a diagram illustrating a parse tree representation of the program segment shown in FIG. 27A.

Referring to FIG. 28, a diagram illustrating a parse tree representation of the program segment shown in FIG. 27A is shown. The assignment operation (line 1) is represented by assignment node 280, which has two operands, a variable operand (representing the left-hand side of the assignment) and a function call expression operand (representing the right-hand side of the assignment), represented respectively by nodes 281 and 282. In turn, the call expression node 282 has two operands, a function declaration for a "malloc()" function and an integer constant, represented respectively by nodes 283 and 284.

Figure 29A:
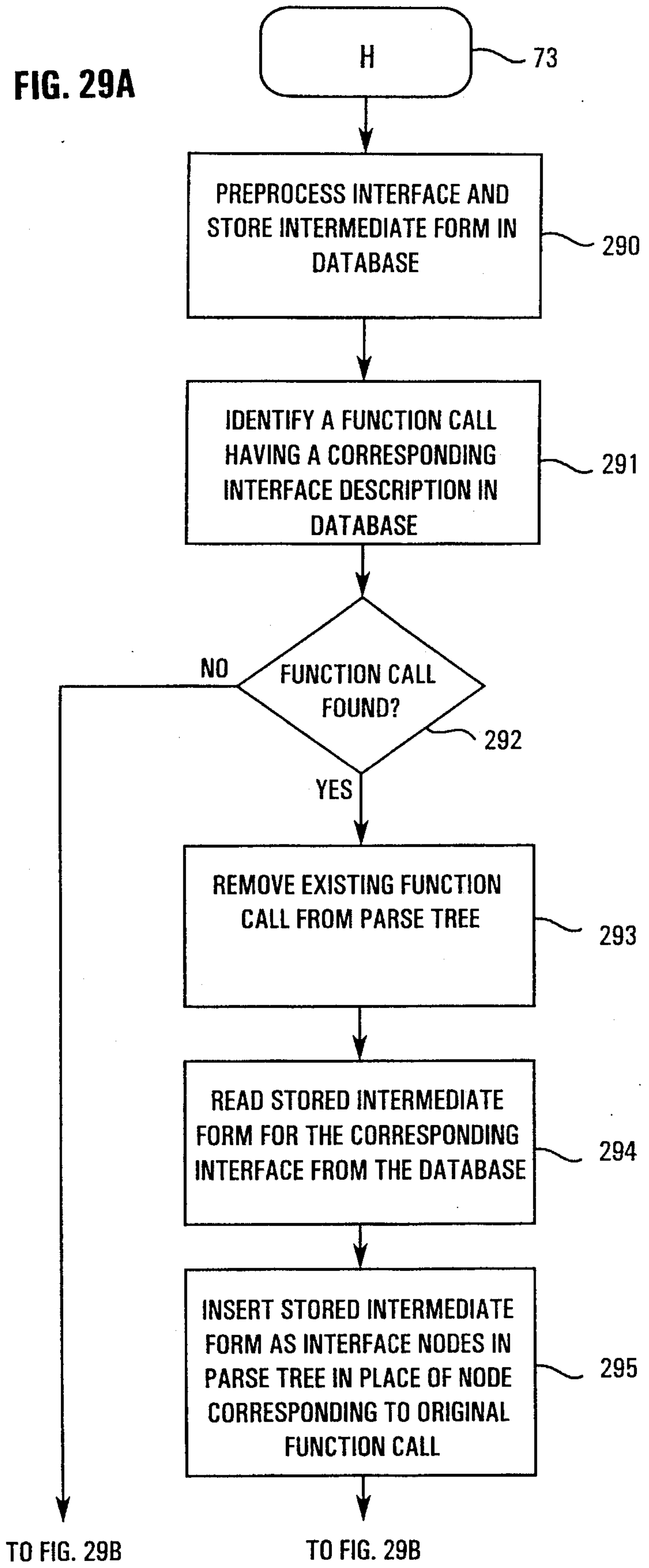
FIGS. 29A and 29B are a flow chart of a routine for inserting an interface.
Figure 29B:
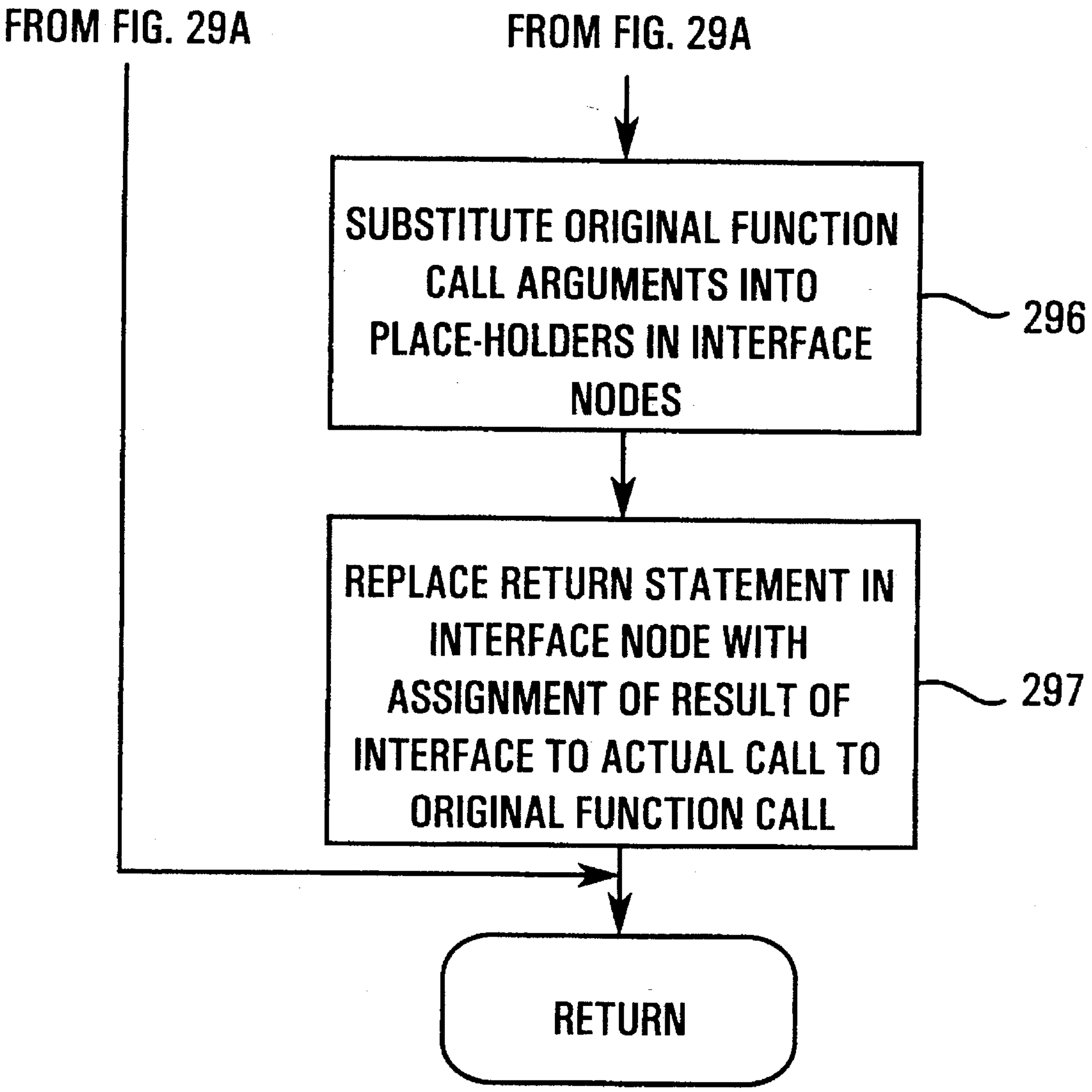

Referring to FIG. 29, a flow chart for a routine for inserting an interface is shown. Before an interface can be used, it must first be pre-processed to convert it from source code into an intermediate form and then stored in a database for later use (block 29). A flow analysis is then performed on the source code to identify function calls having a corresponding interface description to that stored in the database (block 291). If a matching function call is found (block 292), the interface is inserted into the parse tree in a multi-step process.

This process includes the step of first removing the existing function call from the parse tree (block 293). Next, the stored intermediate form for the corresponding interface is read from the database (block 294). The stored intermediate form is inserted as interface nodes in the parse tree in place of the node corresponding to the original function call (block 295). The original function call arguments are substituted into placeholders in the interface nodes (block 296). This enables the interface to actually perform the original function which is called within the interface function itself. Finally, the return statement and the interface node are replaced with an assignment of the result of the interface routine to the actual call to the original function call (block 297). This enables the original calling function to receive the result that was expected without the interface.

Figure 30:
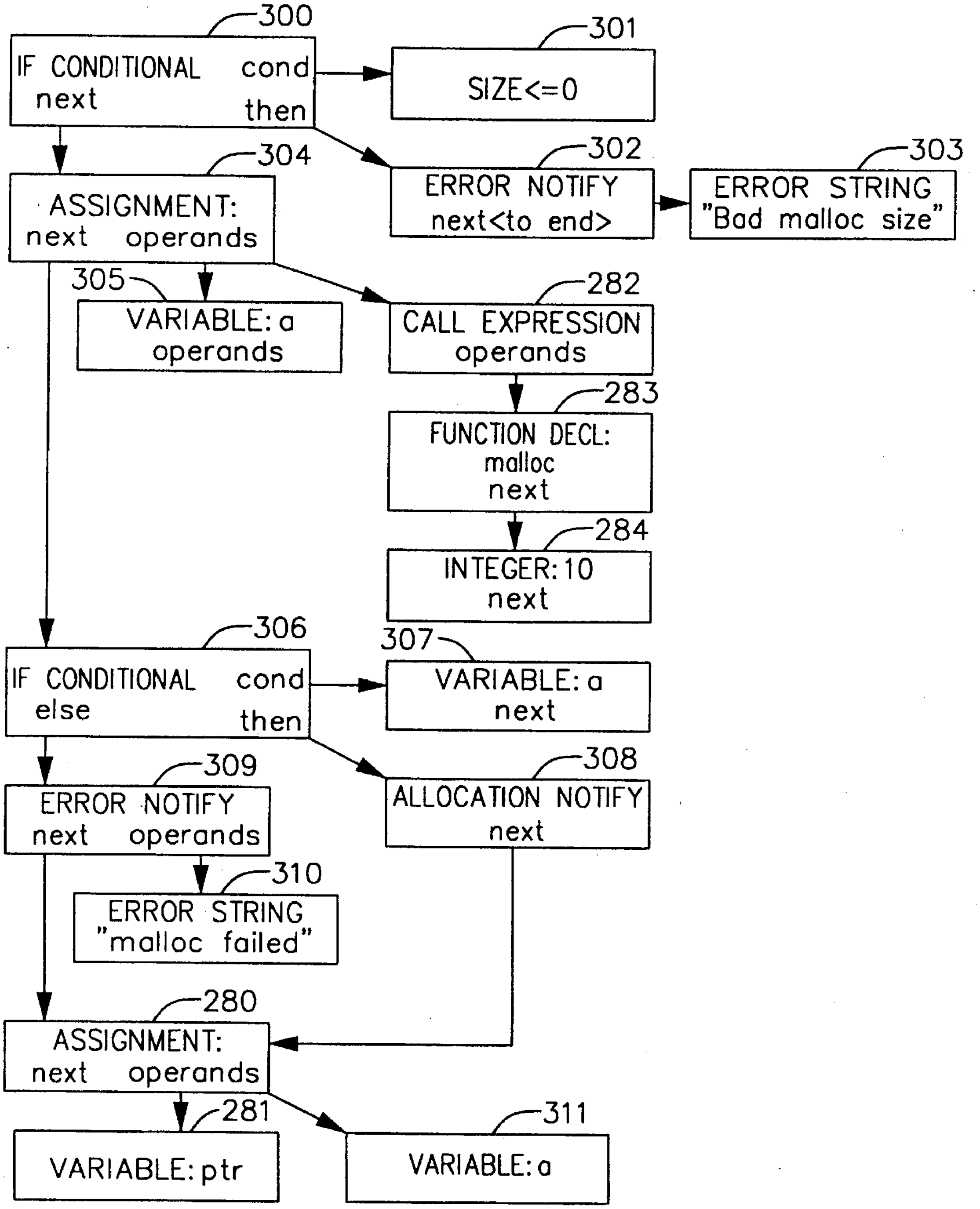
FIG. 30 is a diagram illustrating an instrumented parse tree representation of the program segment shown in FIG. 27A.

Referring to FIG. 30, a diagram illustrating an instrumented parse tree representation of the program segment shown in FIG. 27A is shown. This parse tree differs from those used in other parts of the invention. The original parse tree node representation has been broken into two sections and grafted onto the intermediate form for the interface routine. The entire parse tree shown in FIG. 30 is grafted in place of the parse tree shown in FIG. 28.

The grafted parse tree segment shown in FIG. 30 reflects the program structure of the interface routine source code. The conditional check for a positive memory block size is inserted as "if conditional" node 300 with the conditional test represented by node 301 (line 4). The body of the conditional statement is represented by error notify node 302 and error string node 303 (line 5) which communicate to the runtime back-end processor the occurrence of a dynamic runtime error condition. The original function call to the memory allocation routine "malloc()" (line 6) is represented by assignment node 304 which has two operands, a variable and an expression call, represented respectively by nodes 305 and 282. Note that nodes 282, 283 and 284 are substituted into the interface intermediate form in the place of placeholders.

The error check for a memory allocation operation failure is represented by "if conditional" node 306 with the conditional test represented by node 307 (line 7 and 9). The body of the "then" condition is represented by allocation notify node 308 (line 8) which tells the runtime processor that a block of memory of size "size" has been allocated and is pointed to by pointer "a". The body of the "else" condition is represented by error notify node 309 (line 10) which has one operand, error string node 310. Finally, an assignment condition is grafted to the end of the intermediate form to assign the result from the interface, represented by variable node 311, to the original function call.

Instrumentation routines can also be used to insert support for automatic test case generation. One embodiment of the present invention is described in "Overview of the Design of TGS System," which is attached as Appendix B, the subject matter of which is hereby incorporated by reference as if set forth in full. By performing a flow analysis of the source code, a two-fold criteria can be satisfied. First, instrumentation routines can be inserted to automatically generate program inputs to achieve full testing of all flow paths in the executable program. Second, instrumentation routines can be used to identify inputs that cause the program to perform incorrectly.

The method involves analyzing the source code to identify points where input data is needed. Next, various techniques are employed, ranging from random number generation to heuristic flow analysis techniques, to generate a set of input cases that satisfy the two-fold criteria stated above. The resulting executable program is linked to a test harness which repeatedly runs the program with different input values and adds unique test cases to a database of test case data. The testing algorithm converges when the two-fold criteria is met or when no new test cases can be generated in a reasonable amount of time.

Referring to FIG. 31, a source code listing of a computer function to be instrumented for automatic test case generation is shown. The purpose of this function is to accept an input character and determine whether it is an integer. Three character memory variables are declared, "b," "c" and pointer "ptr" (line 3). An input function "getchar()" is called to obtain an input character whose value is assigned to variable "c" (line 4). That value is checked to determine whether it falls in the numeric range of ASCII codes for integer characters (line 5). If it does not, the pointer memory variable "ptr" is set to 0 (line 6). The variable "b" is assigned the difference of a "0" ASCII character code subtracted from the input character stored in variable "c" (line 8). A problem with this function is that the pointer memory variable "ptr" is not yet initialized before it is dereferenced by setting it to 0.

Figure 32:
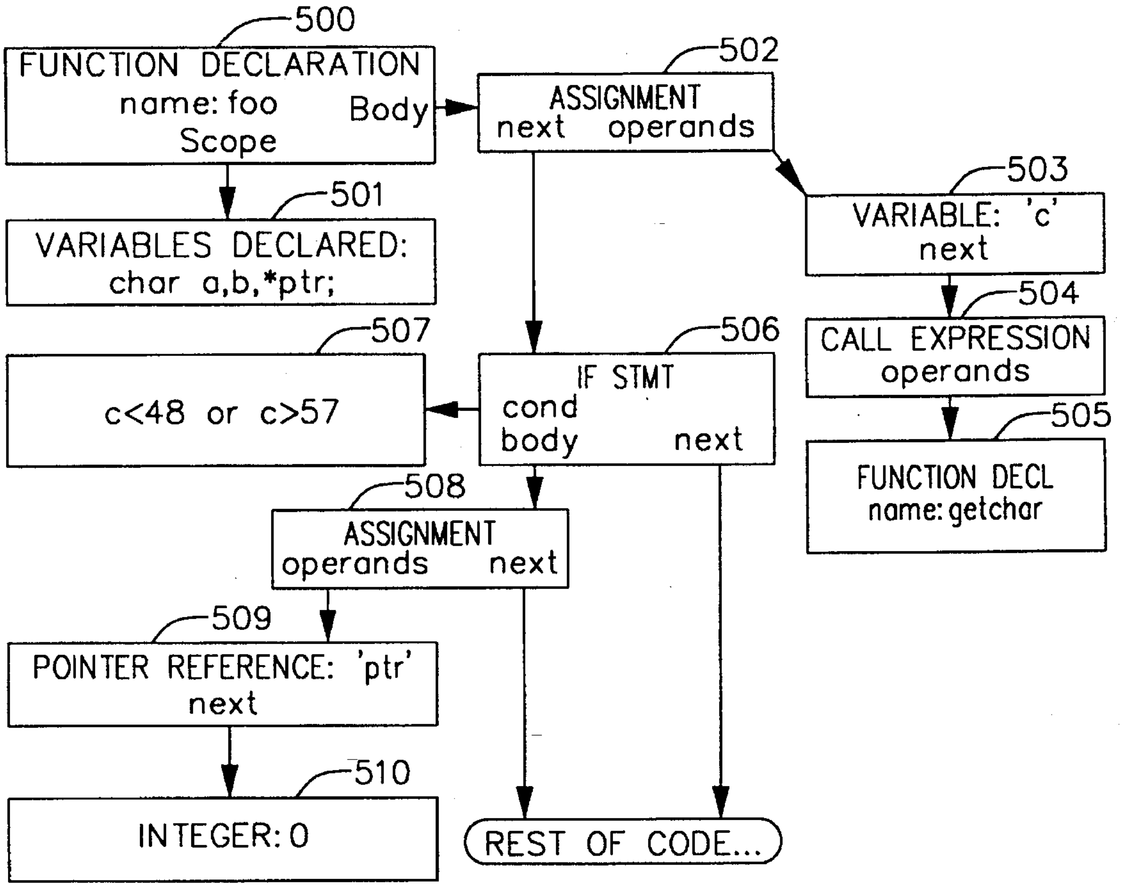
FIG. 32 is a diagram illustrating a parse tree representation of the source code listing shown in FIG. 31.

Referring to FIG. 32, a diagram illustrating a parse tree representation of the source code listing in FIG. 31 is shown. The function declaration (lines 1, 2 and 9) is represented by function declaration node 500. The declaration of variables "a" "b" and "ptr" (line 3) is represented by variables declared node 501. The assignment of the input character is represented by assignment node 502, which has two operands, a variable and a function call, represented respectively by nodes 503 and 504. The function call, represented by call expression node 504, has a single operand, function decl node 505 which contains the identifier for the "getchar()" function. The conditional statement (line 5) is represented by if stmt node 506, which points to a node containing the conditions to be tested, represented by node 507. The body of the condition node contains an assignment statement (line 6) represented by assignment node 508, which has two operands, a pointer reference and an integer, respectively represented by nodes 509 and 510.

Figure 33:
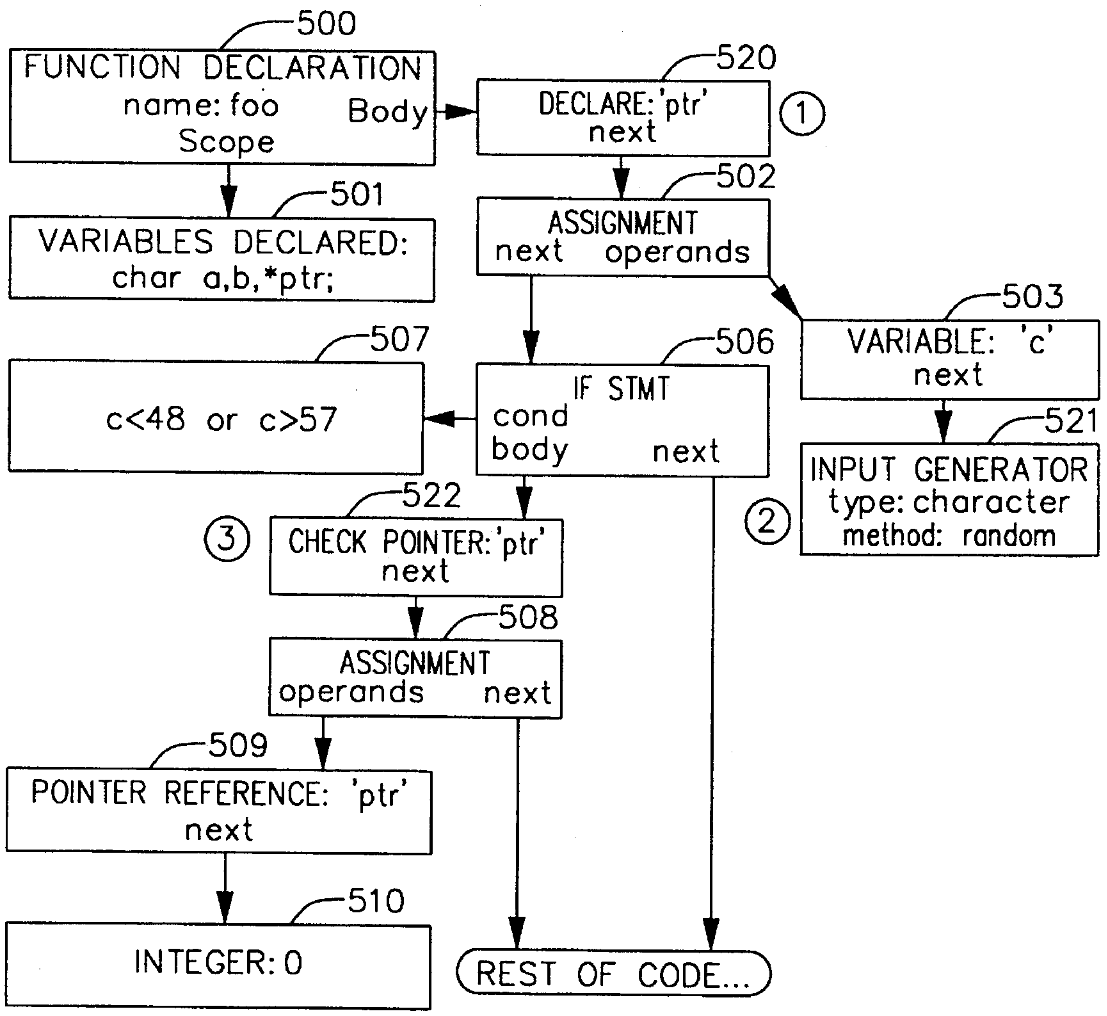
FIG. 33 is a diagram illustrating an instrumented parse tree representation of the source code listing shown in FIG. 31.

Referring to FIG. 33, a diagram illustrating an instrumented parse tree representation of the source code listing in FIG. 31 is shown. The instrumentation nodes for the declaration operation are inserted as declare node 520. The instrumentation nodes for the character input generation operation are inserted as input generator node 521. The instrumentation nodes for the uninitialized pointer check operation are inserted as check pointer node 522. Declare node 520 indicates to the error-checking engine that the local pointer memory variable "ptr" is declared and uninitialized. The input generator node 521 indicates to the error-checking engine that the function call to "getchar()" is replaced by a test case generator function which generates random inputs between 0 and 255. The check pointer node 522 indicates to the error-checking engine that the function is attempting to use a pointer memory variable that may not have been initialized previously and is probably pointing to an invalid memory address.

As will be realized, the present invention is capable of other and different embodiments and its several details are capable of modifications in various respects, all without departing from the spirit and scope of the present invention. Accordingly, the drawings and detailed description of the preferred embodiment are to be regarded as illustrative in nature and not as restrictive.

Compiler Intermediate Code Insertion for Automatic Debugging and Test Case Generation A Technical Overview

APPENDIX A

1 Overview

Compiler technology, as it exist today, is basically concerned with translating an input source program, into an equivalent program of another form. A compiler may involve several phases, which include:

- lexical analyzer
- syntax analyzer
- semantic analyzer
- intermediate code generator
- code optimizer
- code generator In this paper, an extra step in the compiler process is introduced, known as Intermediate Code Insertion or Intermediate Code Instrumentation, which allows extra functionality to be embedded into the original program, while still preserving the functionality of the original program. This extra step is performed after the intermediate code generator completes, and the resulting "instrumented intermediate form" is sent on to the code optimizer, or code generator. The instrumented code, then interacts with some "back-end processing engine" which can then perform some type of analysis on the running program. Specifically, this back-end processing engine may take the form of automatic debugging processor, or test case generator. Each of these could then be linked in with the instrumented program to add the given functionality.

The instrumentation of the intermediate code is typically done "in memory" meaning, the entire intermediate code, for a particular file being compiled is resident in the computers random access memory (RAM). This need not be the case, however, since a compiler could in fact write its intermediate form to some file or database, the code instrumentor could then read the intermediate code, process, and write the instrumented version back to the data-base. The compiler could then complete the compilation by generating the target code from this instrumented intermediate form.

2 Intermediate Code Insertion

Intermediate Code Insertion, or Instrumentation is concerned with analyzing the intermediate form that a compiler produces, in order to embed added functionality. In the particular cases that we are concerned with, this added functionality takes the form of embedded debugging function calls, as well as test coverage analysis information. When the compiler generates code for the target machine, the program not only functions as it was originally intended, but also contains calls to procedures which provide automatic error detection of program errors, as well as the ability to automatically generate test cases for the program. This is accomplished by passing run-time information to the "back-end processing unit", which is linked with the program, when the program executes.

The format of the intermediate code may vary widely from one compiler to the next, however, the intermediate code insertion is sufficiently general as to apply to any intermediate form the compiler may produce.

2.1 Compiler Intermediate Code Insertion for Automatic Debugging

It is possible to analyze a compilers intermediate code, and instrument this code, embedding debugging function calls which allow automatic run-time debugging. There are, many types of checks that can be performed, which roughly fall into the following categories:

- Uninitialized Memory
- Memory Corruption
- Dynamic Memory Manipulation
- Inappropriate use of Pointers
- Memory Leaks
- Function Call Argument Checking For each category of error, an analysis phase determines which checks are appropriate, and debugging code is embedded into the intermediate code. The following sections will describe each category of error, at length, and where appropriate, specific code examples will be presented. Examples will consist of an original source file, the corresponding compiler generated intermediate form and finally the instrumented intermediate code. Instrumented code consists of the original intermediate code, with embedded calls to the error-checking back-end processor, which will be linked into the program. In most cases, the functional blocks will just be described in the block diagram, with the details of the calls being dependent on the compiler intermediate code calling conventions. A brief explanation of the analysis phase, describing how information is passed to the error checking engine, will also be given for each example.

2.1 .1 Uninitialized Memory Checking.

Use of uninitialized variables in a program is common error. By uninitialized, it is meant that the variable is declared, but is not yet assigned a value before it is used in some other statement. The following example contains an uninitialized read of variable "i" at line 4.

```
1    int main()
2    {
3       int a, i;
4       a = i;
5       return 0;
6    }
```

This code could be represented by the compiler in the intermediate form shown in Figure 1. The intermediate form shown is a parse tree, which, for simplicity, closely resembles the original form of the source file. The intermediate code could, however, look drastically different from the original source.

Once given the intermediate form, the problem then becomes how to instrument the code

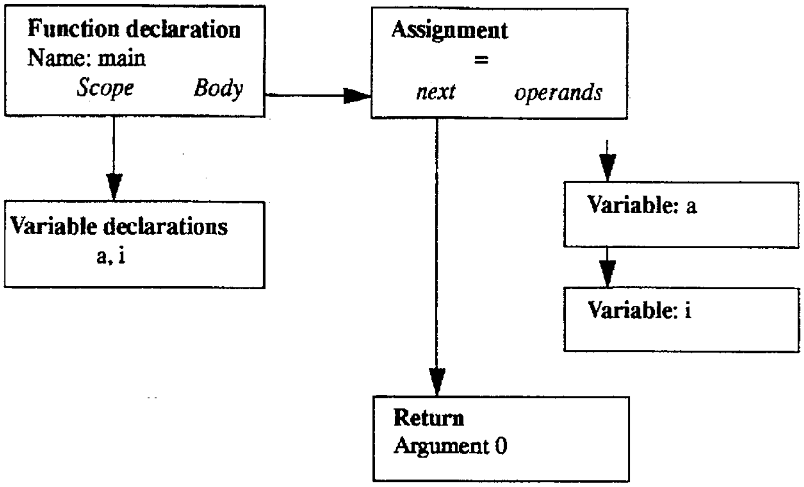

Figure 1: Intermediate form from Compiler in order to add extra debugging functionality, so that the uninitialized variable "i" can be automatically detected when the program is run. For this particular type of error checking, The criteria for inserting a check is quite simple. If there exist a variable in any expression that would be read at the current point of execution, and it is not known to have been assigned previously, a check is inserted to check that variable at run-time. In addition, in order to initialize the state of the variable as "uninitialized" at the start of the program (since variable i is presumably on the stack), code must be inserted to let the error checking engine know that the variable at this particular address is in fact uninitialized to start. To summarize, the analysis phase for uninitialized variable checking is as follows:

1. Identify any addresses in the stack frame that represent local variables, and set their status to be uninitialized.
2. Perform flow analysis on the code, in order to determine accesses of these stack locations for which it cannot be determined that the location has been previously initialized.
3. Insert checks into the intermediate code, just before each location in question is about to be used.
4. Identify any places in the code where the memory locations in question are being written, and insert operations into the intermediate code, which update the status of this location from uninitialized to initialized.

Figure 2 shows the instrumented intermediate code which includes the checks for the uninitialized variable. Blocks that are tagged with numbers indicate embedded code, added to the original code. In block (1) the variables "a" and "i" are being reported to the back-end as locations on the stack which represent variables that are uninitialized. (2) indicates the actual check for the uninitialized variable "i". (3) shows that the error-checker is being informed that variable "a" is being assigned, by a copy of some location.

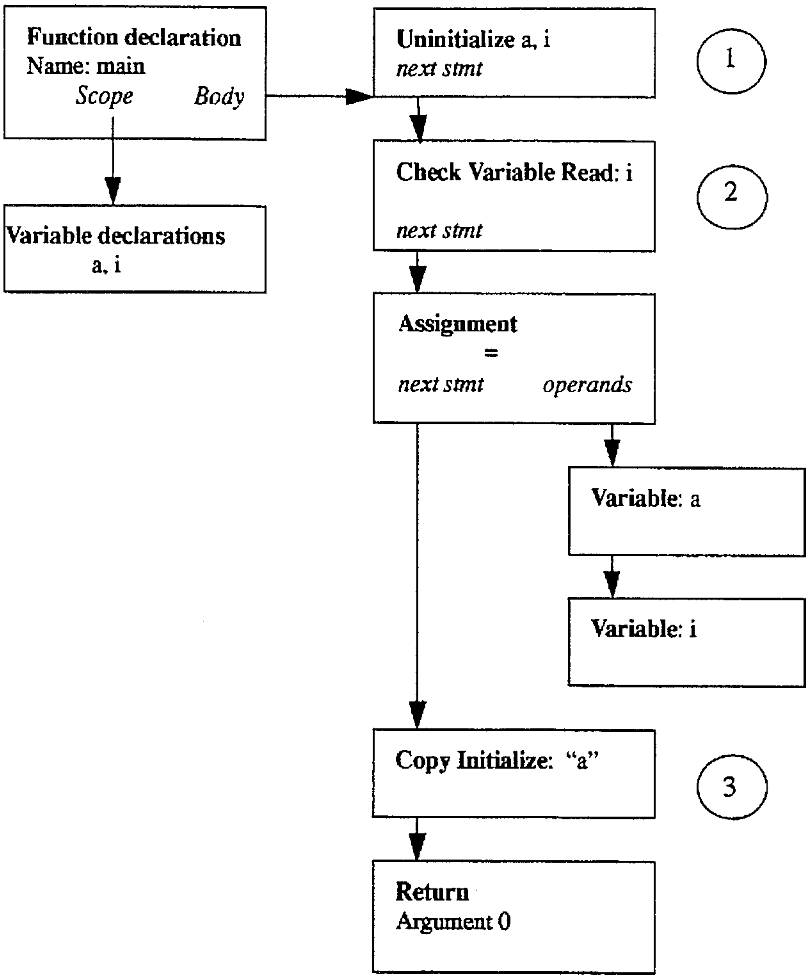
Figure 2: Instrumented Intermediate form, with embedded debugging code
2.1 .2 Memory Corruption
Memory corruption occurs when a program writes to a location in memory, that it did not intend to write. This typically happens as a result of writing off the end of an array. Consider the following example:

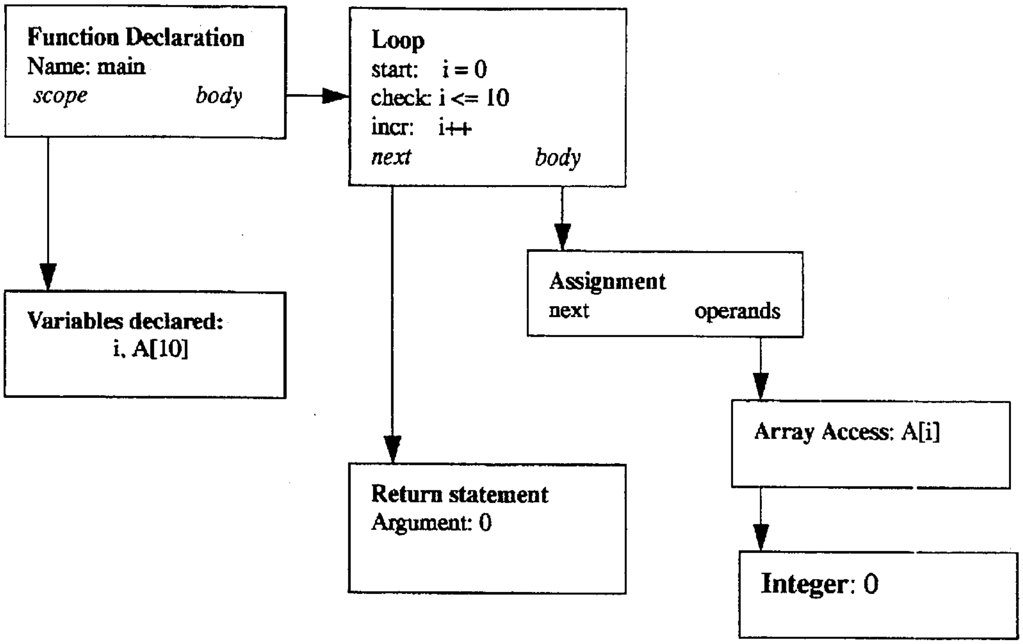

Figure 3: Intermediate form from compiler

```
int main()
{
   int i, A[10];
   for (i = 1; i<= 10; i++) {
      A[i] = 0;
   }
   return 0;
}
```

In this example, it is observed that the array "A" will be written, and in the process, a memory location, just beyond the end of the array is written, which is considered an overwrite error, since valid indices for the array are A[0] to A[9]. In the case of arrays, the code analyzer must declare the array variable and its size to the error checking engine, and then for each write to that array, it then tests if the index into the array is valid. Figure 3 shows the original intermediate code from the compiler. Figure 4 shows this same intermediate code after instrumenting with debugging information to check for array access violations. In block (1), the array is being declared to the error-checker as an array of 10 elements, starting from location "A". The block marked by (2) shows the actual check of the writing to the array at the index "i".

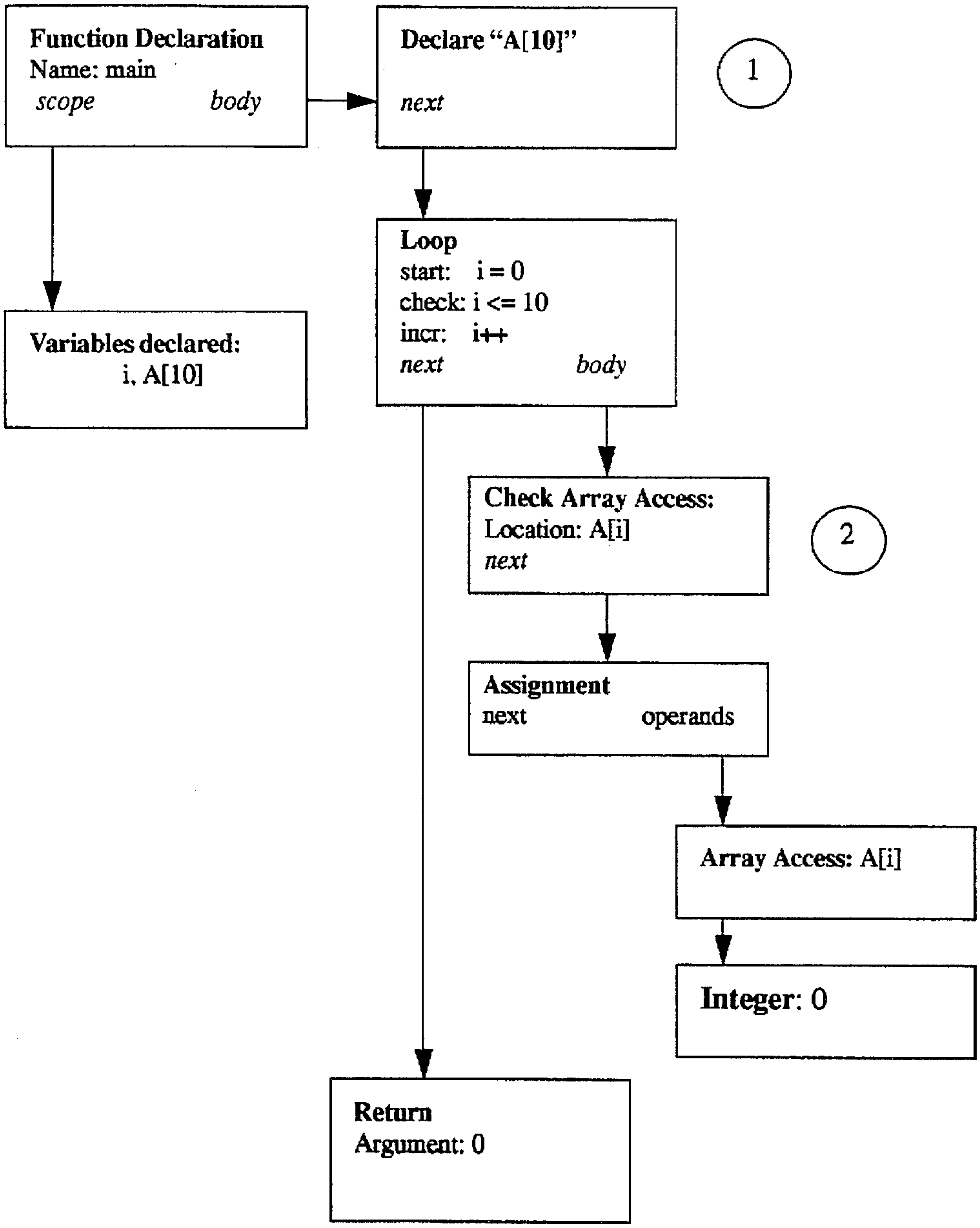
Figure 4: Instrumented Code Checking for Array Access Violation

2.1 .3 Dynamic Memory Manipulation

Dynamic memory manipulation often leads to problems involving the use of pointers that no longer reflect the actual layout of memory. The following types of errors can occur:

- Reading from or writing to "dangling pointers"
- Passing "dangling pointers" as arguments to functions.
- Returning "dangling pointer" from functions.
- Freeing the same memory block multiple times.
- Freeing stack memory (local variables)
- Passing a pointer to free that does not point to the start of a block.

Pointers which point to a block of memory, that has since been freed, are know as "Dangling pointers". While the pointer still points to the same location, this location is no longer representative of the dynamic state associated with the original assignment of pointer. Checking errors having to do with dynamically allocated memory requires a great deal of support from the error processing back-end. In such cases, every block of memory which is "allocated", usually through the use of malloc, must be included into an allocation map, which is a special list holding information about any allocated blocks at run-time. Each allocation record contains the following information:

- Block size
- Starting address of the block
- Addresses of pointers that point to the block
- List of pointers that are contained within the block
- State information about the block of memory.

As an example, consider the following code:

```
int main()
{
   char *ptr;
   ptr = malloc(10);
   ptr++;
   free(ptr);
   return 0;
}
```

This example will be used to both describe the record keeping of the back-end error checking engine, and to illustrate how the code must be instrumented in order to detect the case of trying to free a pointer that does not point to the beginning of a block.

To understand how the intermediate code is to be instrumented, an understanding of what types of information and checks will be needed. First, in the case of pointers, the error checking engine will have to be told, at the start of the function (or current scope) what variables, or memory addresses represent pointers. This allows the back-end to create a pointer entry, which does not yet point to anything. Additionally, the back-end must be informed of any call to malloc (the memory allocation function) so that it can create an allocation record for the memory. The back end must also be told about any assignments of pointers, so that the pointer can be associated with the allocation block record in the back-end. Having this allocation record, the back-end then can perform checks on this allocated block, and associated pointers. In this particular example, the pointer being freed, no longer points to the beginning of the block, and the back-end could check this, since it knows the address of the pointer, and using this can figure out that the value of the pointer actually points to somewhere in the block other than the beginning, and thus report the error.

Figure 6 shows a representation of the original intermediate code generated by the compiler. In the analysis of the code, there are a few key points that the code analyzer recognizes:

1. The current scope contains a pointer "ptr" which is assigned and used.
2. There is a call to the memory allocation mechanism (malloc in this case).
3. "ptr" is assigned to point to the allocated block.
4. "ptr" is being incremented
5. There is a call to the memory deallocation mechanism (free in this case).
6. The argument to the deallocation function is pointer "Ptr".

First, the analyzer observes, in the declarations section, that a ptr is to be used. This pointer would then need to be declared to the error checking back-end as a pointer which is not yet assigned a value. Second, the analyzer sees that there is a call to the memory allocator, and that "ptr" is assigned to point at the allocated memory. This would result in some special calls to the back-end to letting it know that there is pointer "ptr" which points to the beginning of the block returned by the memory allocator. The analyzer then observes that the pointer "ptr" is incremented (reassigned to "ptr + 1"). The back-end is told of the reassignment to "ptr" which basically amounts to "ptr" pointing to the same block, however, now it no longer points to the beginning of the block. The analyzer then sees the call to the memory deallocation function, and checks the argument "ptr" which is supposed to hold the beginning address of an allocated memory block. The error-checking back-end could then, at run-time, check that the argument to the memory deallocator points to the beginning of a block, which in this case, it does not, and could report the appropriate error message. Figure 6 shows the Instrumented version of the intermediate code, after the analyzer has run. The inserted blocks are: (1) declare the "ptr" as a pointer address, (2) relate the assignment of the pointer to the allocated block, (3) indicate that the pointer now points to the location "ptr + 1", which is still in the same block, but no longer pointing to the beginning, and finally (4) check the argument to the deallocation function, to check for a valid top of block.

Figure 7 depicts typical values for the information that is stored in the error-checking data base. A separate record exists for any block allocated (data record) and for any pointer declared (pointer record). The top portion of the diagram shows that there is a block starting from location 60c0 and ends at 60c9 (10 bytes). It shows that there is one pointer pointing to this block, whose last known value was 60c0, the beginning of the block. The bottom portion of Figure 7 shows the run-time state after the "ptr" is incremented, and the last known value of "ptr" is now 60c1, which is no longer pointing at the beginning.

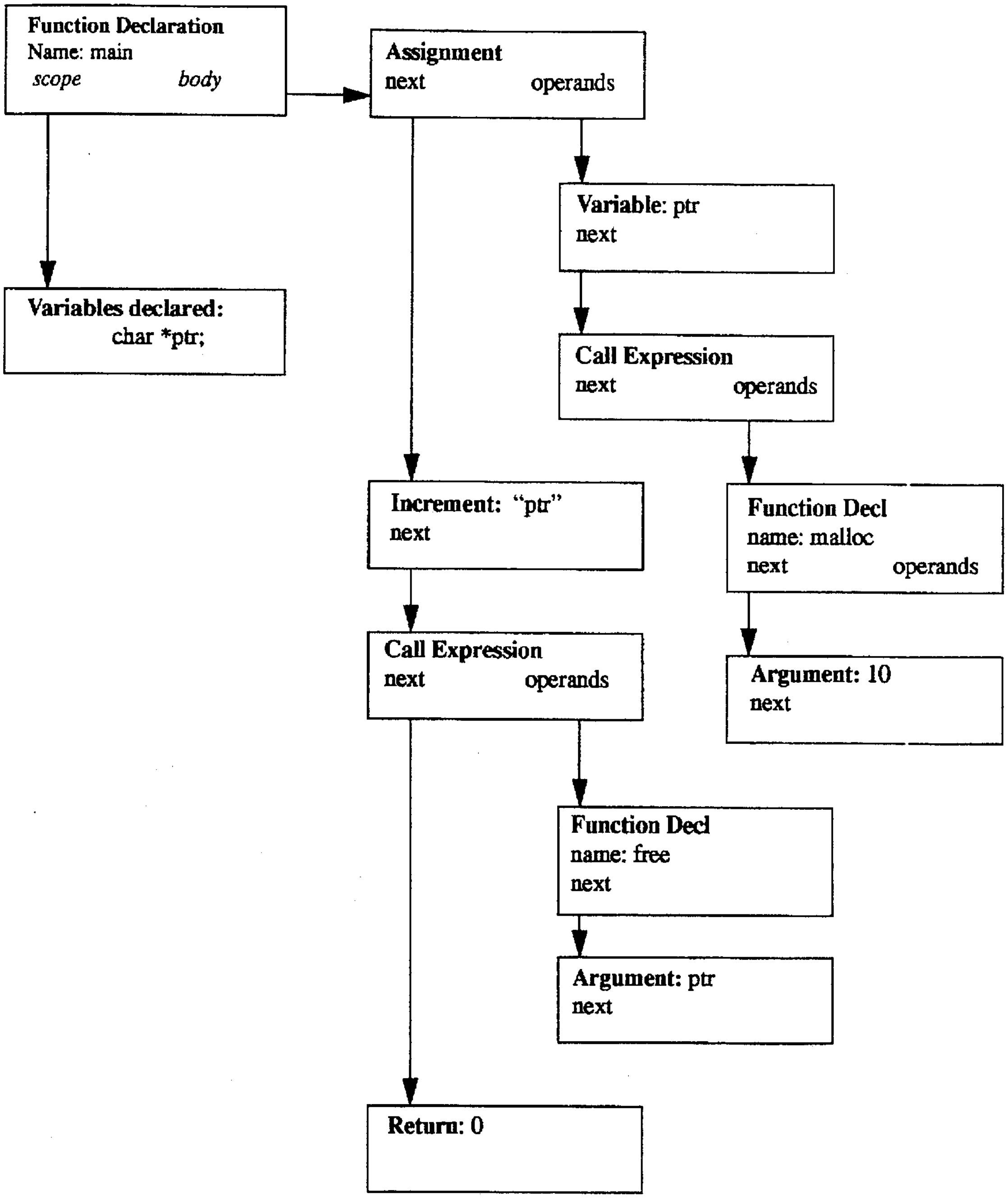
Figure 5: Intermediate code of Original Memory Manipulation Problem

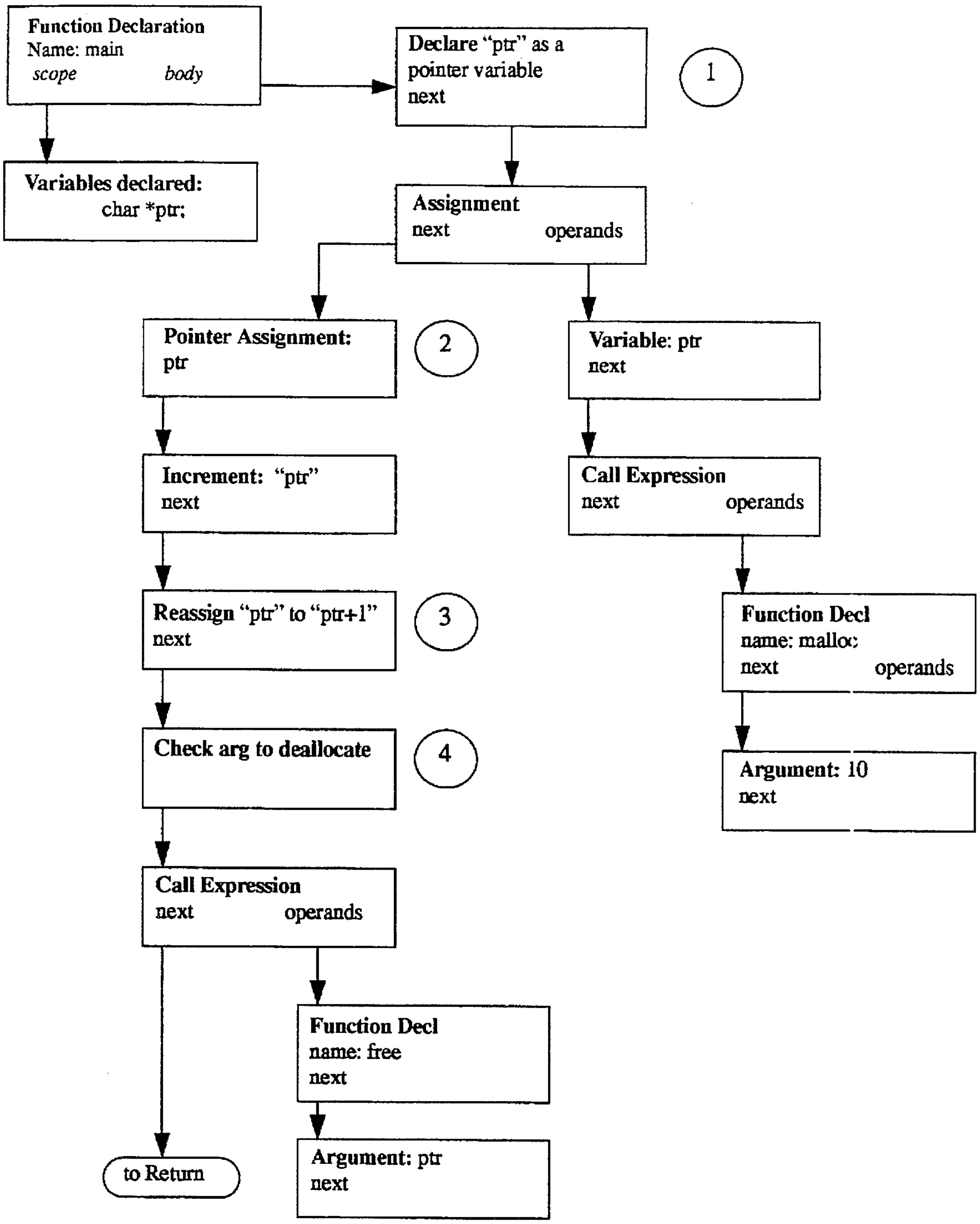
Figure 6: Intermediate Code with Dynamic Memory Checking Instrumentation

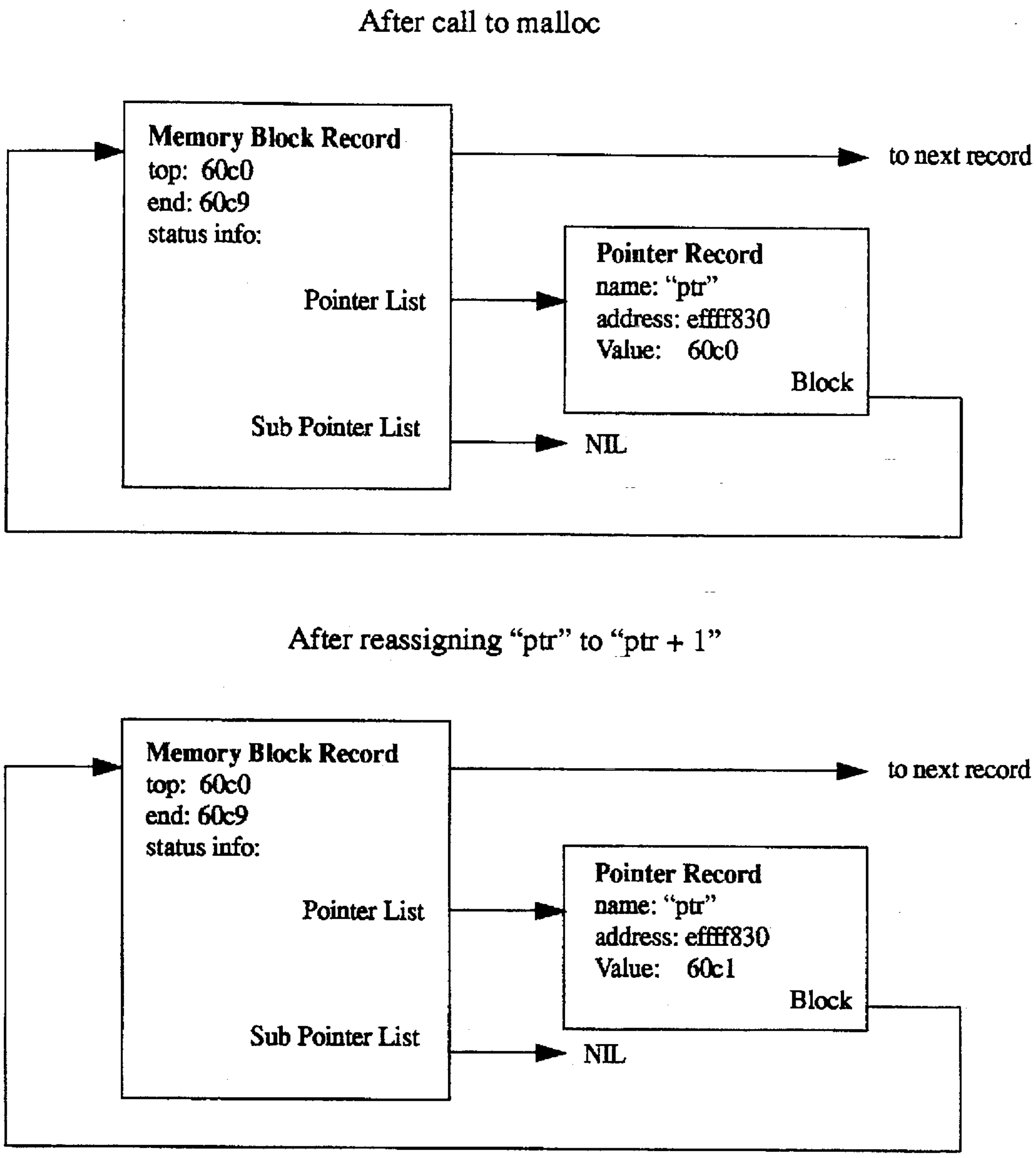
Figure 7: Example dynamic memory data base information

2.1 .4 Inappropriate Use of Pointers

On many occasions, errors occur due to the inappropriate use of pointers. Such types of errors include:

- Operations on NULL pointers.
- Operations on uninitialized pointers.
- Operations on pointers that don't actually point to valid data.
- Operations which try to compare or otherwise relate pointers that don't point at the same data object.
- Attempts to make function calls through function pointers that don't actually point to functions.

Consider the following code fragment:

```
long a, b, (*foo)();
foo = (long (*)())&a;
b = foo();
```

This example, although admittadly contrived for simplicity, illustrates the use of function a pointer that does not actually point to a function. In this particular case, the function pointer actually points to a location in the programs stack, instead of to an appropriate entry point in the code segment, and this error can be detected.

In this example, the instrumentor realizes that the program is using a function pointer, and inserts the appropriate checks before any use of the pointer. Each check will determine wheather the pointer actually points to a valid entry point in the code segment, or is actually pointing to some other area of memory which is inappropriate.

Figure 8 shows the intermediate code for the fragment of code. Figure 9 shows the instrumented version of the intermediate code. Two insertions are shown, (1) is the declaration of the function ptr "foo" to the runtime ptr tracking. (2) is the the actual check for the bad function pointer. In this case, the runtime checking would determine that the value of the pointer, is an address on the stack, and is not an appropriate function address.

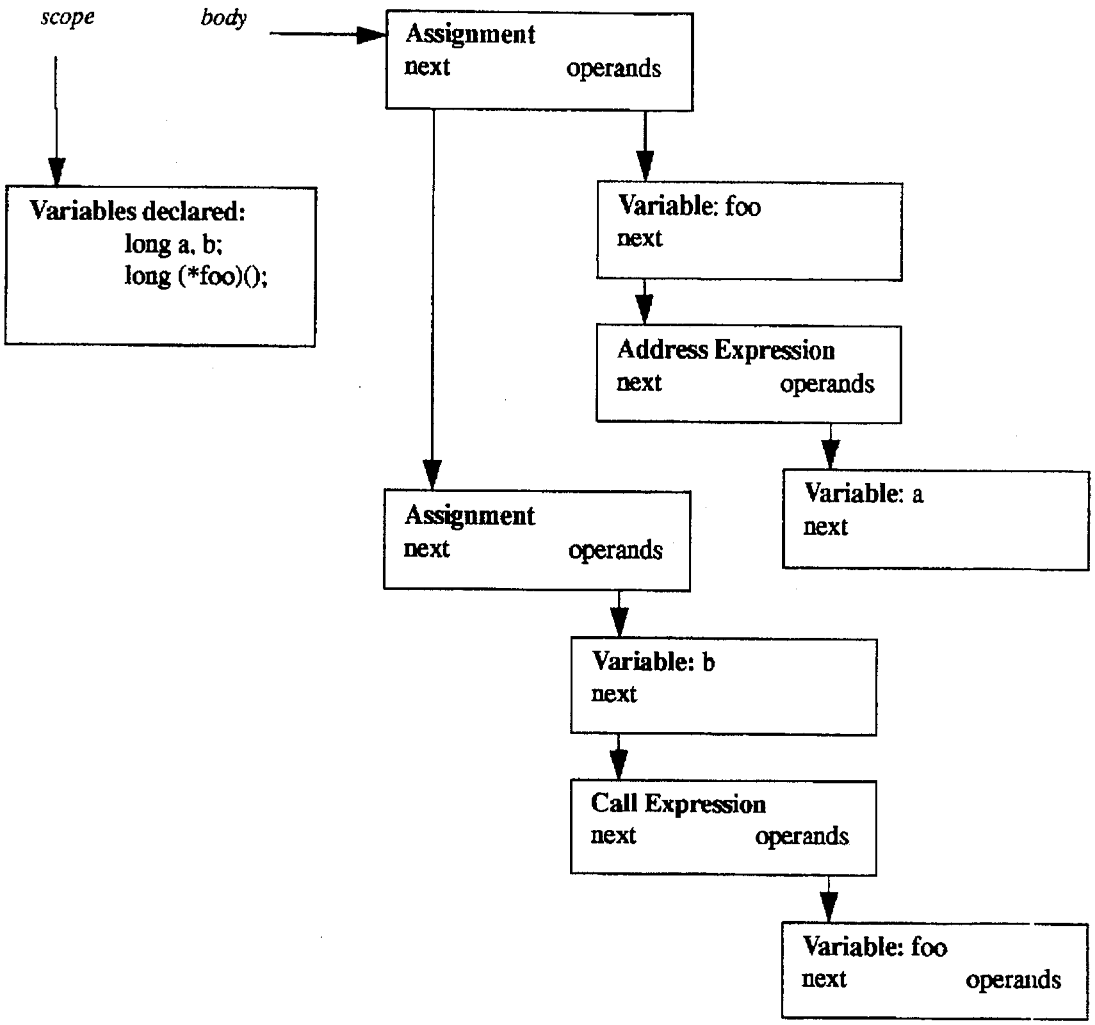
Figure 8: Original intermediate code for bad function pointer

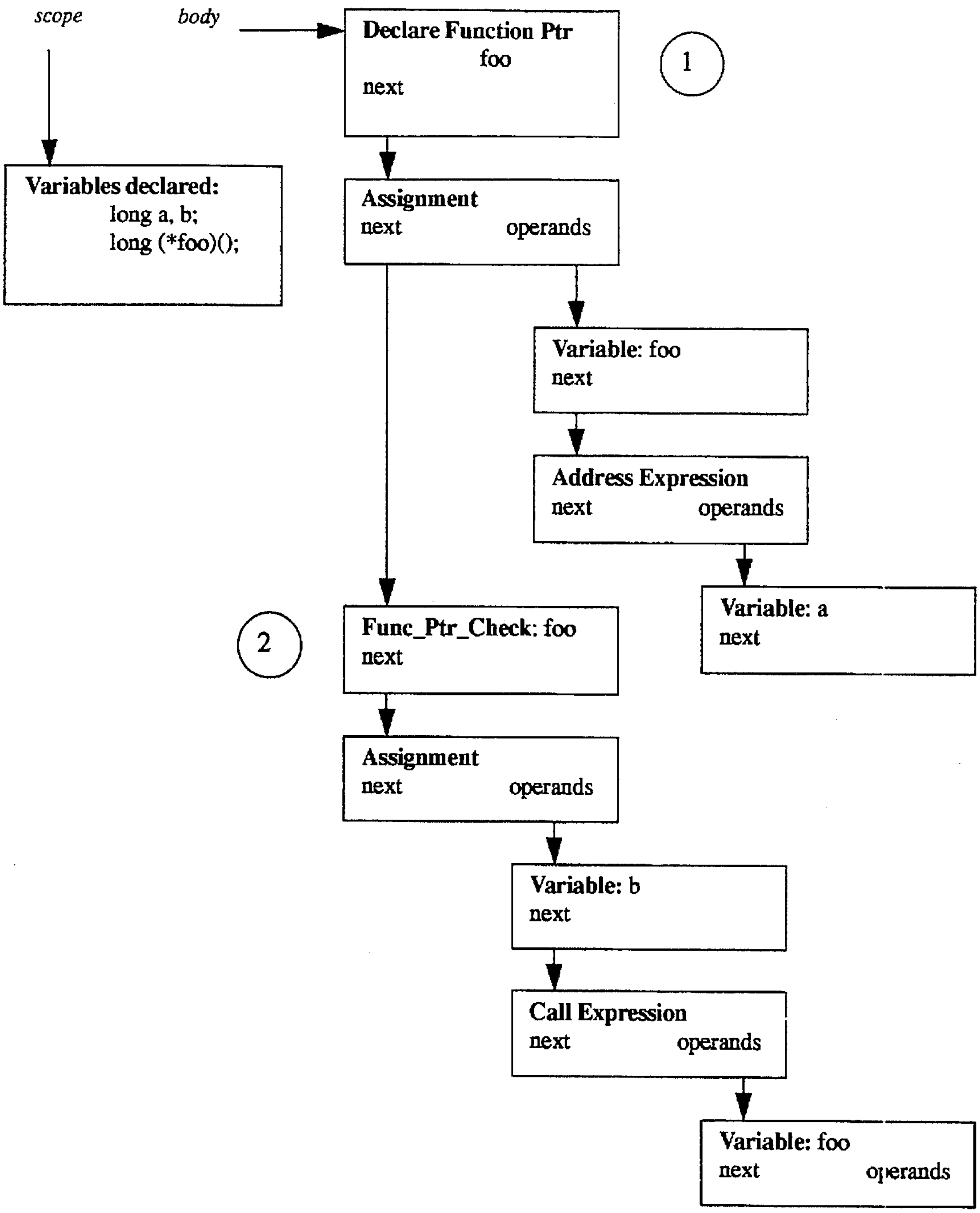
Figure 9: Instrumented intermediate code for bad function pointer

2.1 .5 Memory Leaks

Memory leaks occur when a dynamically allocated memory block, is no longer referenced by any pointer, and thus can never be freed. Memory leaks can be categorized as follows:

- Leak while freeing memory.
- Leak return value.
- Leak Scope.

A leak while freeing memory can occur when a block of memory is freed, which contains pointers that point to other allocated memory, thus losing any references to the memory. Leaking a return value happens when a function call returns allocated memory, but the calling function does not assign it to a pointer. Leak scope will occur when a pointer to memory in local scope, does not free the memory it uniquely references, before it goes out of scope.

Consider the following code fragment:

```
void foo()
{
   char *ptr = malloc(10);
   return;
}
```

Here, there is a local variable "ptr" which is assigned the value of the memory allocator. The function foo then returns (with ptr going out of scope) and the memory pointed to by "ptr" is leaked, since "ptr" is no longer accessible. Figure 8 shows the intermediate code for this code fragment. The instrumented code, shown in Figure 9 shows how the pointer is declared to the run-time as a local pointer. It is assigned the return value of the allocation function. Since it is the only pointer to reference the memory returned by the allocation function, when it goes out of scope, the memory is leaked. The check then, comes just before the scope is about to be left (right before the function returns in this case). The error-checker keeps a record for each pointer on the stack (local pointers) with each record indicating the block of memory that it points to. Now when the function exits (or the pointer goes out of scope), the error-checker is informed, by the "POP SCOPE" directive. When a pop-scope happens, the error-checker can then look at the list of pointers, declared at that scope. For each pointer, if the block of memory that it is pointing at, is only pointed to by this pointer, then when the pointer goes out of scope, the memory is leaked Instrumenting code to detect memory leaks follows several steps:

1. Initialize a pointer record for each pointer.
2. For any assignment of a pointer, update the pointer record, to indicate that the pointer points to the rhs (right hand side) of the assignment.
3. Update the memory block record's pointer list, to indicate that the pointer is pointing at it.
4. Upon exit from a scope, clear any pointer records.

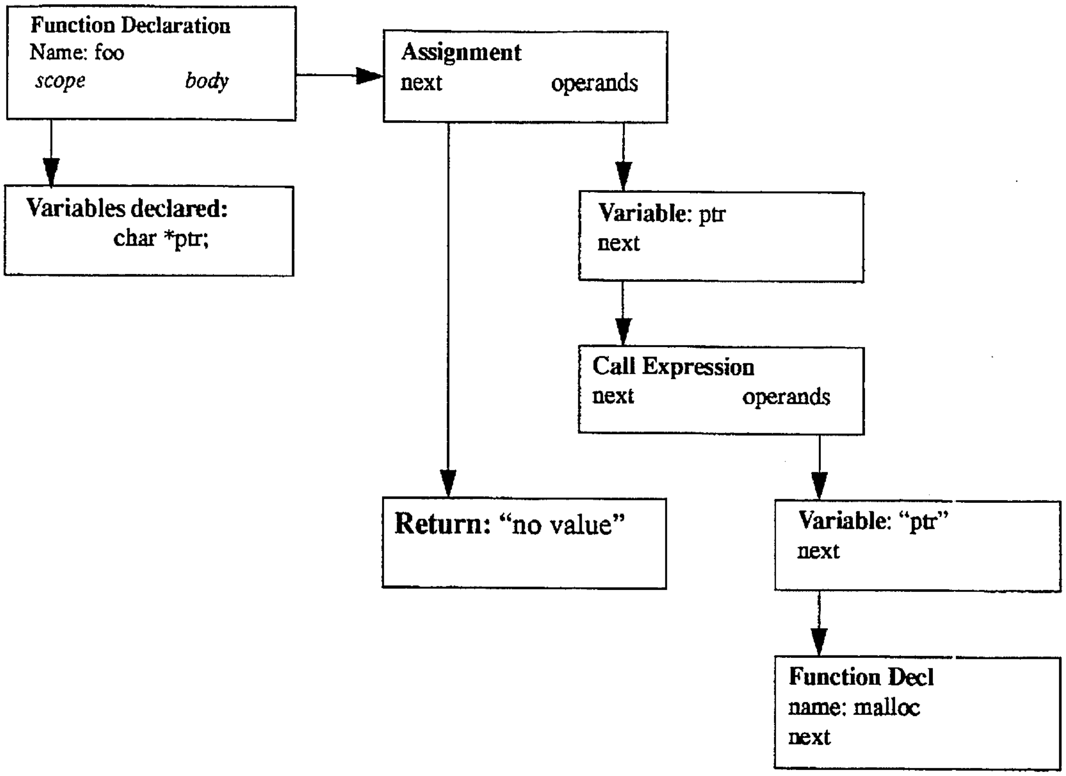

Figure 10: Original Intermediate Code for Memory Leak Example.

Leaks are then detected if any of the following is true:

1. During an assignment of a pointer, if the memory that used to be pointed to by this pointer, is only pointed to by this pointer, that block is leaked.
2. Upon exiting a scope, if for any pointer that will now leave scope, there is a memory block which is only pointed to by this pointer, that memory block is leaked.

In Figure 9, block (1) indicates the code insertion which declares the local pointer to the error checker, and block (2) shows the pop-scope call, which checks for blocks uniquely pointed to by pointers in the immediate scope of the local stack frame. Figure 10 shows the run-time data base for the allocated block, associated pointers, and local pointer stack. As is shown in the diagram, the pointer record is included in the local pointer stack, as well as on the pointer reference list of the allocated block it points to, including a back pointer to the block. The pop-scope, in this case then removes the pointer from the pointer stack, and it removes it from the reference list of the block it points, at which time it recognizes and reports the leak scope error.

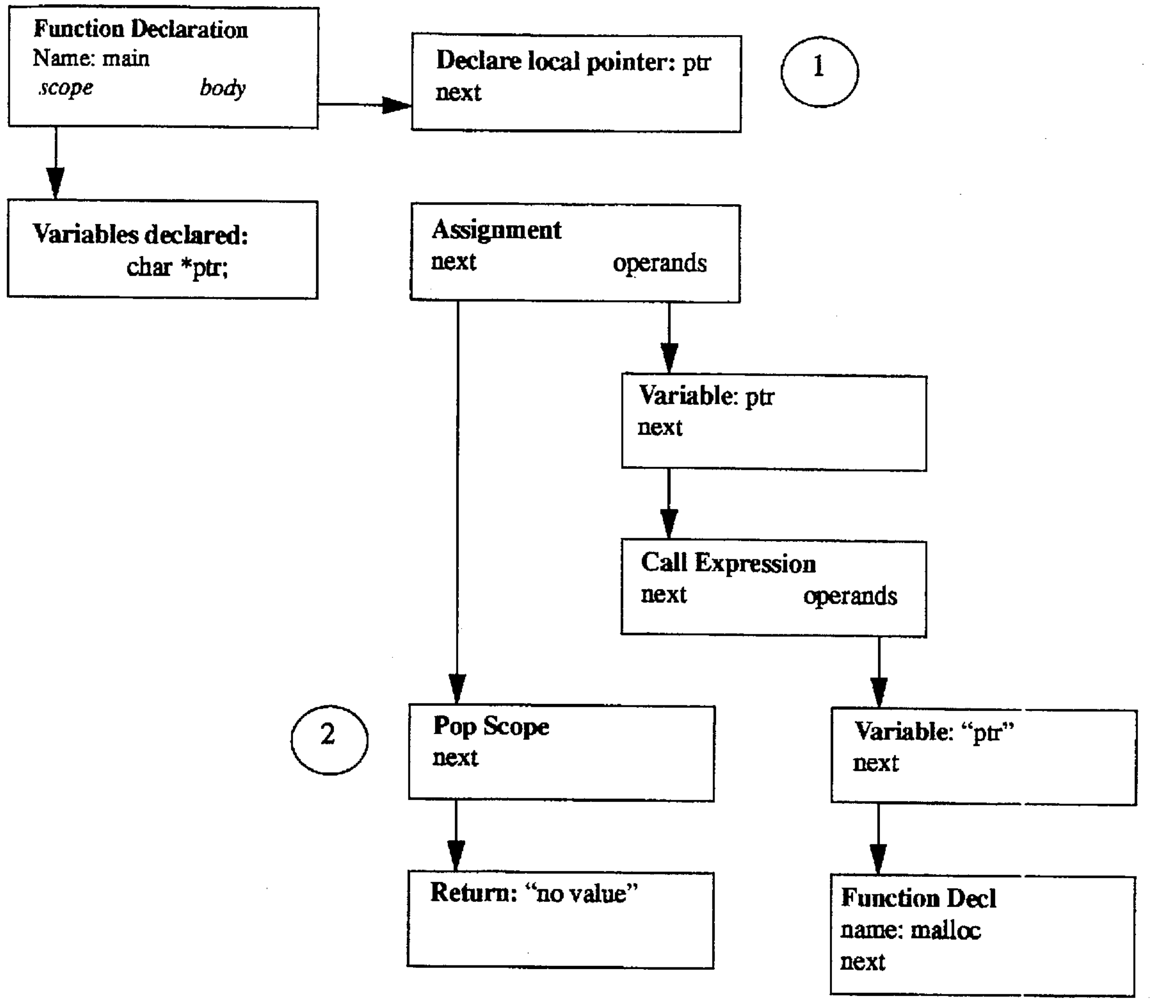
Figure 11: Instrumented Intermediate Code with Leak Checks

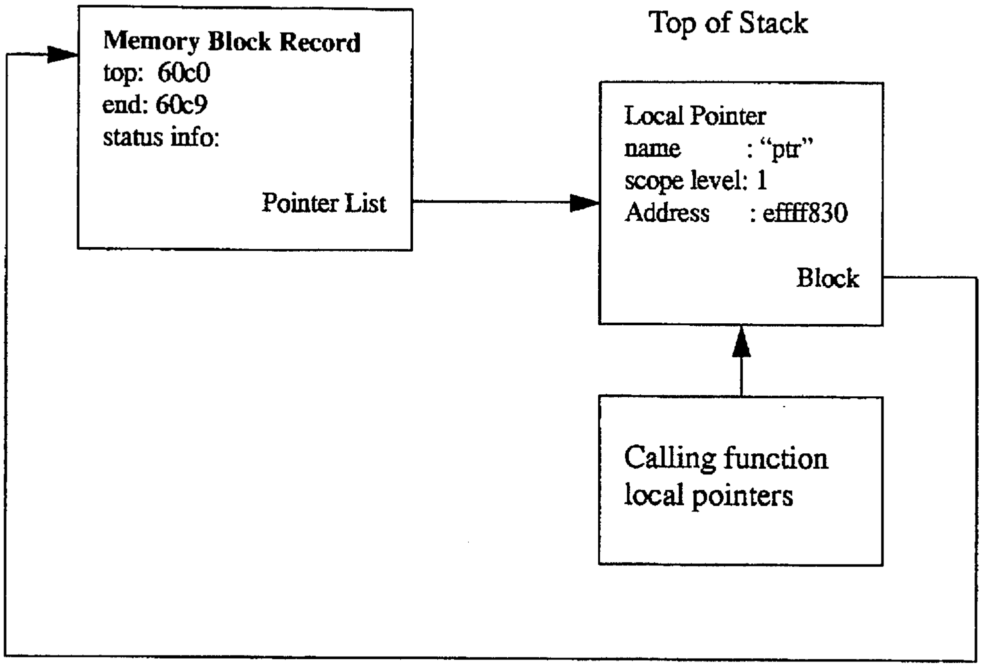
Figure 12: Run-time data base showing pointer stack and allocated block records

2.1 .6 User Defined Interfaces

User defined interfaces allow the user to add custom error checking to function calls. An interface is essentially a means of enforcing rules on the way that a function can be called, and the side-effects it has on memory. Typically interfaces check that all parameters are of the correnct data type, that pointers point to memory blocks of the appropriate size, and that parameter values are in correct ranges.

User defined interfaces look just like regular C code, and consist of the following:

1. The declaration for the function (ANSI or K&R style)
2. The body of the interface, which may contain error checking or iic_ function calls.
3. A seemingly recursive call to the function itself.

The function declaration is used in order to do strong type checking on the function arguments. This is useful for programs that are written and normally compiled using a K&R varient of C, which does not do strong type checking. The iic_ prefixed functions are used to inform the run-time back-end about conditions of memory, pointers, etc... that the function effects. Finally, the interface contains what appears to be a recursive call to the function itself.

Consider an interface for malloc(), a memory allocator:

```
char * malloc(size_t size)
{
  char *a;
  if (size <=0 )
    iic_error("Bad malloc size");
  a = malloc(size);
  if (a)
    iic_alloc(a, size);
  else
    iic_error("malloc failed");
  return a;
}
```

An interface is sort of like a complicated macro definition, in that for a given function call observed in the intermediate code, the parse tree, for the original function call is replaced by the user defined interface for that call, with the exception that the iic_ prefixed functions are expanded into calls to the run-time back-end. iic_alloc(a, size) tells the runtime that a block of memory of size "size" has been allocated, and is pointed to by pointer "a". Before an interface can be used by the instrumentor, it is first processed, and saved in an intermediate from on disk. Then, when a function is incountered in the code being instrumented, that has a preprocessed interface stored on disk, this file is read, and the interface is inserted into the intermediate code, replacing the previous call to the function.

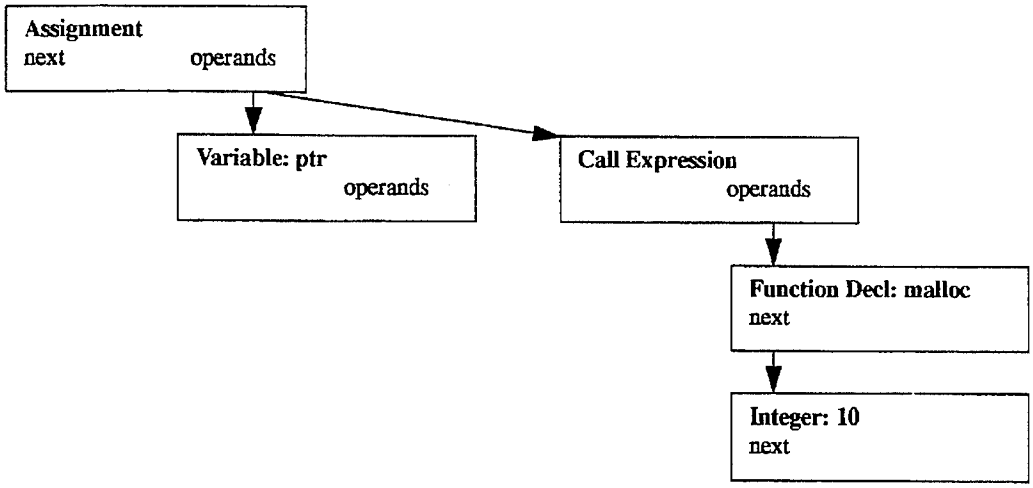

Figure 13: Intermediate code for function call to malloc

The code fragment:

```
1 ptr = malloc(10);
```

originally has the intermediate form shown in Figure 13. After the expansion of the interface, by the instrumentor, the intermediate code shown in Figure 14 results.

The instrumentor processes an interface as follows:

1. Identify a function call that has a corresponding interface description in the interface database.
2. remove the existing function call from the parse tree.
3. read the interface intermediate code from the data base.
4. insert the interface intermediate code in place of the original function call.
5. substitute the actual function call arguments into the appropriate place-holders in the interface intermediate code. (similar to a macro expansion).
6. replace the return statement of the interface with an assignment to the result of the actual call to the function.

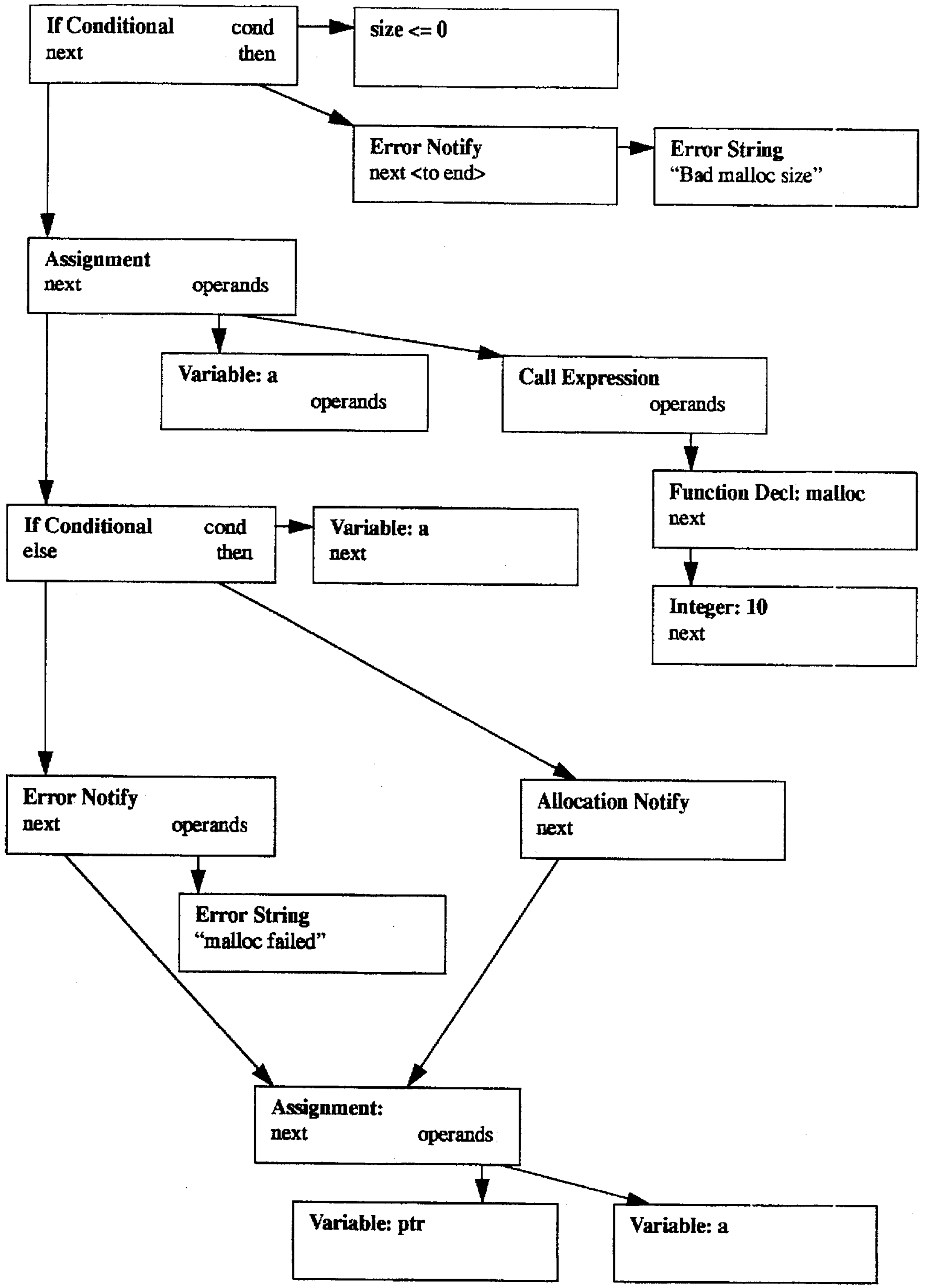
Figure 14: Intermediate form after instrumenting malloc interface

2.2 Intermediate Code Insertion for Automatic Test Case Generation

Another useful application for compiler intermediate code insertion, is for purposes of automatic test case generation. This is a process by which test case data, for program inputs, is generated automatically, which will attempt to achieve:

1. Full testing of all flow paths in the executable program.
2. Identify inputs that cause the program to perform incorrectly.

This technique involves analyzing the code to identify points where input data is needed, and then to use various techniques, ranging from random number generation to heuristic flow analysis techniques, to generate a set of input cases that satisfy the criterion above. The resulting program is then linked to a "test harness" which repeatedly runs the program, with different inputs, adding unique test cases to a data base of test case data. The algorithm converges when the criterion above are met, or no new test cases can be generated, in a reasonable amount of time.

Since it is desired to identify cases that cause the program to generate a fault, or perform incorrectly, the embedded debugging functionality of the previous sections is employed. Then as test cases are being generated, any case for which the error-checker reports a problem, is added to the test-case data-base. Figure 10 shows the block diagram of an example program. Here it is seen that the program takes its input from various input sources, such as a computer keyboard, or a file on disk, and generates certain outputs. Figure 11 shows the a block diagram of the instrumented

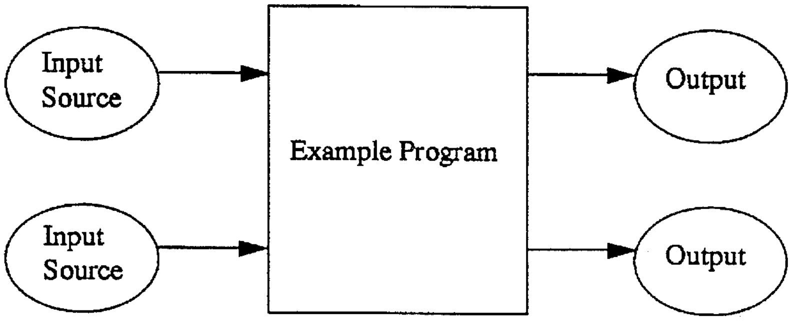

Figure 15: A Typical Program with Input and Output code, and run-time support blocks, that the instrumented code interacts with. Additionally, the input sources have been replaced by the input generated, which uses information from the run-time error checker, and heuristic test case generator, to generate new test cases. The output analyzer evaluates the outputs of the original program, and that of the error-checker to evaluate the result from the current set of inputs. If an error is detected, or if at least one new flow path has been executed in the example program, this test case is added to the data base. If the set of inputs does not generate an error, or there are no new paths executed, it is discarded, and the system moves on to another test case.

Consider the following code:

```
void foo()
{
   char b, c, *ptr;
   c = getchar();
   if (c < '0' || c > '9') {
      *ptr = 0;
   }
   b = c - '0';
}
```

In this code, the programmer expects the input to be an integer, and if it is not, there is some

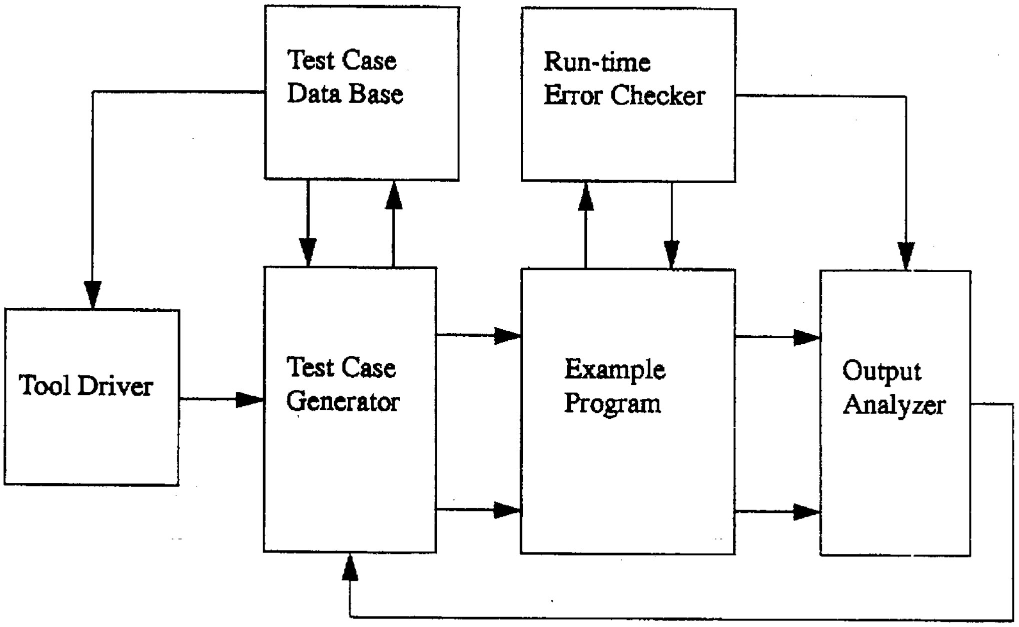

Figure 16: Test Case Generator Block Diagram default operation, which in this case would not function properly. Typically, however, exception conditions happen rarely, and the code that handles the exception is often times never tested, since in practice, they rarely occur. In this case, the exception condition would cause the program to fail, since "ptr" is not yet initialized before it is dereferenced. An internal representation of the program is shown in Figure 12.

The analyzer now must locate points where the program is getting input, in addition to the embedding error-checking code. This allows the Tool Driver to choose inputs, at run-time, that will force the program to execute paths that may previously have never been tested. For the simple example in this case, if the input function "getchar()" returns any character whose ascii value does not fall within the numeric range (ascii 48 - 57), the program would fail. The test case generator, would then replace the input call to getchar() with a character generator, which could take random values. This would quickly lead to execution of all paths, after sufficient sample inputs have been

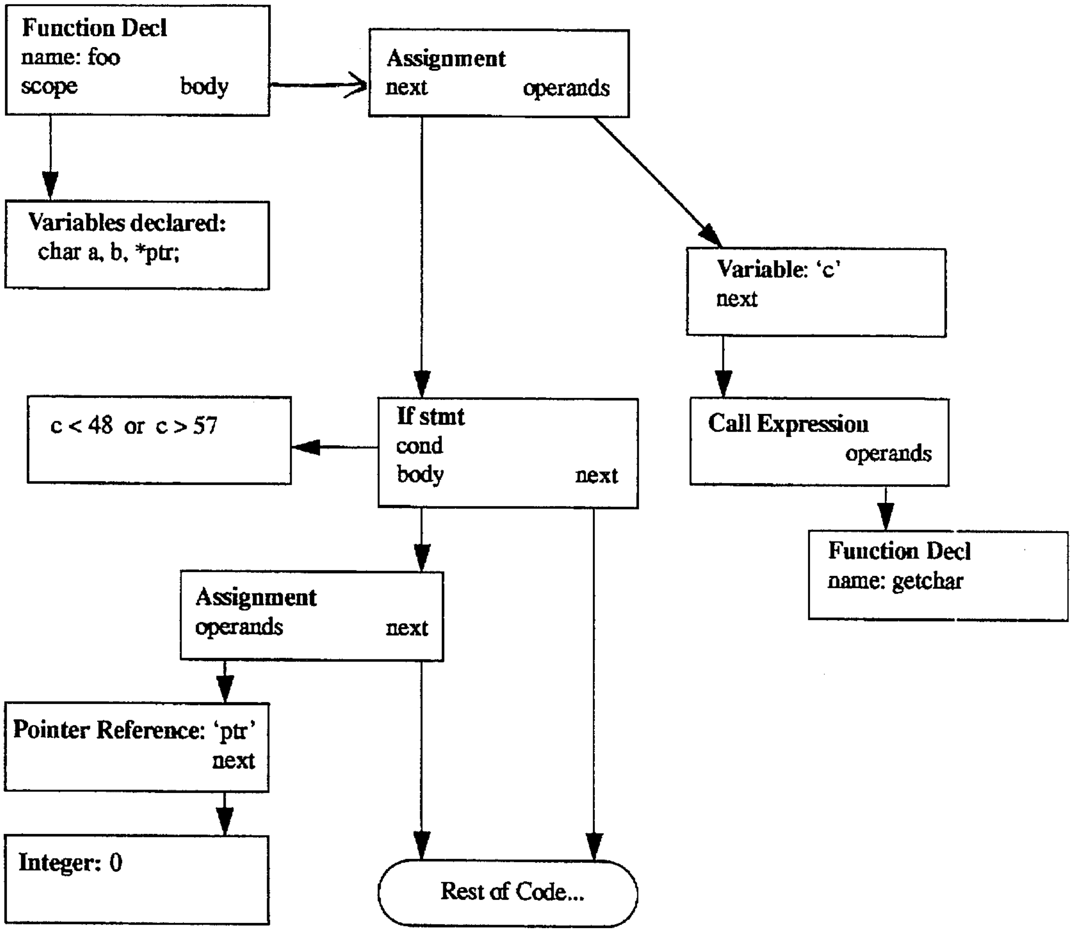

Figure 17: Intermediate Code for Untested Exception Handling Code tried. Figure 13 shows the instrumented version of the code. As is denoted by the numbers, some code has been added to the code, and in one case, some code has been replaced. At the start of the program, a declaration for pointer 'ptr' is added, which is essentially a procedure call to the error-checker, informing it that there is a pointer in this scope. In order to have control over inputs that are received by the program, the call to getchar() is replaced by the Input Generator, which in this

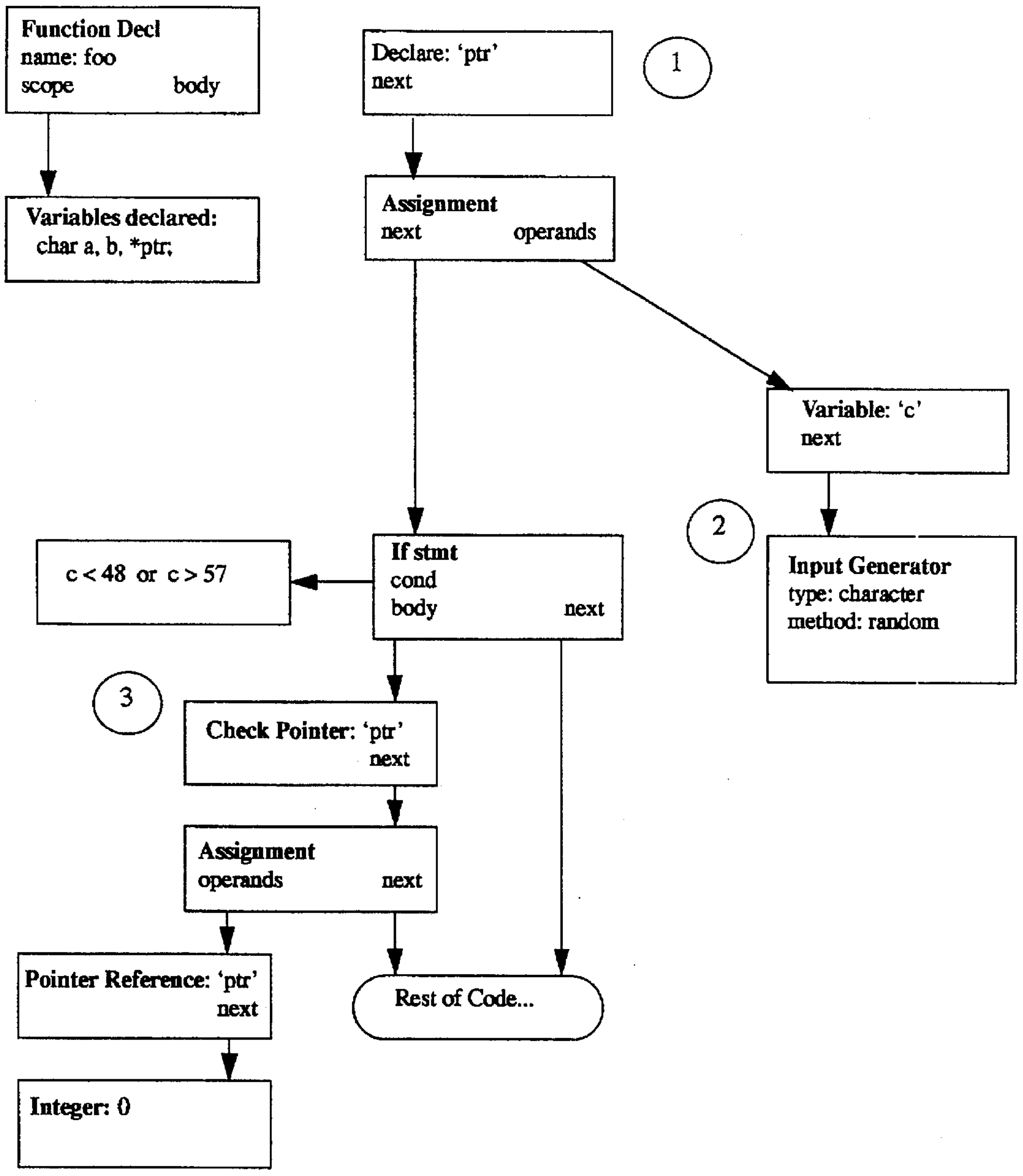

Figure 18: Instrumented Code with Test Case Generation Calls case generates random inputs between 0 and 255. Finally, there is an error test for the dereferencing of the pointer 'ptr', which in this case would probably fail, since 'ptr' was never initialized, and is probably pointing to some invalid address.

The compiled instrumented version, is then linked with the error checker run-time, as well as the tool driver, output analyzer and data-base control. The tool driver will then run the program repetitively, using different inputs, until all paths in the program are executed.

After the test case generator has run to completion, the data-base now contains a set of test data, each of which either results in the program taking a unique set of paths through the program, or results in a failed run of the program. Test data for which the program fails, can then be analyzed, and the code corrected, so that future runs of the code are more robust.

3 Concluding Remarks

Extending a compilers functionality to include the embedding of code for automatic run-time debugging and for automatic test case generation is a novel invention, currently being developed at Parasoft Corporation. Given the rich amount of information that a compilers intermediate code contains, it has been shown, that such added functionality is not only feasible, but truly represents the next generation of compiler technology. By augmenting the intermediate code, the resulting program, generated by the code generator, will allow the program to not only function as it was originally intended, but will contain the added functionality of automatic run-time debugging. This will greatly improve the quality of the final version of the code, as run-time errors have been automatically detected by simply running the program. In addition, test case data can be automatically generated, to insure that maximum testing can be performed.

8. Overview of the Design of *TGS* System

The *TGS* system attempts to automatically generate test case data for a given program with the following criteria in mind:

- Full testing of all flow paths in the executable program.
- Identify inputs that cause the program to perform incorrectly.

The technique involves analyzing the program's code to identify points where input data is needed. The input instructions are then replaced with special functions which are able to simulate input using various techniques, ranging from random number generation to heuristic flow analysis techniques, to generate a set of input cases that satisfy the criterion above.

The resulting program is then linked to a "test harness" which repeatedly runs the program, with varying input, adding unique test cases to a database of test case data. The algorithm converges when the criterion above are met, or no new test cases can be generated in a reasonable amount of time.

Figure 1 shows the block diagram of an example program. It can be seen that the program

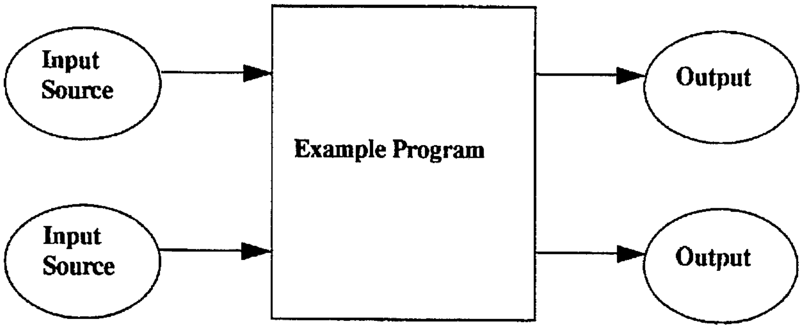

Figure 1. A Typical Program with Input and Output takes its input from various input sources, such as a computer keyboard, or a file on disk, and generates certain outputs. In order to automatically generate input for this program the *TGS* System has to analyze the program's source code, find which instructions of the program correspond to the input, and replace them with code which can simulate input.

This is done using the technique of source code instrumentation. We will describe the details of this technique in the following example:

```
void foo()
{
        char b, c, *ptr;
        c = getchar();
        if (c < '0' || c > '9') {
            *ptr = 0;
        }
        b = c - '0';
}
```

In this code, input is done through the function `getchar`. The programmer expects the input to be an integer ranging from 0-9. If the input value received is not in that range, the program is designed to take the default operation, which in this case would not function properly. This is called an exception condition. Typically, however, exception conditions happen rarely, and the code that handles the exception is often times never tested, since in practice, exception conditions rarely occur. In this case the exception condition would cause the program to fail, since "`ptr`" is not yet initialized before it is de-referenced.

An internal representation of the program is shown in Figure 2. The boxes in the picture represent different nodes in the programs's "parse tree". Statements in the program are represented by one or several nodes in the parse tree. Each node has the field "next". This field points to the next node in the parse tree, or if the node is a leaf this field is 0. Consider the statement:

```
c = getchar();
```

This statement is represented by the "Assignment" node. The "next" element of that node points to an `if` statement. The "operands" element points to two operands of the assignment: "`c`" - left side and "`getchar`" - right side.

The parse tree is generated from the source code of the program through a process called parsing. The parser is a tool which is specifically designed to read the source code of a program written in a specific language and convert it into a parse tree. In our Phase I work we were able to use the standard *ParaSoft* C parser, therefore we didn't have to develop a new parser. In Phase II when extending the tool to work with C++ we will use our standard *ParaSoft* C++ parser.

The representation of a program in terms of a parse tree is unique and has a one to one correspondence to the original source code. In fact it is possible, and we use this technique, to generate source code out of the parse tree. A tool which does this is called a code reconstructor, and it works inversely to the parser.

It should be mentioned that the representation of a program in terms of a parse tree has several advantages. The most important one is that a parse tree is easy for computers to operate on. The second advantage is that a parse tree representation of the program is language independent, and any operations or tools which operate on it do not have language dependencies. This means that most of the work which is done during the Phase I I research is useful for other languages as well as C and C++. In fact internal tools do not need to be changed when the prototype is modified to work with other languages.

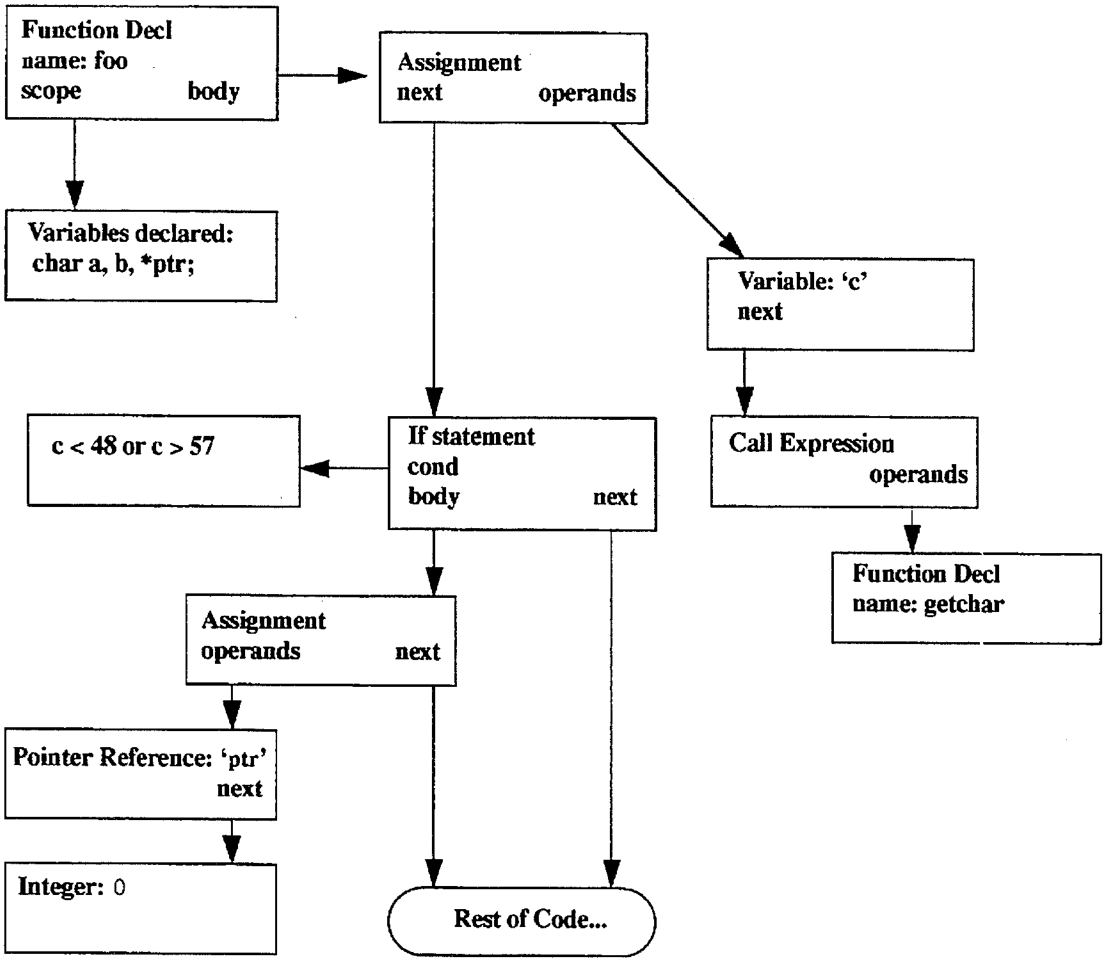

Figure 2. Intermediate Code for Untested Exception Handling Code

Once the program is translated to a parse tree the *TGS* tool applies the code analyzer to locate points where the program is getting input. This allows the Tool Driver to choose inputs, at run-time, that will force the program to execute paths that may have previously never been tested. For the simple example in this case, if the input function "`getchar()`" returns any character whose ascii value does not fall within the numeric range (ascii 48 - 57), the program would fail. The test case generator, would then replace the input call to `getchar()` with a character generator, which could take random values. This would quickly lead to execution of all paths, after sufficient sample inputs have been tried.

The code analyzer not only analyzes the code, but also instruments it to replace input functions with input generation functions.

Figure 3. shows the instrumented version of the code. As is denoted by the numbers, some code has been added to the code, and in one case, some code has been replaced. In order to have control over inputs that are received by the program, the call to `getchar()` is replaced by the Input Generator, which in this case generates random inputs between 0 and 255.

During the instrumentation phase, in addition to the instrumentation needed for input generation, three additional instrumentations are performed:

- Instrumentation for coverage analysis.
- Instrumentation for block flow.
- Instrumentation for branch condition analysis.

Instrumentation for coverage analysis is necessary. The information provided by it is used as a criterion for accepting or dismissing a test case.

The instrumentation for block flow monitors the flow of the program, stores it, checks if the desired flow is taken, and makes the decisions regarding continuing execution of the program or not.

In the instrumentation for branch condition analysis, the branch conditions are replaced by an equivalent real valued function plus a call to the run-time that monitors its value.

The parse tree modified in this way represents an "instrumented parse tree". This tree is the passed to the code reconstructor to build the instrumented source code for the routine. The instrumented code is consequently passed to the language compiler The compiled version is then linked with the *TGS* input generation library into a final program ready for test generation.

During code instrumentation, information about program flow, input statements, and branch condition form is stored in the database files. This information is used during the test generation process, and helps to decide which paths need to be analyzed and how to generate input to force a program to take a specific path.

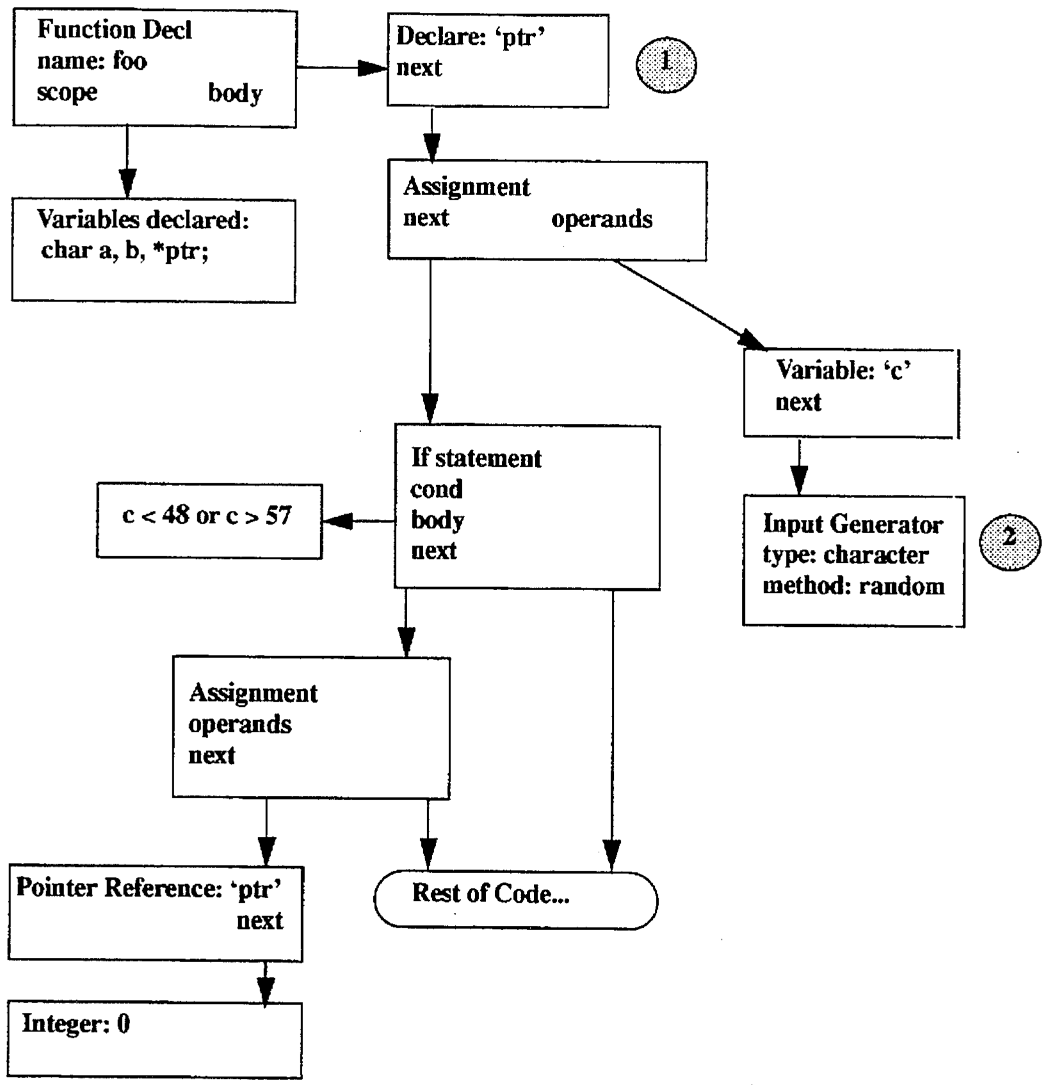

Figure 3. Instrumented Code with Test Case Generation Calls

Once the program is generated the *TGS* tool driver will then run the program repetitively, using different inputs, until all possible paths in the program are executed.

During that process every set of inputs which is generated is analyzed by the "output analyzer". This tool checks to see if the input set increases the overall coverage of the program. If this is the case then the set is included in the test-suite. If it does not then the input set is discarded. In the current version of the tool when making decisions about the input set we use block coverage criteria. This can be changed in the future to use other criteria, such as instance path coverage.

After the test case generator has run to completion, the test-suite now contains a set of test data. Each piece of data either results in the program taking a unique set of paths through the program, or results in a failed run of the program. Test data for which the program fails can then be analyzed, and the code corrected, so that future runs of the code are more robust.

Figure 4 shows the block diagram of the *TGS* System. The instrumented code interacts with the run-time support blocks. Additionally, the input sources have been replaced by the

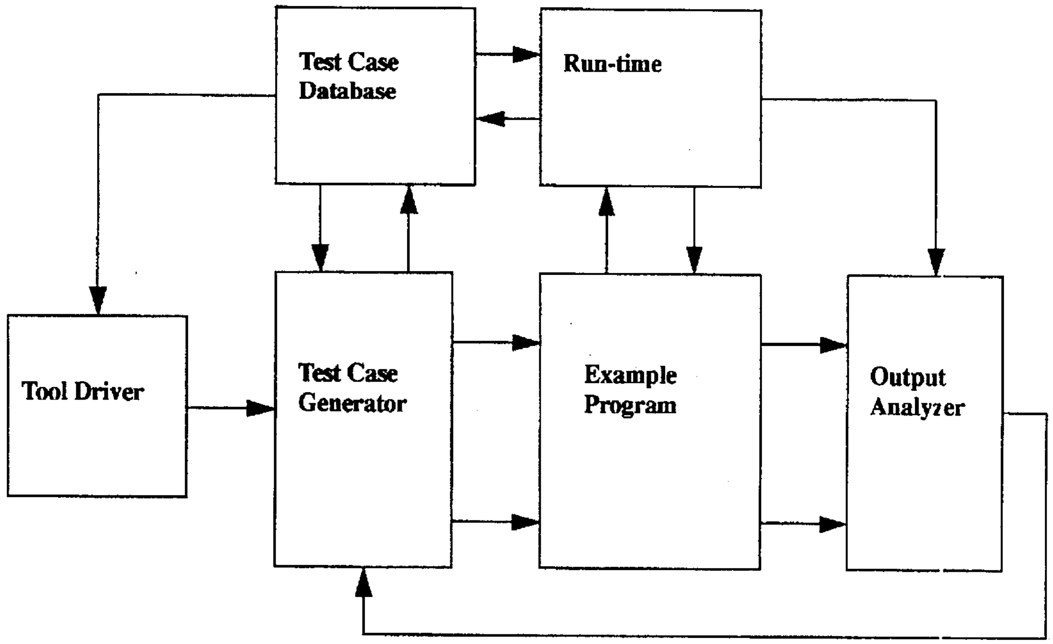

Figure 4. Test Case Generator Block Diagram input generator which uses information from the output analyzer. The input generator uses different techniques to generate new test cases. The output analyzer evaluates the outputs of the original program to evaluate the result from the current set of inputs. If at least one new flow path has been executed in the example program, this test case is added to the database. If the set of inputs does not cause new paths to be executed, it is discarded, and the system moves on to another test case.

The design described above is the skeleton around which we are going to work. The research which we will perform in Phase II is involved in finding new algorithms or enhancing the existing ones which are parts of the different blocks in Figure 4.

9. Technical Description of the Phase I Prototype.

A limited prototype for the Test Generation System (*TGS*) was built during the Phase I research. The prototype takes a C program as input and automatically generates input for the program that satisfies a given coverage criteria (i.e. builds a test-suite for the program). The prototype was built with the following goals in mind:

- The system has to be as automatic and general as possible.
- The system has to be modular and expandable.

This was done so that the system can be easily experimented with, both with a variety of applications and input generation techniques. The prototype was built in such a way that it is a skeleton of a possible real system.

When developing the system we tried to minimize the dependency of the specific language, which is C. The language dependency is located in the code parser and code reconstructor. If these two modules are replaced, the system can work with any other language. The parse tree which we used is the standard *ParaSoft* tree format and it is used to support C, C++, Fortran77, and Fortran90. We also investigated the suitability of that tree to support Ada and we are confident that the tree structure is capable enough to support this language as well.

Modularity of the prototype is quite extensive. Modules interact with each other through well defined interfaces which are module independent. Replacement of modules and extensions to modules is easy and does not require modifications of other parts of the system.

First we will describe the basic functionality of the prototype and afterwards the different techniques we implemented to improve the generation of input.

9.1 Basic Input Generation System

The prototype generates test-suites using two basic steps:

- Analysis and instrumentation of the original program.
- Execution of the instrumented program.

9.1.1 Analysis and Code Instrumentation

During the instrumentation phase the program is parsed and analyzed, the results of the analysis are stored in a database for the program, and an instrumented equivalent version of the original program is generated. The instrumented C program is compiled and linked with a run-time library. The instrumented program has extra calls in it, the purpose of those calls is to:

- Automatically generate input for the program. The original input statements are replaced by calls to a run-time library that will generate the input.
- Record information about the program that is not available at compile-time. For example the flow taken by the program. This information is also stored in the database for the program.

This phase has been implemented by extending the functionality of *Insight*, which is our run-time error detection tool. The *TGS* tool is implemented as a new switch "-Ztgs" to *insight*.

We will describe the operation of the analysis and instrumentation of the program on a simple example. Consider that we have a program which has its source code stored in files `foo1.c foo2.c foo3.c`. In order to build an executable from it the user normally performs the following steps:

```
cc -c foo1.c
cc -c foo2.c
cc -c foo3.c
cc -c foo4.c
cc -o foo foo1.o foo2.o foo3.o foo4.o
```

Analysis and instrumentation is performed in a very similar fashion. The `cc` has to be replaced with `insight` and an extra switch "`-Ztgs`" has to be added. Thus in order to prepare a program to work with the *TGS* system the user needs to change the previous commands to:

```
insight -Ztgs -c foo1.c
insight -Ztgs -c foo2.c
insight -Ztgs -c foo3.c
insight -Ztgs -c foo4.c
insight -Ztgs -o foo foo1.o foo2.o foo3.o foo4.o
```

Notice that the changes are minimal. The syntax of the changes was chosen to be of that form in order to minimize changes required in users makefiles. It should be noted that these type of changes can be done by changing the one line in the makefile which defines the compiler from `cc` to `insight`. For example:

`CC=cc` becomes `CC=insight`

In the above example the first 4 lines perform analysis and instrumentation on independent source files. During that phase files with `.c` extensions are converted to `.o` instrumented object files. Notice that at that stage the following actions were performed:

- Analysis of the program.
- Instrumentation of the parse trees
- Reconstruction of the instrumented source code.
- Compilation with the compiler.

At the same time the tool generates information database files with `.db` extensions. These files contain specific program information needed by *TGS* and flow analysis.

At the last step the programs object files are linked together along with the library which contains the input generation routines and run-time support routines for *TGS*. The resulting object code is ready to be used by the second part of the *TGS* system.

We would like to stress here that we designed the system in such a way that it will be very easy to use. The design is based on our past experience with other development tools. The system is designed to be used frequently. This requires a very simple user interface and easy modifications from standard compilation to compilation for the *TGS* system. This should encourage users to use it. It does not matter how useful a system is, if it's complicated and has an awkward user interface it is not going to be used.

9.1.2 Searching for the Test Cases.

In the second step the program is executed repeatedly. This step is completely automatic and done by a tool driver. The tool driver continues executing the program using the different input techniques and analyzing the results of the execution. It stops execution when it finds complete (100%) coverage or is told to stop by the user. The tool driver organizes the results obtained and produces the following output:

- A report showing the progress of the input generation. Among other things it has information su as: the number of inputs generated, the program coverage they achieved, a summary of the actions taken, time spent, input generation techniques used, etc.
- A test-suite for the program consisting of the successful inputs generated, a set of inputs for which the program shows bugs. i.e. inputs for which the program crashed.

We will continue the description of the functionality of the prototype using the `foo` example which was begun in the previous subsection (9.1.1). The executable of the program ready to be executed by the tool is stored in the file `foo`. In order to start test-suite generation the user executes:

```
tgs foo
```

In this command `tgs` is the name of the tool driver. The tool takes several arguments and various flags. All possible options which can be passed to the tool are described in Appendix H which contains the `tgs` manual page.

Once the `tgs` command is executed the user is presented with the screen shown in Figure 5.

When *TGS* starts, it reports information on where the program was run and in which way it was invoked. Then it proceeds to generate test inputs. For every new input generated, *TGS* reports:

- Number of runs - attempts to generate input. This number is split into three numbers: total number of runs, number of test cases saved in the test-suite, number of test cases which reported run-time errors and are saved in the "Bugs Test-Suite".
- Code coverage information.This is reported as three percentage figures: Code coverage of this specific test, total coverage of the program which is stored in the test-suite, total coverage including the test-suite and the Bugs test-suite.
- Action which was taken regarding the input. If the input expanded coverage of the program, it is added to the test-suite. If the input forced the program to encounter an error, it is saved in the Bugs test-suite,

```
Test Generation System:
-----------------------------------------------------
Directory: /home/lion2/quality/test
Command : tgs -heu foo
Date : Mon Nov 28 12:07:51 1994
Testbed : sun4c SunOS 2 4.1.3_U1
Host : lion
```

| RUNS<br>Tot in TS bugs | Coverage<br>run TS Total | Action | Elapsed Time<br>Run Total |
|---|---|---|---|
| 1 1 0 | 3% 3% [3%] | added to test-suite | 0:25 [0:30] |
| 2 2 0 | 6% 7% [7%] | added to test-suite | 0:18 [0:52] |

Figure 5. Sample TGS Output otherwise it is discarded.

- Elapsed time of *TGS* execution in seconds. This is again reported as two numbers. The first number is the time spent executing the specific test case. The second number is the total elapsed time from the beginning of *TGS* execution.

During execution, *TGS* generates several directories and files where the output from the tool is stored. In the current directory where the program was executed, *TGS* generates a `tgsdir` directory which contains the results of the runs. In this directory the tool creates a subdirectory "`ts`" which contains the generated test-suites. Inside the `ts` directory each test case is stored in a separate subdirectory named `t#` where # is the consecutive number of the test-case. Each `t#` directory contains a subdirectory `in` and `out`. The `in` directory contains input files which the program will use to run the test case. These files can be passed both to instrumented and non-instrumented versions of the program, to run the specific test-case. The `out` directory contains the output from running the specific case. The files are stored so that the user can check if the execution of the program was correct. They are not used in subsequent parts of the system.

In addition to input files the *TGS* system generates an `rtest.scr` file in the `tgs` directory. This file is the script file which is used by the automatic test-replay tool "`rtest`" to automatically run the test-suites. "`rtest`" is our internal regression testing tool which we use to run our test-suites. Generation of the `rtest.scr` file is an extra benefit of using *TGS*. It automates the testing procedure to the highest possible extent.

9.1.3 Basic Modules of the Prototype

The prototype consists of four basic software units that are used by all of the input generation techniques. These units are:

- Compile-time unit: this is the unit that takes the original program, makes a static analysis of it, generates the instrumented program, and compiles it to produce the instrumented executable. This unit is based on *Insight* and uses much of *Insight*'s technology. The other three parts are completely new modules and were developed specifically for this project.
- Run-time unit: this is the run-time for all instrumented calls added by the compile-time unit:
- Tool-driver unit: automatic driver for the test-generation system, keeps executing the program while analyzing the input and resulting output and interacts with the run-time and the database for the program to apply the different input generation techniques.
- Database unit: database of the program first created by the compile-time unit and accessed by all units.

The most effort during our research was put into the Run-time unit and Tool-driver part which interacts with input and chooses different algorithms for test-generation. These parts are also constructed modularly so we can add new test generation techniques and experiment with new algorithms. In this research we tested the feasibility of 5 techniques described in the following section.

9.2 Input Generation Techniques

This section describes the different input generation techniques we implemented in our Phase I research. They correspond to increasing levels of sophistication and allowed us to see if automatic input generation is feasible. Each technique has only implemented the basic algorithm. Each of them is quite large and implementation of them in full detail was beyond the scope of our Phase I research. The main goal was to see if all or some of them in combination can be a basis for the creation of a real test generation system. The full implementation of the techniques is part of the Phase II proposal. We believe it is impossible to have prototype working on "real world' problems without full implementation of all the described techniques.

9.2.1 Random Input Generation

This is the most basic input generation used. It generates random input whenever the program requests any input. The values are random, but of the appropriate type. Input here and for all the other techniques is generated for anything except graphical input. For example the program may read from `stdin`, then open some files and read them, etc. The prototype in this case will create `stdin` and the other files and fill them with suitable values.

The prototype generates input while the program executes and at the same time creates the input files that would generate that input when running on the normal program. The run-time also generates an input description file, which contains a detailed description of all the input generated for the program. The input description file is used by other input generation modules.

The run-time detects the data type of the input requested and generates a random value distributed uniformly over the range of valid inputs for that data type. It also decides randomly when to generate an end of file and when to generate inputs shorter than the requested ones (i.e. for `fgets` or `fread` system calls). The information needed by the run-time to generate the input is passed as parameter arguments to the run-time calls and through a database for the program that is created while processing the source.

9.2.2 Heuristics

The heuristics module controls which heuristics rules are activated while processing the program or running it. Any heuristics rule can be turned on or off independently. The current heuristics rules implemented work on the generation of input. Its purpose is to generate inputs that have a better chance to cover more parts of the program than the randomly distributed values generated by the random input generation module.

The rules for every kind of input (numeric or character/string based) have a relative weight. The system first decides randomly and according to the relative weight whether to generate input according to one of the active rules or randomly. Once the rule is decided, the system generates input according to that rule.

Examples of rules implemented for numeric values are:

- Exponential deviate: generates values distributed with an exponential deviate around 0.
- Uniform log values: generates values distributed uniformly in each order of magnitude. For example in that rule it has the same probability of generating 10, 100, 1000, ....
- Extreme values: generates one of a list of extreme values (0, 1, 2, -1, -2, ...).

Example of rules implemented for character/string values are:

- Extreme values: generates extreme values. For example if asking for a string generates the same character for each element of the string, or strings of zero length.
- Special values: generates one of a list of special values. Examples of special values currently included are C and basic keywords, minimal C, Fortran and Lex programs.

9.2.3 Function Minimization Methods

Here we have implemented the function minimization methods proposed by Korel [Kor90]. These techniques associate a *real valued function* to all the branches of the program. The problem of generating input so the program takes a given path is transformed with this technique to the problem of minimizing the associated *real valued function*. The *real valued function* allows us to use guiding techniques to find local minimums for the function. This technique is used by the tool driver to guide the generation of input.

Each input generated by the tool corresponds to a path in the program. Each successfully generated input is stored in a test-suite for the program. The run-time tracks the execution flow of the program and checks at any point whether or not the current flow leads to unchecked parts of the program.

Given a path for the program for which we know the input, we generate input for a path that differs by taking an alternate branch in that path using function minimization methods. This allows us to generate more inputs for the program, given that we already have some input for it.

The function minimization technique we used works as follows:

The tool driver goes over an already existing path in the test-suite and traverses the path. At each selection statement in the path it checks if the branches other than the one taken by the existing path are already covered. If some are not covered, it tries to generate input so that the generated path is taken up to the selection statement and at that point the alternate branch is taken.

To do that it takes as a starting point the input for the already existing path. The idea is to modify this input so that the path up to the chosen selection statement is taken, but then the alternate branch is taken. This is accomplished by associating a *real valued function* to that branch. The *real valued function* is defined in such a way that the branch will be taken if the function becomes zero or negative. Thus the problem is transformed into a function minimization problem.

The tool driver then proceeds to execute the program repeatedly, monitoring the path taken by the program and the resulting value for the *real valued function* associated to the branch. While doing that it loops over all input variables and uses *guided function minimization* methods to modify the input so that the function becomes zero or negative.

If the search succeeds, the input that forces that branch is added to the test-suite of inputs for the program. If the search fails, the branch is marked as unfeasible. Afterwards the tool driver proceeds to find another uncovered branch in the existing paths in the test-suite. The algorithm can fail to find the input either because it takes too long or because the path condition gets broken (i.e. changing the input value makes the program take a path that doesn't lead to the selection statement we are concerned with.)

9.2.4 Dynamic Data Flow

Another technique proposed by Korel [Kor90] is to use dynamic data-flow along with function minimization. The purpose of this technique is to allow us to find out what specific input influences a given branch. The guided function minimization methods are thus optimized because the amount of input to try is reduced. Here we have implemented a variant of the method proposed by Korel. The tool driver monitors the actual flow for a given input of the program and calculates the data-dependence for that flow. This information, along with the actual values generated at every point in the program (also available to the tool driver) allows us to calculate dynamic data-flow information.

Dynamic data-flow techniques are used to reduce the volume of input variables one needs to search when finding input for a given branch. The dynamic data-flow module is invoked when using the function minimization methods. After the tool driver decides to try to search for input to force a given branch, it calls the dynamic data flow module to determine which inputs influence that branch. That information is given with reference to the input description file. The guided search method is then optimized because it only needs to change input values associated with the branch.

To calculate the dynamic data-flow information we used a variant of the algorithm proposed by Korel. In our tool we also wanted to include symbolic execution, so we used a generalized algorithm for symbolic execution that also allows the calculation of dynamic data-flow information. The symbolic execution algorithm allows us to calculate the data-dependence along any flow in the program. To calculate the dynamic data flow dependence it calculates the data-dependence along the flow actually taken by the program, and that leads to the branch condition we want to force. All this information is calculated every time the program is executed and is available to the tool driver because it is stored in the test-suite along with the input generated and the input description file. The tool driver combines the information of the data dependence for the actual path with the actual values found in the input description file to obtain the dynamic data dependence.

9.2.5 Symbolic Execution

Symbolic execution is a technique studied in the literature [Off91] to generate input for a given program. In this technique the program is executed symbolically and the condition for a given branch to be taken is transformed into some set of symbolic expressions satisfying specific conditions. This technique doesn't require the actual execution of the program. We chose to base our system on actual execution because we believe that actual execution is the only practical way of executing real programs. Symbolic execution has difficulties with standard constructs appearing in any appreciable real program (arrays, pointers, external functions, loops). Nevertheless whenever symbolic execution is possible it is a very efficient technique. For this reason we added symbolic execution to our prototype so we could use a mixture of both techniques and get the best of each of them. The compilation-time unit was extended to perform symbolic execution of simple constructs and to add the results to the program database. Using this technique, when trying to satisfy a given branch condition the tool driver first looks to see if symbolic execution was possible for that branch, if so, it uses symbolic execution techniques [Off91] to determine what input is needed to ensure that the branch is taken.

A symbolic execution is performed for the entire program while processing the source. To perform the symbolic execution the tool goes over all of the source code for the program and calculates for all possible paths the path conditions and symbolic expressions for the variables. While going over non-selection statements the expressions in the program are used to obtain symbolic expressions for the relevant variables. Whenever a selection statement is found the path flows independently on every branch with a different path condition for each. When the paths join at the end of the selection statement we have multiple paths flowing at the same time each with its own symbolic expressions and path conditions.

In real programs there are many constructs that prevent symbolic execution or make it inefficient. Some of these constructs are arrays, pointers, external function, loops. etc. In some of these cases the symbolic expressions and path conditions are not calculated and as a result we have unknowns for those expressions. The results of the symbolic execution are stored in the database for the program. We are particularly interested in the symbolic expressions for branch conditions along with the associated path conditions.

At the same time that the tool calculates the symbolic expressions it also calculates the data-dependence information. The data-dependence information is just like a symbolic expression but with missing information regarding the form of the dependence. The plain data-dependence information is simpler to calculate than the explicit symbolic expression and for some branch conditions the tool is able to get data-dependence information, but not the symbolic expression.

When using the function minimization techniques to force a given branch the tool driver looks in the database to see if a symbolic expression is available for the branch condition for that branch. If the symbolic expression information is available it uses it to directly deduce an input that will force the taking of that branch. If a symbolic expression is not available for that branch it uses the normal function minimization techniques described above.

9.3 Application of Input Generation Techniques.

During the course of our Phase I research we tried to see if a combination of specific techniques leads to better coverage results. In Phase I we tested only one combination. This is the area where we plan to perform a majority of the research in Phase II. We believe that the ability to change and adapt different methods to different programs is critical to the success of the project. We will have to develop technology and algorithms which help us in deciding which techniques to use to improve coverage.

The particular technique which we used is described in the next subsection.

In the Phase I proposal we described only one algorithm which we wanted to apply to the test-generation problem. During the course of our research however, we realized that this is not possible, and that we need to implement each step of the algorithm as an independent module and then put them together as one of the possible options. The design which we have now is better than the one we originally proposed. The system is more expandable and ready to be tested with different algorithms. A similar process will probably occur during the Phase II research. During the course of the project we may discover that some parts of our current design can be done better and we may be forced to change them.

9.3.1 The Combined Algorithm

The prototype developed in Phase I uses a combination of all the algorithms explained above to generate input for any given program.

The algorithms are used in the following way:

- The tool used random input generation plus heuristics rules to generate as many different inputs as possible for the program. The generated inputs are added to the test-suite along with all the information about the path taken and the input description file. Note that for any program the random input generation plus heuristics will always be able to generate at least one input.
- Once no more input is found by random input generation and heuristics, the tool switches to guided function minimization methods to derive new paths starting from the ones already in the test-suite. The tool loops over the existing paths and looks for alternate branches that are not covered. Once it finds one, it first looks to see if it has symbolic expression information for it, if so that information is used to deduce the input needed so that the branch is taken. If no symbolic expression information is available for the branch condition it uses the function minimization methods along with dynamic data flow information to try to generate input to force that branch.
- Next the *TGS* driver starts the process of generating input variables. This process is carried out in a loop using information generated in the previous stages. The starting input set for the generation of input data is the one which was used for execution of the program. The tool goes to the end of the execution path and backs up to the last branch. The information from the dynamic data flow analysis tells which input variables have influence on the branch condition in question. The tool then generates random inputs for only those input variables, and uses constraints from the symbolic execution of the program to see if the branch will be taken. If the satisfying set is found in the predefined time, the generated input set is added to the set of test inputs. If the solution is not found, the path is marked as not feasible.
- *TGS* next considers the path opposite the branch taken. If this branch does not have any more leaves, the tool backs up to the branch above it.

parse_tree_data_structures parse_tree_data_structures
PARSE

```c
#ifndef aspincTREESdotH
#define aspincTREESdotH (1)
#include <sys/proto.h>

/* Get definition of enum func_ana_result. */
#include <aspinc/p-mode.h>

/* This type is used everywhere to refer to a tree node. */
typedef union tree_node *tree;

#define DEFTREECODE(SYM, STRING, TYPE, NARGS)   SYM,
enum tree_code {        /** Set ENUM of MACROs **/
#include "aspinc/tree.def"
    LAST_AND_UNUSED_TREE_CODE    /* A convienent way to get a value for
                                    NUM_TREE_CODE. */
};
#undef DEFTREECODE
#define NUM_TREE_CODES ((int)LAST_AND_UNUSED_TREE_CODE)

/*****************************
   Common & MACROS
***************************** /
struct attrib {
    /* attr for parser */
    unsigned att_external : 1;
    unsigned att_static   : 1;
    unsigned att_global   : 1;
    unsigned att_volatile : 1;
    unsigned att_readonly : 1;
    unsigned att_normal   : 1;      /* this is for STMT_FOR_NORMALIZED */
    unsigned att_regdecl  : 1;      /* this is also for STMT_COMPOUND */
    unsigned att_in       : 1;
    /* attr for aspar */
    unsigned att_simplified : 1;  /*this is also for EXPR_SIMPLIFIED*/
    unsigned att_normalized : 1;
    unsigned att_opened     : 1;
    unsigned att_parallel : 6;
    unsigned att_main     : 1;
    unsigned att_dumped   : 1;
    unsigned att_recursive: 1;  /* not well defined... */
    unsigned att_non      : 1;
    unsigned att_language : 3;      /*C, F77, LISP, Ada, F90, etc*/
    unsigned att_reached  : 1;
    /* suw : e3 of DO loop mangled by search_and_substitute_F77() */
    unsigned att_e3subst  : 1;
    unsigned att_bogus    : 1;      /* "Fake" convenience nodes */
    /* suw : F77 only */
    unsigned att_sfsoe    : 1;
    unsigned att_iostmt   : 1;
    unsigned att_bracket  : 1;
    unsigned att_misordered_struct : 1;

    /* --rss: for C++ */
    unsigned att_overload : 1;
    unsigned att_friend   : 1;
    unsigned att_fake_friend : 1;  /* friend att. was just passed to it */
    unsigned att_virtual  : 1;  /* Overloaded STMT_TRANSPARENT */
    unsigned att_delete_has_bracket: 1;   /* delete [] address, reused for T_XREF_TAG */
    unsigned att_has_cc   : 1;  /* ::delete or ::new, reused for T_IS_POINT_OP */
    unsigned att_intermixed : 1;  /* scope mem. first of intermixed stmt */
```

APPENDIX C

```
    unsigned att_anonymous: 1;   /* anonymous union */
    unsigned att_anonymous_last: 1;   /* last member of anonymous union */
    unsigned att_implicit_typedef: 1;   /* typedef added for "struct A" */
    unsigned att_constructor: 1;   /* function is constructor, reused */
    unsigned att_destructor: 1;   /* function is destructor */
    unsigned att_public: 1;
    unsigned att_private: 1;
    unsigned att_protected: 1;
    unsigned att_no_access: 1;
    unsigned att_pure: 1;   /* pure virtual function */
    unsigned att_nested: 1;   /* nested class */
    unsigned att_post_const: 1;   /* fun () const */
    unsigned att_post_volat: 1;   /* fun () volatile */
    unsigned att_template: 1;   /* template declaration */
    unsigned att_instance: 1;   /* template instance */
    unsigned att_member_func: 1;   /* function is a member function */
   /* operator for type conversion func, not completed!!! */
    unsigned att_op_type_func: 1;
    unsigned att_mutable: 1;
    unsigned att_no_proto: 1;   /* no prototype existed for the function*/
    unsigned att_inst_path: 1;
    unsigned att_hidden: 1;
    unsigned att_used      . 1;  /* Replaces TREE_RECURSIVE for TREE_USED */
    unsigned att_reconst   : 1;  /* Replaces TREE_RECURSIVE for reconstructor */
};

struct tree_common
{
    long uid, code;
    long ref;
    union tree_node *keywords;
    union tree_node *next;
    union tree_node *type;
    union tree_node *parent;
#ifdef TGS
    union tree_node *tgs;
#endif
    struct attrib attr;
};

#define TREE_PARENT(NODE)              ((NODE)->common.parent)
#define TREE_UID(NODE)                 ((NODE)->common.uid)
#define TREE_CHAIN(NODE)               ((NODE)->common.next)
#define TREE_KEYWORDS(NODE)            ((NODE)->common.keywords)
#define TREE_TYPE(NODE)                ((NODE)->common.type)
#define TREE_REF(NODE)                 ((NODE)->common.ref)
/* for attributes */
#define TREE_ATTRIBUTE(NODE)           ((NODE)->common.attr)
#define TREE_CODE_UID(NODE)            ((NODE)->common.code)
#define TREE_CODE(NODE)                ((enum tree_code)((NODE)->common.code))

#define TREE_EXTERNAL(NODE)            ((NODE)->common.attr.att_external)
#define TREE_STATIC(NODE)              ((NODE)->common.attr.att_static)
#define TREE_MUTABLE(NODE)             ((NODE)->common.attr.att_mutable)
#define TREE_GLOBAL(NODE)              ((NODE)->common.attr.att_global)
#define TREE_VOLATILE(NODE)            ((NODE)->common.attr.att_volatile)
#define TREE_IN_ANONYMOUS_UNION(NODE)  ((NODE)->common.attr.att_volatile)
#define TREE_READONLY(NODE)            ((NODE)->common.attr.att_readonly)
#define TREE_REGDECL(NODE)             ((NODE)->common.attr.att_regdecl)
#define TREE_INLINE(NODE)              ((NODE)->common.attr.att_in)
```

```
/* -rss: for C++ */

#define TREE_OVERLOAD(NODE)              ((NODE)->common.attr.att_overload)
#define TREE_FRIEND(NODE)                ((NODE)->common.attr.att_friend)
#define TREE_FAKE_FRIEND(NODE)           ((NODE)->common.attr.att_fake_friend)
#define TREE_VIRTUAL(NODE)               ((NODE)->common.attr.att_virtual)
#define STMT_TRANSPARENT(NODE)           ((NODE)->common.attr.att_virtual)
#define TREE_XREF_TAG_PLAIN(NODE)        ((NODE)->common.attr.att_virtual)
#define TREE_DELETE_HAS_BRACKET(NODE)    ((NODE)->common.attr.att_delete_has_bracket)
#define TREE_XREF_TAG(NODE)              ((NODE)->common.attr.att_delete_has_bracket)
#define TREE_EXPLICIT_PATH(NODE)         ((NODE)->common.attr.att_delete_has_bracket)
#define TREE_HAS_CC(NODE)                ((NODE)->common.attr.att_has_cc)
#define TREE_IS_POINT_OP(NODE)           ((NODE)->common.attr.att_has_cc)
#define TREE_LINKAGE_NB(NODE)            ((NODE)->common.attr.att_has_cc)
#define TREE_INTERMIXED(NODE)            ((NODE)->common.attr.att_intermixed)
#define TREE_PAREN_EXPR(NODE)            ((NODE)->common.attr.att_intermixed)
#define TREE_ANONYMOUS(NODE)             ((NODE)->common.attr.att_anonymous)
#define TREE_STATIC_NO(NODE)             ((NODE)->common.attr.att_anonymous)
#define TREE_ANONYMOUS_LAST(NODE)        ((NODE)->common.attr.att_anonymous_last)
#define TREE_IMPLICIT_TYPEDEF(NODE)      ((NODE)->common.attr.att_implicit_typedef)
#define TREE_CONSTRUCTOR(NODE)           ((NODE)->common.attr.att_constructor)
#define TREE_FIELDS_DECL(NODE)           ((NODE)->common.attr.att_constructor)
#define TREE_DESTRUCTOR(NODE)            ((NODE)->common.attr.att_destructor)
#define TREE_XREF_TAG_FOR_CONST(NODE)    ((NODE)->common.attr.att_destructor)
#define TREE_PUBLIC(NODE)                ((NODE)->common.attr.att_public)
#define TREE_PRIVATE(NODE)               ((NODE)->common.attr.att_private)
#define TREE_PROTECTED(NODE)             ((NODE)->common.attr.att_protected)
#define TREE_NO_ACCESS(NODE)             ((NODE)->common.attr.att_no_access)
#define TREE_PURE(NODE)                  ((NODE)->common.attr.att_pure)
#define TREE_SIZEOF_NO_PAR(NODE)         ((NODE)->common.attr.att_pure) /*reuse*/
#define TREE_TYPE_DEFINED(NODE)          ((NODE)->common.attr.att_pure) /*reuse*/
#define TREE_PVAL_MAY_CHANGE(NODE)       ((NODE)->common.attr.att_pure) /*reuse*/
#define TREE_NESTED(NODE)                ((NODE)->common.attr.att_nested)
#define TREE_POST_CONST(NODE)            ((NODE)->common.attr.att_post_const)
#define TREE_FORWARD_IS_STRUCT(NODE)     ((NODE)->common.attr.att_post_const)
#define TREE_POST_VOLAT(NODE)            ((NODE)->common.attr.att_post_volat)
#define TREE_FORWARD_IS_CLASS(NODE)      ((NODE)->common.attr.att_post_volat)
#define TREE_TEMPLATE(NODE)              ((NODE)->common.attr.att_template)
#define TREE_INSTANCE(NODE)              ((NODE)->common.attr.att_instance)
/* CAST_EXPR was in form of functional cast, reused */
#define TREE_FUNC_CAST(NODE)             ((NODE)->common.attr.att_post_const)
#define TREE_MEMBER_FUNC(NODE)           ((NODE)->common.attr.att_member_func)
#define TREE_OP_TYPE_FUNC(NODE)          ((NODE)->common.attr.att_op_type_func)
/* can be reused because OP_TYPE_FUNC is actually not used */
#define TREE_EXPLIC_EXTERN(NODE)         ((NODE)->common.attr.att_op_type_func)
#define TREE_NO_PROTO(NODE)              ((NODE)->common.attr.att_no_proto)
#define TREE_PARM_TEMP(NODE)             ((NODE)->common.attr.att_no_proto)
#define TREE_INST_PATH(NODE)             ((NODE)->common.attr.att_inst_path)
#define TREE_HIDDEN(NODE)                ((NODE)->common.attr.att_hidden)

/* iic_used can be fixed better... */
#define TREE_IIC_USED(NODE)              ((NODE)->common.attr.att_recursive)

#define FUNC_NORMALIZED(NODE)            ((NODE)->common.attr.att_normal)
#define STMT_FOR_NORMALIZED(NODE)        ((NODE)->common.attr.att_normal)
#define STMT_COMPOUND(NODE)              ((NODE)->common.attr.att_regdecl)
#define TREE_REACHED(NODE)               ((NODE)->common.attr.att_reached)
#define EXPR_SIMPLIFIED(NODE)            ((NODE)->common.attr.att_simplified)
#define TREE_NORMALIZED(NODE)            ((NODE)->common.attr.att_normalized)
/**in order to reconstruct 'typedef' correctly** /
#define NON_FIELD(NODE)                  ((NODE)->common.attr.att_non)
```

```
/** for the converter ** /
/* In FORTRAN, we need to distinguish stmt_function_stmt and enty from ordinary
 * function or subroutines
 * /
#define STFUNC_OR_ENTRY(NODE)        ((NODE)->common.attr.att_sfsoe)
#define F77_IO_STMT(NODE)            ((NODE)->common.attr.att_iostmt)
#define F77_BRACKET(NODE)            ((NODE)->common.attr.att_bracket)

/** for ASPAR ** /
#define TREE_OPENED(NODE)            ((NODE)->common.attr.att_opened)
#define TREE_PARALLEL(NODE)          ((NODE)->common.attr.att_parallel)
#define TREE_MAIN(NODE)              ((NODE)->common.attr.att_main)
/* 0 - C, 1 - Fortran * /
#define TREE_LANGUAGE(NODE)          ((NODE)->common.attr.att_language)
#define TREE_DUMPED(NODE)            ((NODE)->common.attr.att_dumped)
#define TREE_RECURSIVE(NODE)         ((NODE)->common.attr.att_recursive)
#define TREE_RECONST(NODE)           ((NODE)->common.attr.att_reconst)
#define TREE_USED(NODE)              ((NODE)->common.attr.att_used)
/** for mapv ** /
#define TREE_BOGUS(NODE)             ((NODE)->common.attr.att_bogus)
/* suw : e3 of DO loop mangled by search_and_substitute_F77() * /
#define E3_SUBST(NODE)               ((NODE)->common.attr.att_e3subst)
#define RECORD_OUT_OF_ORDER(NODE)  ((NODE)->common.attr.att_misordered_struct)

/*****************************************
   Integer Constant & MACROS
****************************************** /
#define TREE_INT_CST(NODE)           ((NODE)->int_cst.int_cst)
#define TREE_INT_STR(NODE)           ((NODE)->int_cst.str)

#define INT_CST_LT(A, B)             (TREE_INT_CST(A) < TREE_INT_CST(B))
#define INT_CST_LT_UNSIGNED(A, B)  \
        ((unsigned) TREE_INT_CST(A) < (unsigned) TREE_INT_CST(B))

struct tree_int_cst
{
     char common[sizeof (struct tree_common)];
     long int_cst;
     char *str;
};

/*****************************************
   Real constant & MACROS
****************************************** /
#define REAL_VALUE_TYPE              double
#define TREE_REAL_CST(NODE)          ((NODE)->real_cst.real_cst)
#define TREE_REAL_STR(NODE)          ((NODE)->real_cst.str)

#define REAL_VALUES_EQUAL(x,y)   ((x) == (y))
#define REAL_VALUES_LESS(x,y)    ((x) <  (y))
#define REAL_VALUE_ATOF(x)        atof(x)

struct tree_real_cst
{
     char common[sizeof (struct tree_common)];
     REAL_VALUE_TYPE real_cst;
     char *str;
};

#define TREE_REAL_PART(NODE)             ((NODE)->complex_cst.real_part)
#define TREE_IMAG_PART(NODE)             ((NODE)->complex_cst.imag_part)
#define TREE_REAL_PART_STR(NODE)         ((NODE)->complex_cst.rstr)
#define TREE_IMAG_PART_STR(NODE)         ((NODE)->complex_cst.istr)
```

parse_tree_data_s ~~ctures~~ STRUCTURES

~~se~~ tree_data_structures PARSE

```
struct tree_complex_cst
{
      char common[sizeof (struct tree_common)];
      tree real_part, imag_part;
      char *rstr, *istr;
};

/******************************************
   STRING_CST & MACROS
******************************************* /
#define TREE_STRING_LENGTH(NODE)   ((NODE)->string.length)
#define TREE_STRING_POINTER(NODE) ((NODE)->string.pointer)

struct tree_string
{
      char common[sizeof (struct tree_common)];
      long length;                  /* length = strlen(pointer) * /
      char *pointer;
};

/*******************************************
   Identifier & MACROS
******************************************* /
#define IDENTIFIER_LENGTH(NODE)          ((NODE)->identifier.length)
#define IDENTIFIER_POINTER(NODE)         ((NODE)->identifier.pointer)
#define IDENTIFIER_GLOBAL_VALUE(NODE) ((NODE)->identifier.global_value)
#define IDENTIFIER_LOCAL_VALUE(NODE)   ((NODE)->identifier.local_value)
#define IDENTIFIER_LABEL_VALUE(NODE)   ((NODE)->identifier.label_value)

struct tree_identifier
{
      char common[sizeof (struct tree_common)];
      long length;
      char *pointer;
      union tree_node *global_value;
      union tree_node *local_value;
      union tree_node *label_value;
};

/******************************************
     TREE_LIST node & Macros
****************************************** /
#define TREE_PURPOSE(NODE) ((NODE)->list.purpose)
#define TREE_VALUE(NODE)    ((NODE)->list.value)

struct tree_list
{
      char common[sizeof (struct tree_common)];
      union tree_node *purpose;
      union tree_node *value;
};

/******************************************
     PLAIN_TEXT node & Macros
****************************************** /
#define TREE_TEXT(NODE) ((NODE)->text.text)
#define TEXT_LABEL(NODE) ((NODE)->text.label)
#define TEXT_SOURCE_LINE(NODE)   ((NODE)->text.linenum)
#define TEXT_SOURCE_FILE(NODE)   ((NODE)->text.filename)

struct tree_text
{
      char common[sizeof (struct tree_common)];
      char *text;
```

```
    union tree_node *label;
    char *filename;
    long linenum;
};

/*******************************************
   INCOMPLETE_FUNC node & Macros
*******************************************/

#define IFUNC_DECLSPECS(NODE)   ((NODE)->ifunc.declspecs)
#define IFUNC_DECLARATOR(NODE)  ((NODE)->ifunc.declarator)
#define IFUNC_BODYTEXT(NODE)    ((NODE)->ifunc.bodytext)
#define IFUNC_PARMTEXT(NODE)    ((NODE)->ifunc.parmtext)
#define IFUNC_LINENO(NODE)      ((NODE)->ifunc.lineno)
#define IFUNC_LINENO_BODY(NODE)       ((NODE)->ifunc.lineno_body)

struct tree_ifunc
{
        char common[sizeof (struct tree_common)];
        union tree_node *declspecs;
        union tree_node *declarator;
        char *bodytext;
        char *parmtext;
        int lineno;
        int lineno_body;
};

/*******************************************
   DAG_NODE Macros
*******************************************/

#define DAG_CLASS(NODE)     ((NODE)->exp.operands[0])
#define DAG_FIELD(NODE)     ((NODE)->exp.operands[1])
#define DAG_PATHS(NODE)     ((NODE)->exp.operands[2])
#define DAG_BASE(NODE)      ((NODE)->exp.operands[3])

/*******************************************
   EXPRESSION node & Macros
*******************************************/
#define TREE_EXPR_MATCH(NODE) ((NODE)->exp.match)
#define TREE_OPERAND(NODE, I) ((NODE)->exp.operands[I])
#define CONSTRUCTOR_ELTS(NODE) TREE_OPERAND(NODE, 1)

/* C++ */
#define DELETE_ADDRESS(NODE) ((NODE)->exp.operands[0])
#define DELETE_SIZE(NODE)     ((NODE)->exp.operands[1])

#define NEW_TYPE_ID(NODE)         ((NODE)->exp.operands[0])
#define NEW_ARGS(NODE)            ((NODE)->exp.operands[1])
#define NEW_INITIALIZER(NODE) ((NODE)->exp.operands[2])
#define NEW_NEW_TYPE_ID(NODE) ((NODE)->exp.operands[3])
#define NEW_CTOR(NODE)            ((NODE)->exp.operands[4])

struct tree_exp
{
    char common[sizeof (struct tree_common)];
    union tree_node *match;
    union tree_node *operands[1];     /* it's expandable */
};

#define TREE_CAST_TYPE(NODE)   ((NODE)->cast_expr.type)

struct tree_cast_expr
{
```

```
    char common[sizeof (struct tree_common)];
    union tree_node *match; /* Provided _only_ for easy compatibility with
                                  above */
    union tree_node *operands[2];
    unsigned char type; /* 0 = dynamic, 1 = const, 2 = static, 3 = reinterpret */
};

/*********************************************
  Tree TYPE node & Macros
*********************************************/
#define TYPE_SOURCE_FILE(NODE)   ((NODE)->type.filename)
#define TYPE_SOURCE_LINE(NODE)   ((NODE)->type.linenum)
#define TYPE_SIZE(NODE)          ((NODE)->type.size)
#define TYPE_VALUES(NODE)        ((NODE)->type.values)
#define TYPE_DOMAIN(NODE)        ((NODE)->type.values)
#define TYPE_FIELDS(NODE)        ((NODE)->type.values)
#define TYPE_ARG_TYPES(NODE)     ((NODE)->type.values)
#define TYPE_CLASS(NODE)         ((NODE)->type.pclass)   /*-rss: class::* for POINTER_TYPE */
#define TYPE_POINTER_TO(NODE)    ((NODE)->type.pointer_to)
#define TYPE_REFERENCE_TO(NODE)  ((NODE)->type.reference_to)
#define ACTUAL_TYPE(NODE)        ((NODE)->type.reference_to)
#define TYPE_MIN_VALUE(NODE)     ((NODE)->type.minval)
#define TYPE_MAX_VALUE(NODE)     ((NODE)->type.maxval)
#define TYPE_PRECISION(NODE)     ((NODE)->type.precision)
#define CHAR_TYPE_LEN(NODE)      ((NODE)->type.precision)
#define TYPE_NAME(NODE)          ((NODE)->type.name)
#define TYPE_C_SIZE(NODE)        ((NODE)->type.extra.c_size)
#define TYPE_UNSIGNED(NODE)      ((NODE)->type.extra.unsigned_type)
#define TYPE_EXTRA(NODE)         ((NODE)->type.extra)
#define TYPE_BASE(NODE)          ((NODE)->type.base)
#define TYPE_SCOPE_PATH(NODE)    ((NODE)->type.scope_path)
#define TYPE_LABEL(NODE)         ((NODE)->type.label)
#define TYPE_NESTED(NODE)        ((NODE)->type.nested)
#define TYPE_LINKAGE(NODE)       ((NODE)->type.linkage)
#define TYPE_TEMP_PARAM_LIST(NODE) ((NODE)->type.temp_param_list)
#define TYPE_SIGNED(NODE)        ((NODE)->type.extra.signed_type)
#define TYPE_EXTRA(NODE)         ((NODE)->type.extra)
#define TYPE_IMP_TDEF(NODE)      ((NODE)->type.minval)
#define TYPE_FRIEND_CLASS(NODE)  ((NODE)->type.maxval)
#define TYPE_SCOPE(NODE)         ((NODE)->common.parent)
#define TYPE_TABLE(NODE)         ((NODE)->type.table)
#define TYPE_DAG(NODE)           ((NODE)->type.dag)

struct tree_type
{
    char common[sizeof (struct tree_common)];
    char *filename;
    long linenum;
    union tree_node *values;
    union tree_node *size;
    union tree_node *pointer_to;
    union tree_node *reference_to;
    union tree_node *name;
    union tree_node *maxval;
    union tree_node *minval;
    union tree_node *base;   /* C++: list of base classes */
    union tree_node *scope_path;   /* C++: explicit path to type if any */
    union tree_node *label;   /* C++: label */
    union tree_node *nested;   /* C++: chain of nested classes */
    union tree_node *linkage;   /* C++: chain of nested classes */
    union tree_node *temp_param_list;   /* C++: template parameter list */
    union tree_node *pclass;
    union tree_node *dag;
    struct Entry **table;
```

```
     unsigned char precision;
     struct {
          unsigned c_size        : 2;  /* 0 ==> short, 1 ==> normal, 2 ==> long */
          unsigned unsigned_type : 1;
          unsigned signed_type : 1;               /* By keyword */
     } extra;
};


struct decl_base {
     char *filename;
     long linenum;
     union tree_node *size;                /* size & common */
     union tree_node *implicit, *equiv, *data, *param;
     union tree_node *name;
     union tree_node *context;             /* context & calling-funcs */
     union tree_node *initial;             /* initial & body */
     union tree_node *arguments;           /* C++: "Class var (3);" */
     union tree_node *linkage;       /* C++: linkage {...} */
     union tree_node *scope_path;  /* C++: explicit path to type if any */
     union tree_node *label;          /* C++: label */
     union tree_node *temp_param_list;  /* C++: template argument list */
     union tree_node *stmts;        /* C++: extra stmts attached to decl */
     union tree_node *post_stmts;  /* C++: extra post_stmts attached to decl */
     union tree_node *over_chain;  /* C++: overloaded list */
     union tree_node *field_dag;    /* C++: pointer to dag where field was found */
     union tree_node *friend_class; /* C++: list of friend classes */
     struct binding_level *level;   /* C++: for namespaces */
};


/**********************************************************
   Declaration node & Macro
**********************************************************/
#define DECL_SOURCE_FILE(NODE)     ((NODE)->decl.dbase.filename)
#define DECL_SOURCE_LINE(NODE)     ((NODE)->decl.dbase.linenum)
#define DECL_SIZE(NODE)            ((NODE)->decl.dbase.size)
#define DECL_COMMON(NODE)          ((NODE)->decl.dbase.size)
#define DECL_EQUIVAL(NODE)         ((NODE)->decl.dbase.equiv)
#define DECL_IMPLICIT(NODE)        ((NODE)->decl.dbase.implicit)
#define DECL_DATA(NODE)            ((NODE)->decl.dbase.data)
#define DECL_BL_NAMES(NODE)        ((NODE)->decl.dbase.data)  /*C++: reused */
#define DECL_PARAMETER(NODE)       ((NODE)->decl.dbase.param)
#define DECL_EXCEP(NODE)           ((NODE)->decl.dbase.param)  /* C++: reused */
#define DECL_NAME(NODE)            ((NODE)->decl.dbase.name)
#define DECL_CONTEXT(NODE)         ((NODE)->decl.dbase.context)
#define DECL_FIELD_CONTEXT(NODE)   ((NODE)->decl.dbase.context)
#define DECL_CALLING_FUNC(NODE)    ((struct a_elm *)((NODE)->decl.dbase.context))
#define DECL_ARGUMENTS(NODE)       ((NODE)->fdecl.arguments)   /* In FUNC_DECL */
#define DECL_INITIAL(NODE)         ((NODE)->decl.dbase.initial)
#define DECL_FUNC_BODY(NODE)       ((NODE)->decl.dbase.initial)
#define DECL_ALIASES(NODE)         ((NODE)->decl.aliases)
/** for C++ **/
#define DECL_TYPE_SCOPE_PATH(NODE)       ((NODE)->decl.dbase.scope_path)
#define DECL_SCOPE_REF(NODE)       ((NODE)->decl.dbase.scope_path)
/** for C++ **/
#define DECL_TEMP_PARAM_LIST(NODE) ((NODE)->decl.dbase.temp_param_list)
#define DECL_LABEL(NODE)           ((NODE)->decl.dbase.label)
#define DECL_OVER_CHAIN(NODE)      ((NODE)->decl.dbase.over_chain)    /*C++*/
#define DECL_CONS_ARGS(NODE)       ((NODE)->decl.dbase.arguments)  /* X a(3); */
#define DECL_CONS_LIST(NODE)       ((NODE)->decl.dbase.arguments)  /* X a(3); */
#define DECL_LINKAGE(NODE)         ((NODE)->decl.dbase.linkage)
#define DECL_BINDING_LEVEL(NODE)   ((NODE)->decl.dbase.level)
#define FUNC_CLASS(NODE)           ((NODE)->fdecl.pclass)
```

```
#define ACTUAL_DECL(NODE)           ((NODE)->fdecl.actual_decl)
#define DECL_STMTS(NODE)            ((NODE)->decl.dbase.stmts)
#define DECL_POST_STMTS(NODE)       ((NODE)->decl.dbase.post_stmts)
#define DECL_NESTED(NODE)           ((NODE)->decl.dbase.arguments)    /*reused* /
#define INSTANCE_PATH(NODE)         ((NODE)->decl.dbase.label)
#define DECL_FIELD_DAG(NODE)        ((NODE)->decl.dbase.field_dag)
/* list with all the friend classes of the FUNCTION_DECL * /
#define DECL_FRIEND_CLASS(NODE)     ((NODE)->decl.dbase.friend_class)

/** for aspar ** /
#define FUNC_FLOW_GRAPH(NODE)       ((NODE)->fdecl.graph)
#define FUNC_INFO(NODE)             ((NODE)->fdecl.fnc_info)

#define        IS_MEMBER_FUNCTION(NODE)  ((NODE)&&(NODE)->fdecl.pclass)
#define NOT_IS_MEMBER_FUNCTION(NODE)  (!NODE!NODE->fdecl.pclass)
#define IN_MEMBER_FUNCTION  (current_function_decl&&current_function_decl->fdecl.pclass)

struct tree_decl
{
      char common[sizeof (struct tree_common)];
      struct decl_base dbase;
      union tree_node *aliases;
};

struct tree_func_decl {
      char common[sizeof (struct tree_common)];
      struct decl_base dbase;
      union s_flow_node *graph;
      union tree_node *arguments;
      struct s_func_info *fnc_info;
      union tree_node *pclass;
      union tree_node *actual_decl;
};

/**************************************************
    Statement node & Macros
************************************************** /
/* For GOTO_STMT, RETURN_STMT,
    COMPOUND_STMT, ASM_STMT, BREAK_STMT, BLOCK_STMT, DIRECTIVE.   * /
#define STMT_SOURCE_LINE(NODE) ((NODE)->stmt.base.linenum)
#define STMT_SOURCE_END(NODE)   ((NODE)->stmt.base.endline)
#define STMT_SOURCE_FILE(NODE) ((NODE)->stmt.base.filename)
#define STMT_BODY(NODE)          ((NODE)->stmt.base.body)
#define STMT_ALIST(NODE)         ((NODE)->stmt.base.Alist)
#define STMT_FLOW_NODE(NODE)     ((NODE)->stmt.base.fnode)
#define STMT_SCOPE(NODE)         ((NODE)->stmt.base.scope)
#define STMT_LABEL(NODE)         ((NODE)->stmt.base.label)
#define STMT_COMMENT(NODE)       ((NODE)->stmt.base.comment)
#define STMT_PREVIOUS(NODE)      ((NODE)->stmt.base.previous)

struct stmt_base
{
      char *filename;
      long linenum, endline;
      union s_flow_node *fnode;
      struct a_list *Alist;
      union tree_node *body, *scope, *label, *previous;
      char *comment;
};

struct tree_stmt
{
      char common[sizeof (struct tree_common)];
      struct stmt_base base;
```

```
};

/*********** For WHILE_STMT. ********************** /
#define STMT_WHILE_COND(NODE)              ((NODE)->while_stmt.cond)
#define STMT_DO_WHILE_COND(NODE)           ((NODE)->while_stmt.cond)
#define STMT_DO_WHILE_LABEL(NODE)          ((NODE)->while_stmt.label)
#define STMT_END_DO_WHILE(NODE)            ((NODE)->while_stmt.enddo)

struct tree_while_stmt
{
      char common[sizeof (struct tree_common)];
      struct stmt_base base;

      union tree_node *cond, *label, *enddo;
};

/************* For IF_STMT.  ********************** /
#define STMT_COND(NODE)          ((NODE)->if_stmt.base.body)
#define STMT_THEN(NODE)          ((NODE)->if_stmt.thenpart)
#define STMT_ELSEIF(NODE)        ((NODE)->if_stmt.elseif)
#define STMT_ELSE(NODE)          ((NODE)->if_stmt.elsepart)
#define STMT_ENDIF(NODE)         ((NODE)->if_stmt.endif)
#define STMT_SOURCE_ELSE(NODE)   ((NODE)->if_stmt.else_line)

struct tree_if_stmt
{
      char common[sizeof (struct tree_common)];
      struct stmt_base base;

      union tree_node *thenpart, *elseif, *elsepart, *endif;
      long else_line;     /* to keep lineno for ELSE * /
};

/************* For MSC_TRY_StmT  ********************** /
#define STMT_MSC_TRY(NODE)        ((NODE)->msc_try_stmt.base.body)
#define STMT_EXCEPT(NODE)         ((NODE)->msc_try_stmt.handler)
#define STMT_EXCEPT_ARGS(NODE)    ((NODE)->msc_try_stmt.handler_args)

struct tree_msc_try_stmt
{
      char common[sizeof (struct tree_common)];
      struct stmt_base base;

      union tree_node *handler, *handler_args;
};

/*********** For FOR_STMT.  ************** /
#define STMT_E1(NODE)              ((NODE)->for_stmt.e1->stmt.base.body)
#define STMT_E2(NODE)              ((NODE)->for_stmt.e2->stmt.base.body)
#define STMT_E3(NODE)              ((NODE)->for_stmt.e3->stmt.base.body)
#define ALIST_E1(NODE)             ((NODE)->for_stmt.e1->stmt.base.Alist)
#define ALIST_E2(NODE)             ((NODE)->for_stmt.e2->stmt.base.Alist)
#define ALIST_E3(NODE)             ((NODE)->for_stmt.e3->stmt.base.Alist)
#define STMT_E1_STMT(NODE)         ((NODE)->for_stmt.e1)
#define STMT_E2_STMT(NODE)         ((NODE)->for_stmt.e2)
#define STMT_E3_STMT(NODE)         ((NODE)->for_stmt.e3)
#define STMT_ENDDO(NODE)           ((NODE)->for_stmt.enddo)
#define STMT_FOR_LABEL(NODE)       ((NODE)->for_stmt.label)
#define STMT_FOR_LOOP_INFO(NODE)   ((NODE)->for_stmt.lp_info)
#define STMT_FOR_DIRECT(NODE)      ((NODE)->for_stmt.directives)
#define STMT_FOR_V(NODE)           ((NODE)->for_stmt.v)
#define STMT_FOR_DECL(NODE)        ((NODE)->for_stmt.decl)

struct tree_for_stmt
```

```
{
    char common[sizeof (struct tree_common)];
    struct stmt_base base;
    union tree_node *e1, *e2, *e3, *decl;
    union tree_node *label, *v, *enddo;          /* for Fortran */
    struct s_loop_info *lp_info;
    char *directives;
};

/****
 * common node which has 2 children.
 ****/
/** For SWITCH_StmT *** /
#define STMT_SWITCH_INDEX(NODE) ((NODE)->stmt_plus1.index)

/** For CASE_StmT including DEFAULT ** /
#define STMT_CASE_INDEX(NODE) ((NODE)->stmt_plus1.index)

/** For DECL_StmT (C++) ** /
/* pointer within scope to the intermixed member * /
#define STMT_DECL_SCOPE(NODE)          ((NODE)->stmt_plus1.index)

/** For TRY_BLOCK_StmT (C++) ** /
#define STMT_TRY_HANDLER(NODE)   ((NODE)->stmt_plus1.base.body)
#define STMT_TRY_COMP(NODE)          ((NODE)->stmt_plus1.index)

/** For ASSIGN_StmT (f77) * /
#define STMT_ASSIGN_VAR(NODE) ((NODE)->stmt_plus1.base.body)
#define STMT_ASSIGN_LABEL(NODE) ((NODE)->stmt_plus1.index)

/** For ASSIGNED_GOTO_StmT (f77) ** /
#define STMT_ASSIGNED_GOTO_NAME(NODE)     ((NODE)->stmt_plus1.base.body)
#define STMT_ASSIGNED_GOTO_LABELS(NODE) ((NODE)->stmt_plus1.index)

/** For COMPUTED_GOTO_StmT (f77) ** /
#define STMT_COMPUTED_GOTO_EXPR(NODE)     ((NODE)->stmt_plus1.base.body)
#define STMT_COMPUTED_GOTO_LABELS(NODE) ((NODE)->stmt_plus1.index)

/** For ENTRY_StmT (f77) *** /
#define STMT_ENTRY_NAME(NODE)                 ((NODE)->stmt_plus1.base.body)
#define STMT_ENTRY_ARG_LIST(NODE)             ((NODE)->stmt_plus1.index)

/** For STMT_FUN_StmT (f77) *** /
#define ST_FUNC_NAME(NODE)                    ((NODE)->stmt_plus1.base.body)
#define ST_FUNC_EXPR(NODE)                    ((NODE)->stmt_plus1.index)

/** For COMMON_StmT (f77) *** /
#define COMMON_VAR_LIST(NODE)                 ((NODE)->stmt_plus1.base.body)
#define COMMON_BLOCK_NAME(NODE)               ((NODE)->stmt_plus1.index)

/** For DATA_StmT (f77) *** /
#define DATA_STMT_OBJ(NODE)                   ((NODE)->stmt_plus1.base.body)
#define DATA_STMT_VAL(NODE)                   ((NODE)->stmt_plus1.index)

struct tree_stmt_plus1
{
    char common[sizeof (struct tree_common)];
    struct stmt_base base;

    union tree_node *index;
};
```

```
/*** For ARITHMETIC_IF_STMT (f77) *** /
#define STMT_ARITHMETIC_IF_COND(NODE)     ((NODE)->arithmetic_if_stmt.base.body)
#define STMT_ARITHMETIC_IF_LABEL1(NODE)   ((NODE)->arithmetic_if_stmt.label1)
#define STMT_ARITHMETIC_IF_LABEL2(NODE)   ((NODE)->arithmetic_if_stmt.label2)
#define STMT_ARITHMETIC_IF_LABEL3(NODE)   ((NODE)->arithmetic_if_stmt.label3)

struct tree_arithmetic_if_stmt
{
      char common[sizeof (struct tree_common)];
      struct stmt_base base;

      union tree_node   *label1, *label2, *label3;
};

/*** TGS stuff *** /

/* accesses the TGS_NODE and allocates if necessary * /
#define TREE_TGS(NODE)          ((NODE)->common.tgs?(NODE)->common.tgs:allocate_tgs_node(NODE))
/* only accesses the TGS_NODE * /
#define TREE_TGS_PLAIN(NODE)      ((NODE)->common.tgs)

/* The following access info on the TGS_NODE, but using as argument the parent
   node * /

#define TGS_KEY(NODE)                (TREE_TGS(NODE)->tgs.key)
#define TGS_SE(NODE)                 (TREE_TGS(NODE)->tgs.se)
#define TGS_NUM_CALLS(NODE)          (TREE_TGS(NODE)->tgs.i0)
#define TGS_INDEX(NODE)              (TREE_TGS(NODE)->tgs.i0)
#define TGS_ELEM(NODE)               (TREE_TGS(NODE)->tgs.i1)

#define TGSA_ACCESSED(NODE)          (TREE_TGS(NODE)->tgs.attr.att_accessed)
#define TGSA_SE_UNKNOWN(NODE)        (TREE_TGS(NODE)->tgs.attr.att_se_unknown)
#define TGSA_PATH_DEP(NODE)          (TREE_TGS(NODE)->tgs.attr.att_path_dep)
#define TGSA_ERROR(NODE)             (TREE_TGS(NODE)->tgs.attr.att_error)

/* Like the above, but using as argument the TGS_NODE itself * /

#define TGS_NODE_KEY(NODE)              ((NODE)->tgs.key)
#define TGS_NODE_SE NODE)               ((NODE)->tgs.se)
#define TGS_NODE_INDEX(NODE)            ((NODE)->tgs.i0)
#define TGS_NODE_ELEM(NODE)             ((NODE)->tgs.i1)

#define TGS_MEMORY_CELLS(NODE)          ((NODE)->tgs.se)

#define TGS_CELL_INDEX(NODE)            ((NODE)->tgs.offset)
#define TGS_CELL_VALUE(NODE)            ((NODE)->tgs.se)
#define TGS_CELL_LEN(NODE)              ((NODE)->tgs.len)
#define TGS_CELL_MEMORY(NODE)           ((NODE)->tgs.memory)

struct attrib_tgs {
      unsigned att_accessed: 1;
      unsigned att_se_unknown: 1;
      unsigned att_path_dep: 1;
      unsigned att_error: 1;
      unsigned att_rest: 28;
};

struct tree_tgs
{
      char common[sizeof (struct tree_common)];
      int key;
      tree se;
      int i0;
      struct attrib_tgs attr;
```

```
     tree offset;
     tree len;
     int i1;
     tree memory;
};

/*
 * UNION
 */
union tree_node
{
     struct tree_common common;
     struct tree_int_cst int_cst;
     struct tree_real_cst real_cst;
     struct tree_complex_cst complex_cst;
     struct tree_string string;
  /* struct tree_complex complex; */
     struct tree_identifier identifier;
     struct tree_decl decl;
     struct tree_func_decl fdecl;
     struct tree_type type;
     struct tree_list list;
     struct tree_text text;
     struct tree_ifunc ifunc;
     struct tree_exp exp;
     struct tree_cast_expr cast_expr;
     struct tree_stmt stmt;
     struct tree_if_stmt if_stmt;
     struct tree_arithmetic_if_stmt arithmetic_if_stmt;
     struct tree_for_stmt for_stmt;
     struct tree_while_stmt while_stmt;
     struct tree_stmt_plus1 stmt_plus1;
     struct tree_tgs tgs;
     struct tree_msc_try_stmt msc_try_stmt;
};

/*
 * Binding Level
 */
struct binding_level
{
     tree names;
     tree tags;
     tree shadowed;
     tree blocks;
     struct binding_level *level_chain;
     tree using_list;     /*C++: list of using_directives in the level */
     char parm_flag;
     char tag_transparent;
};
#define NULL_BINDING_LEVEL (struct binding_level *)0;

/*--rss[I]: should go somewhere else: */

#define IMPLEMENT Warning ("Implement: \"%s\", line %d at [%s:%ld]\n",__FILE__,__LINE__,INfilename,lineno);

#define INTERNAL Error ("Internal error: \"%s\", line %d at [%s:%ld]\n",__FILE__,__LINE__,INfilename,lineno);

extern int IS_CPP;

#ifdef FREECHECK
#define malloc(a) malloc_prof(a,__FILE__,__LINE__)
#define xmalloc(a) xmalloc_pro(a,__FILE__,__LINE__)
#define _ex_malloc(a) _ex_malloc_pro(a,__FILE__,__LINE__)
```

```
#define make_node(a) make_node_prof(a,__FILE__,__LINE__)
#define build_tree_list(p,v) build_tree_list_prof(p,v,__FILE__,__LINE__)
#endif

#endif

/** END OF FILE **/
```

1 Source Code Build Procedure

The following is a sequence of steps that should be followed in order to build the instrumentation executable

1.1 Environment settings and directory structure for the source code.

Before actually building the executable, the following environment settings must be assigned using the setenv shell command in c-shell (a directory called "srcdir" is assumed to exist):

- setenv BLDROOT srcdir
- setenv EXPVAR srcdir
- setenv ARCH sun4
- setenv path "$path srcdir"

The directory structure for the source files included in the listings should be arranged as described in table 1. Each entry in the table lists the source code directory, with the corresponding pages of source for the files which should be placed in the directory.

Source Code Directory Structure

| Directory | Source code |
|---|---|
| srcdir/include/aspinc | pp. 1 - 83 |
| srcdir/instr/include | pp. 84 - 95 |
| srcdir/instr/do_mpf | pp. 96 - 439 |
| srcdir/instr/common | pp. 440 - 723 |
| srcdir/aspar/common | pp. 724 - 1518 |
| srcdir/aspar/analy/flow | pp. 1519 - 1548 |
| srcdir/make/net/sun4 | pp. 1549 - 1550 |

1.2 Compiling

To compile the source, run the script "mmnet" from each directory containing .c files. The directories that contain .c files are, in compilation order:

- srcdir/aspar/common
- srcdir/aspar/analy/flow
- srcdir/instr/common
- srcdir/instr/do_mpf (C) Copyright Parasoft Corporation 1995. mmnet

```
#!/bin/sh
SYSTEM=net
ARCH=`arch`
COMPILER=cc

BLDROOT=${BLDROOT:-$EXPVER}
. $EXPVER/make/scripts/setbldtype
. $EXPVER/make/scripts/verinfo

make -f Make.arh \
        SYSTEM=$SYSTEM ARCH=$ARCH COMPILER=$COMPILER \
        BLDROOT=$BLDROOT BLDTYPE=$BLDTYPE \
        LOCK=$LOCK UNLOCK=$UNLOCK MAJOR=$MAJOR MINOR=$MINOR \
        DEFS=$DEFS $*
```

(C) Copyright Parasoft Corporation 1995.                                    confign.def

```
#
# These are configuration parameters used in compiling and linking
# Express programs.
#
CC = cc
F77 = f77
LINK = ln
LINKFLAGS = -s
RM = rm
RMFLAGS = -f
AR = ar
ARFLAGS = uv
RANLIB = ranlib
RANFLAGS =

SRCLIBDIR = $(BLDROOT)/srclib/$(SYSTEM)/$(ARCH)
LIBDIR    = $(BLDROOT)/lib/$(SYSTEM)/$(ARCH)
QCDIR     = $(BLDROOT)/qclib/$(SYSTEM)/$(ARCH)

IBFLAGS = -case=lower -length=end -suf=_
XCFLAGS = -DEXP_SUN -DSIGVOID -DH_OPSYS=BSD -DVARARGS -DEXPNAME \
          -DPLX_DEVS=$(PLXOPTS) -I$(EXPVER)/make/$(SYSTEM)/$(ARCH)/$(COMPILER)

XLFLAGS = -Bstatic

EXNLIB = $(LIBDIR)/expressN.a
CBXLIB = $(LIBDIR)/cubixN.a
PLXLIB = $(LIBDIR)/plotixN.a
PLXOPTS=PLX_NOD,PLX_RAS
PLXDRIVS=Ras

# The following commands are used to build Express test programs and
# executables after the dust has cleared.
NODEF77=netf77
NODECC=netcc
NCFLAGS=-kXN
```

What is claimed is:

1. A method using a computer for automatically instrumenting a computer program for dynamic debugging, such a computer program comprising source code written in a programming language for executing instructions on said computer, said programming language having a grammar comprising operations having an operator and at least one operand and a set of rules for relating said operations to said at least one operand, comprising the steps of:

providing said source code as a sequence of statements in a storage device to said computer, each such statement representing a desired instruction expressed in said programming language as one or more operations with at least one operand each;

separating each such statement into tokens representing either said operator or said at least one operand;

building a parse tree according to said set of rules using said tokens, said parse tree being a directed acyclic graph and comprising a plurality of nodes connected by paths organized into a hierarchy of parent nodes representing operators connected using said paths to children nodes representing operands of said operators;

providing additional nodes to said computer for instrumenting the computer program comprising instrumentation operations required to communicate runtime conditions to an error-checking engine, said additional nodes comprising a further plurality of nodes connected by paths organized into a hierarchy of parent nodes representing instrumentation operators connected using said paths to children nodes representing instrumentation operands of said instrumentation operators;

instrumenting said computer program by augmenting said parse tree with said additional nodes to create an instrumented parse tree for indicating that an error condition occurred in said computer program during execution using said instrumentation operations; and generating object code from said instrumented parse tree and storing said object code in the storage device for later execution using the error-checking engine that indicates error conditions in said computer program.

2. A method according to claim 1, wherein said error condition comprises a read operation to an uninitialized memory variable, said instrumenting step further comprising the steps of:

determining a memory address from a stack frame corresponding to a memory variable sought to be checked, said stack frame having a corresponding node in said parse tree;

performing a flow analysis on said source code to identify a read operation to said memory address for which it cannot be determined that said memory variable has been previously initialized, said read operation having a corresponding node in said parse tree;

inserting said additional nodes into said parse tree after said stack frame node corresponding to such an instrumentation operation for setting an indication that said memory variable is uninitialized;

inserting said additional nodes into said parse tree before said read operation corresponding to such an instrumentation operation for indicating that said memory variable is being read by a read operation and is either initialized or uninitialized as indicated by said indication;

performing a flow analysis on said source code to identify a write operation to said memory address, said write operation having a corresponding node in said parse tree; and inserting said additional nodes into said parse tree after said write operation node corresponding to such an instrumentation operation for setting an indication that said memory variable is initialized.

3. A method according to claim 1, wherein said error condition comprises a memory access operation to an invalid memory address for a complex memory variable comprising a plurality of elements, each such element comprising a constant value, a simple memory variable or a complex memory variable, said instrumenting step further comprising the steps of:

performing a flow analysis on said source code to identify a declaration operation for a complex memory variable comprising an identifier operand for identifying said complex memory variable and a dimension operand for declaring a memory block size for said complex memory variable, said declaration operation having a corresponding node in said parse tree;

inserting said additional nodes into said parse tree after said declaration operation node corresponding to such an instrumentation operation for storing said identifier operand and said dimension operand;

performing a flow analysis on said source code to identify said memory access operation using said complex memory variable, said memory access operation having a corresponding node in said parse tree; and inserting said additional nodes into said parse tree before said memory access operation node corresponding to such an instrumentation operation for indicating whether said memory access operation is accessing an invalid memory address identified by said identifier operand and falling outside of a memory address range defined by said stored dimension operand.

4. A method according to claim 3, wherein said memory access operation is a write operation for writing a data value into said invalid memory address.

5. A method according to claim 3, wherein said memory access operation is a read operation for reading a data value from said invalid memory address.

6. A method according to claim 3, wherein said error condition comprises an array access violation and said complex memory variable is an array comprising a fixed number of identical elements, each such identical element being identified by an index and comprising a constant value, a simple memory variable or a complex memory variable, said second inserting step further comprising the step of:

inserting said additional nodes into said parse tree before said memory access operation node corresponding to such an instrumentation operation for indicating whether said memory access operation is accessing an invalid memory address identified by said identifier operand and using an index identifying an identical element falling outside of a memory address range defined by said stored dimension operand.

7. A method according to claim 6, wherein said memory access operation is a write operation for writing a data value into said invalid memory address.

8. A method according to claim 6, wherein said memory access operation is a read operation for reading a data value from said invalid memory address.

9. A method according to claim 1, wherein said error condition comprises a dynamic memory manipulation error using a pointer memory variable, said instrumenting step further comprising the steps performing a flow analysis on said source code identify a declaration operation for a pointer memory variable comprising an identifier operand for identifying said pointer memory variable, said declaration operation having a corresponding node in said parse tree;

inserting said additional nodes into said parse tree after said declaration operation node corresponding to such an instrumentation operation for storing a pointer record for said pointer memory variable identified by said identifier operand and containing a value field for a memory address;

performing a flow analysis on said source code to identify a memory allocation operation for allocating a memory block to said pointer memory variable, said memory allocation operation having a corresponding node in said parse tree;

inserting said additional nodes into said parse tree after said memory allocation operation node corresponding to such an instrumentation operation for storing an allocation record for said memory block identified by said identifier operand and containing a size field storing said memory block size, a starting address field storing said memory block starting address, a pointer address field storing memory addresses of further pointer memory variables that point to said memory block, a pointer list field storing pointer memory variables contained in said memory block, and a state field storing state information regarding said memory block;

performing a flow analysis on said source code to identify an assignment operation assigning a memory address to said pointer memory variable, said assignment operation having a corresponding node in said parse tree;

inserting said additional nodes into said parse tree after said assignment operation node corresponding to such an instrumentation operation for storing a memory address into said value field in said pointer record; and inserting said additional nodes into said parse tree corresponding to such an instrumentation operation for performing a dynamic memory manipulation check using said pointer record and said allocation record.

10. A method according to claim 9, wherein said dynamic memory manipulation check comprises checking for an operation using a pointer memory variable containing a memory address for a freed memory block, said method further comprising the steps of:

performing a flow analysis on said source code to identify a read operation or a write operation using said pointer memory variable, said read operation or said write operation each having a corresponding node in said parse tree;

inserting said additional nodes into said parse tree before said read operation node and before said write operation node corresponding to such an instrumentation operation for indicating whether said value field contains a memory address equal to said memory address for said freed memory block;

performing a flow analysis on said source code to identify a function call operation using said pointer memory variable, said function call operation having a corresponding node in said parse tree;

inserting said additional nodes into said parse tree before said function call operation node corresponding to such an instrumentation operation for indicating whether said function call operation is calling a function using said value field containing a memory address equal to said memory address for said freed memory block;

performing a flow analysis on said source code to identify a function call return operation using said pointer memory variable, said function call return operation having a corresponding node in said parse tree;

inserting said additional nodes into said parse tree before said function call return operation node corresponding to such an instrumentation operation for indicating whether said function call return operation is returning said value field containing a memory address equal to said memory address for said freed memory block to a calling function in said computer program;

performing a flow analysis on said source code to identify a free memory block operation using said pointer memory variable, said free memory block operation having a corresponding node in said parse tree; and inserting said additional nodes into said parse tree before said free memory block operation node corresponding to such an instrumentation operation for indicating whether said free memory block operation is attempting to free a further memory block using said value field containing a memory address equal to said memory address for said freed memory block or is attempting to free a stack frame or is attempting to free said memory block whereby said memory address for said freed memory block does not equal said starting memory address.

11. A method according to claim 1, wherein said error condition comprises an inappropriate use of a pointer memory variable, said instrumenting step further comprising the steps performing a flow analysis on said source code to identify a declaration operation for a pointer memory variable comprising an identifier operand for identifying said pointer memory variable, said declaration operation having a corresponding node in said parse tree;

inserting said additional nodes into said parse tree after said declaration operation node corresponding to such instrumentation operation for storing a pointer record for said pointer memory variable identified by said identifier operand and containing a value field for a memory address;

performing a flow analysis on said source code to identify an operation using said pointer memory variable, said operation having a corresponding node in said parse tree;

inserting said additional nodes into said parse tree before said operation node corresponding to such an instrumentation operation for indicating whether said operation is attempting to use said pointer memory variable when said value field is equal to said null;

inserting said additional nodes into said parse tree before said operation node corresponding to such an instrumentation operation for indicating whether said operation is attempting to use said pointer memory variable when said value field is uninitialized;

inserting said additional nodes into said parse tree before said operation node corresponding to such an instrumentation operation for indicating whether said operation is attempting to use a memory address contained in said value field that does not point to valid data;

inserting said additional nodes into said parse tree before said operation node corresponding to such an instrumentation operation for indicating whether said operation is attempting to compare or relate a plurality of pointer memory variables not pointing to identical types of data; and inserting said additional nodes into said parse tree before said operation node corresponding to such an instrumentation operation for indicating whether said operation is attempting to make a function call using a pointer memory variable not containing a valid function address.

12. A method according to claim 1, wherein said error condition comprises a memory leak error, said instrumenting step further comprising the steps of:

performing a flow analysis on said source code to identify a declaration operation for a pointer memory variable comprising an identifier operand for identifying said point memory variable, said declaration operation having a corresponding node in said parse tree;

inserting said additional nodes into said parse tree after said declaration operation node corresponding to such an instrumentation operation for storing a pointer record for said pointer memory variable identified by said identifier operand and containing a value field for a memory address;

performing a flow analysis on said source code to identify an exit from scope operation, said operation having a corresponding node in said parse tree; and inserting said additional nodes into said parse tree before said exit from scope operation corresponding to such an instrumentation operation for checking for memory leaks.

13. A method according to claim 1, wherein said error condition comprises an interface routine for performing a user-definable function during execution, said instrumenting step further comprising the steps of:

preprocessing said interface routine for creating an intermediate form and storing said intermediate form in a database;

performing a flow analysis on said source code to identify a function call having a corresponding interface description in said data base;

removing said function call from said parse tree;

reading said stored intermediate form for said corresponding interface from said database;

inserting said stored intermediate form as interface nodes in said parse tree;

substituting function call arguments into placeholders in said interface nodes; and replacing a return statement in said interface node with an assignment of a result of said interface to an actual call to said function call.

* * * * *